(12) United States Patent
Matsumi et al.

(10) Patent No.: US 6,711,343 B1
(45) Date of Patent: Mar. 23, 2004

(54) DATA RECORDING/REPRODUCING DEVICE, FILE MANAGING METHOD, FILE INFORMATION GENERATING METHOD, FILE MANAGING METHOD, MANAGEMENT INFORMATION GENERATING DEVICE, MANAGEMENT INFORMATION ANALYZING DEVICE, AND MEDIUM

(75) Inventors: Chiyoko Matsumi, Suita (JP); Masazumi Yamada, Moriguchi (JP); Akira Iketani, Higashiosaka (JP); Junji Yoshida, Neyagawa (JP); Noriyuki Matsumoto, Matsuyama (JP); Hiroyuki Iltsuka, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/254,992

(22) PCT Filed: Jul. 15, 1998

(86) PCT No.: PCT/JP98/03166

§ 371 (c)(1),
(2), (4) Date: Mar. 17, 1999

(87) PCT Pub. No.: WO99/04394

PCT Pub. Date: Jan. 28, 1999

(30) Foreign Application Priority Data

| Jul. 17, 1997 | (JP) | 9-192917 |
|---|---|---|
| Aug. 4, 1997 | (JP) | 9-208843 |
| Aug. 21, 1997 | (JP) | 9-224636 |
| Aug. 21, 1997 | (JP) | 9-224637 |
| Aug. 29, 1997 | (JP) | 9-234328 |
| Nov. 4, 1997 | (JP) | 9-302248 |

(51) Int. Cl.[7] .............................................. H04N 5/76
(52) U.S. Cl. ........................ 386/46; 386/125; 360/55; 369/69; 348/552
(58) Field of Search ................................. 386/46, 1, 45, 386/125, 126; 707/200; 360/1–15, 32, 48, 55; 369/32.01, 43, 47.1, 53.1, 69, 99; 348/552, 231.99, 231.1, 231.2, 231.3; H04N 5/76, 5/92, 5/225

(56) References Cited

U.S. PATENT DOCUMENTS 5,282,048 A  1/1994  Bae (List continued on next page.)

FOREIGN PATENT DOCUMENTS

EP  487331  5/1992

(List continued on next page.)

OTHER PUBLICATIONS

European Search Report, application No. 98932520, dated Oct. 5, 1999.

(List continued on next page.)

*Primary Examiner*—Thai Tran
(74) *Attorney, Agent, or Firm*—RatnerPrestia

(57) ABSTRACT

An apparatus comprising a transmission/reception device for transmitting/receiving data and command signals from a transmission line, a recording/reproducing device for recording data received from the transmission/reception device on a recording medium during reception and for transmitting data reproduced from the recording medium to the transmission/reception device during transmission, an operation device for generating an operation signal for determining the operation of the recording/reproducing device, a control device for controlling the recording/reproducing device in accordance with the command signals or the operation signal, and a switching signal generation device for outputting a switching signal for determining whether the operation signal is valid or invalid to the control device.

5 Claims, 43 Drawing Sheets

U.S. PATENT DOCUMENTS

| | | | |
|---|---|---|---|
| 5,388,016 A | | 2/1995 | Kanai et al. |
| 5,414,570 A | | 5/1995 | Fry et al. |
| 5,508,986 A | | 4/1996 | Kagamibashi et al. |
| 5,909,559 A | * | 6/1999 | So .............................. 710/307 |
| 5,987,126 A | * | 11/1999 | Okuyama et al. .............. 360/60 |
| 6,038,366 A | * | 3/2000 | Ohno et al. .................... 386/46 |
| 6,285,824 B1 | * | 9/2001 | Yanagihara et al. .......... 386/98 |
| 6,323,906 B1 | * | 11/2001 | Kobayashi et al. ......... 348/552 |

FOREIGN PATENT DOCUMENTS

| | | | | |
|---|---|---|---|---|
| EP | | 684570 | 11/1995 | |
| EP | | 0 756 276 A1 | 1/1997 | |
| EP | | 0 762 684 A2 | * 12/1997 | ............ H04H/1/00 |
| EP | | 997908 | 5/2000 | |
| JP | | 59075330 | 4/1984 | |
| JP | | 1-223668 | 9/1989 | |
| JP | | 5-307449 | 11/1993 | |
| JP | | 6-349142 | 12/1994 | |
| JP | | 7-934499 | 4/1995 | |
| JP | | 7-244926 | 9/1995 | |
| JP | | 8-22679 | 1/1996 | |
| JP | | 9-139914 | 5/1997 | |
| JP | | 9-186665 | 7/1997 | |
| JP | | 10-49412 | 2/1998 | |
| JP | | 10-261626 | 9/1998 | |
| JP | | 10-271440 | 10/1998 | |

OTHER PUBLICATIONS

European Search Report dated Sep. 12, 2000, application No. EP98–93–2520.

Japanese Office Action for Japanese Application No. 9–192917 mailed Aug. 19, 2003 (with partial English translation).

Japanese Search Report for Int'L Appln. No. PCT/JP98/03166 dated Nov. 4, 1998.

English translation of Japanese Search Report.

* cited by examiner

Fig. 7

| Cassette information | Cassette ID<br>Cassette label<br>File system information recording position<br>Number of recording files<br>Tape length<br>Log information | : 5<br>: Ski tour<br>: 97/02/05 23:10<br><br>: 5<br>: 120 minutes |
|---|---|---|
| Individual file information | Entry of first file | File name<br>File size<br>Recording start position<br>Type of recorded data | : 97_01_27/0900.dv<br>: 30 min.<br>: 97/01/27 09:00<br>: VTR recording format |
| | Entry of second file | File name<br>File size<br>Recording start position<br>Type of recorded data | : 97_01_27/1025.dv<br>: 15 min.<br>: 97/01/27 10:25<br>: VTR recording format |
| | Entry of third file | File name<br>File size<br>Recording start position<br>Type of recorded data | : 97_01_28/1642.dv<br>: 18 min.<br>: 97/01/28 16:42<br>: VTR recording format |
| | Entry of fourth file | File name<br>File size<br>Recording start position<br>Type of recorded data | : 97_01_29/1233.dv<br>: 21 min.<br>: 97/01/29 12:33<br>: VTR recording format |
| | Entry of fifth file | File name<br>File size<br>Recording start position<br>Type of recorded data | : 97_01_29/2055.dv<br>: 24 min.<br>: 97/01/29 20:55<br>: VTR recording format |

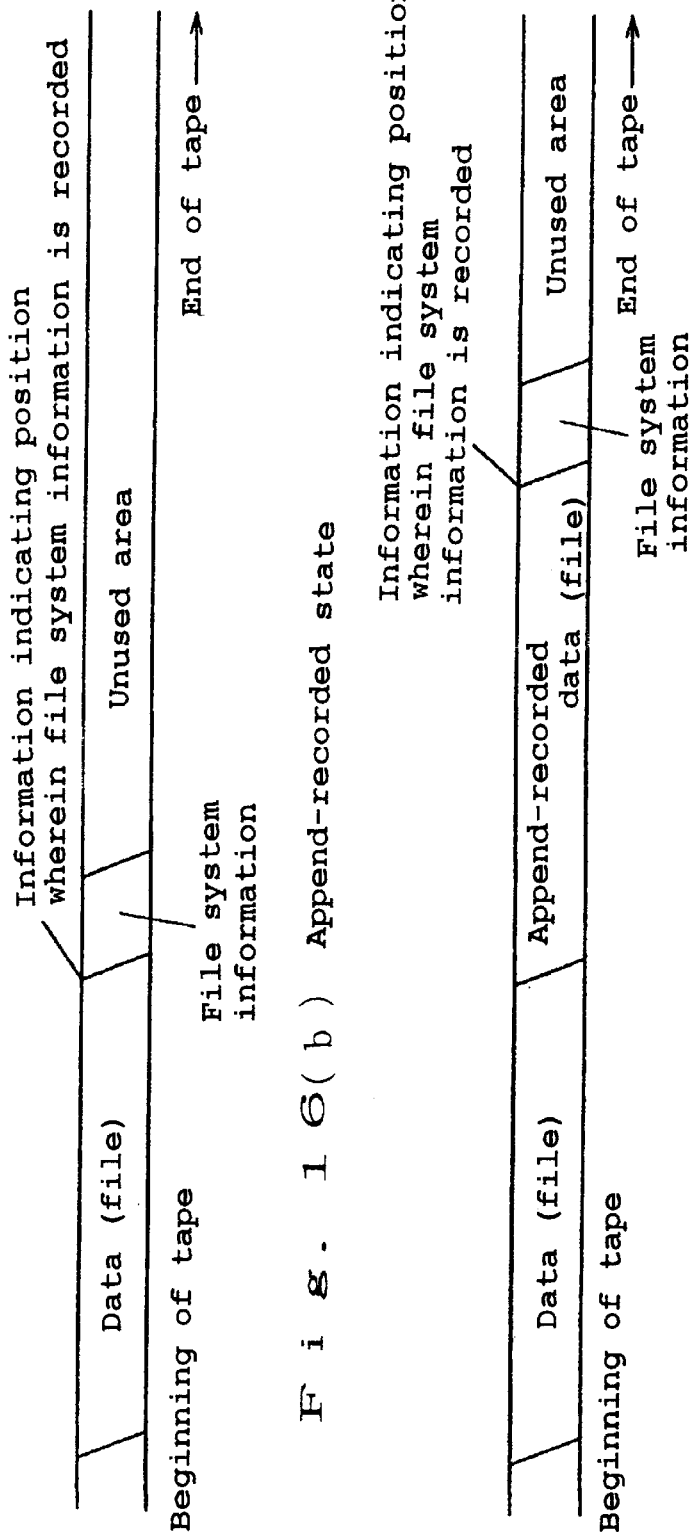

| | | | |
|---|---|---|---|
| Recording medium information | | ID<br>Label<br>Recording start position<br>Number of recorded files<br>Capacity<br>Log information | : XXXXXX<br>: ABCDEF<br>: 705,000<br>: 5<br>: 2,160,000 tracks |
| Individual file information | Entry of first file | File name<br>Recording start position<br>Type of recorded data<br>File Size<br>File Time<br><br>Transfer rate | : abc. dv<br>: 500<br>: VTR recording format (NTSC)<br>: 3,240,000,000 bytes<br>: 270,000 tracks<br>  (15 minutes or 27,000 frames<br>  may be acceptable.)<br>: 1 |
| | Entry of second file | File name<br>Recording start position<br>Type of recorded data<br>File Size<br>File Time<br><br>Transfer rate | : def. dv<br>: 270,100<br>: VTR recording format (PAL)<br>: 1,080,000,000 bytes<br>: 90,000 tracks<br>  (5 minutes or 7,500 frames<br>  may be acceptable.)<br>: 1 |
| | Entry of third file | File name<br>Recording start position<br>Type of recorded data<br>File Size<br>File Time<br><br>Transfer rate | : ghi. dv<br>: 361,500<br>: VTR recording format (HD)<br>: 864,000,000 bytes<br>: 72,000 tracks<br>  (2 minutes or 3,600 frames<br>  may be acceptable.)<br>: 2 |
| | Entry of fourth file | File name<br>Recording start position<br>Type of recorded data<br>File Size<br>File Time<br><br>Transfer rate<br>Maximum rate | : jkl. dv<br>: 434,000<br>: VTR recording format (MPEG)<br>: 5,184,000,000 bytes<br>: 135,000 tracks<br>  (15 minutes may be acceptable.)<br>: 1/2<br>: 9 Mbps |
| | Entry of fifth file | File name<br>Recording start position<br>Type of recorded data<br>File Size<br>File Time<br><br>Transfer rate<br>Maximum rate | : mno. dv<br>: 569,500<br>: VTR recording format (MPEG)<br>: 8,640,000,000 bytes<br>: 135,000 tracks<br>  (30 minutes may be acceptable.)<br>: 1/4<br>: 6 Mbps |

Fig. 17

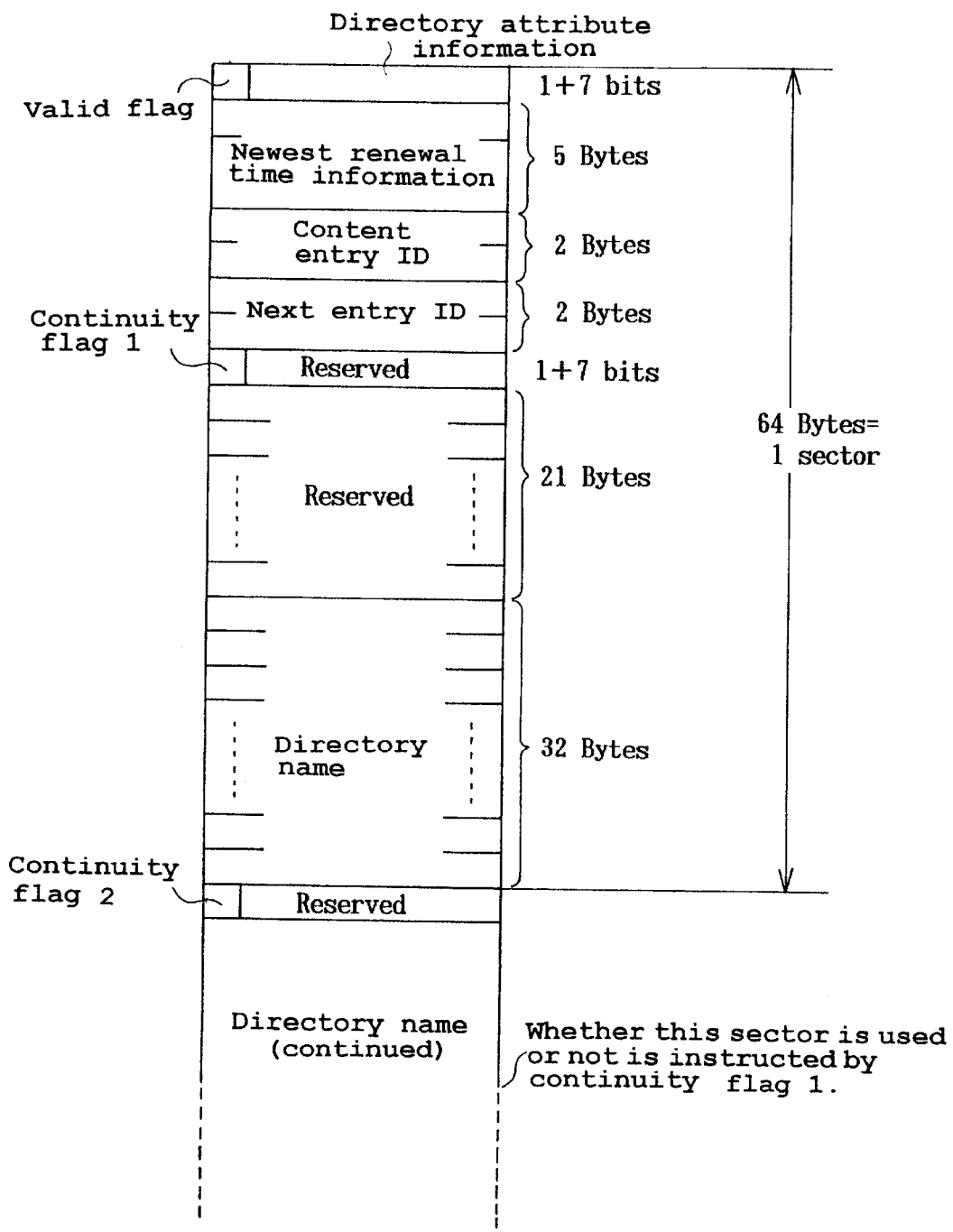

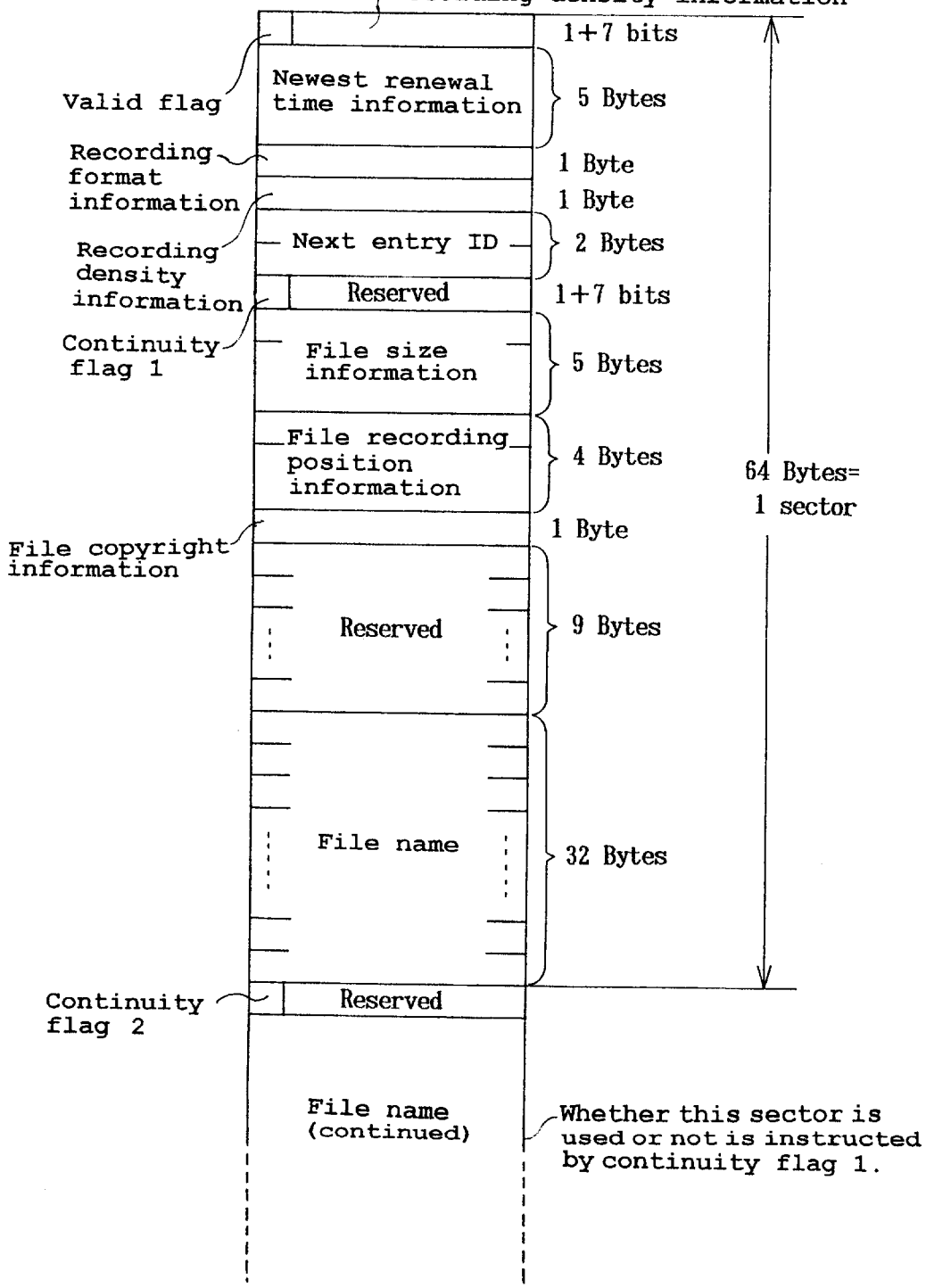

VN  Volume name
NU  Unassigined area information
DN  Directory name
DA  valid flag of directory
CE  Content entry ID
NE  Next entry ID
FN  File name
FA  valid flag of file Sector address

| # | | | | |
|---|---|---|---|---|
| 0 | VN : VOLUMEX | NU : 15 | | |
| 1 | DN : ROOT | DA : Y | CE : 2 | NE : NF |
| 2 | DN : DIR1 | DA : Y | CE : 5 | NE : 3 |
| 3 | DN : DIR2 | DA : Y | CE : NF | NE : 4 |
| 4 | DN : DIR3 | DA : Y | CE : 8 | NE : NF |
| 5 | DN : SUB11 | DA : Y | CE : 9 | NE : 6 |
| 6 | DN : SUB12 | DA : Y | CE : NF | NE : 7 |
| 7 | DN : SUB13 | DA : Y | CE : 10 | NE : 11 |
| 8 | DN : SUB31 | DA : Y | CE : NF | NE : NF |
| 9 | DN : SUB111 | DA : Y | CE : NF | NE : 12 |
| 10 | DN : SUB131 | DA : Y | CE : NF | NE : 14 |
| 11 | FN : FILE14 | FA : Y | | NE : NF |
| 12 | FN : FILE112 | FA : Y | | NE : 13 |
| 13 | FN : FILE113 | FA : Y | | NE : NF |
| 14 | FN : FILE132 | FA : Y | | NE : NF |
| 15 … n | Unassigned file system information recording area | | | |

Fig. 22

VN  Volume name
NU  Unassigined area information
DN  Directory name
DA  valid flag of directory
CE  Content entry ID
NE  Next entry ID
FN  File name
FA  valid flag of file Sector address

| # | | | | |
|---|---|---|---|---|
| 0 | VN : VOLUMEX | NU : 16 | | |
| 1 | DN : ROOT | DA : Y | CE : 2 | NE : NF |
| 2 | DN : DIR1 | DA : Y | CE : 5 | NE : 3 |
| 3 | DN : DIR2 | DA : Y | CE : NF | NE : 4 |
| 4 | DN : DIR3 | DA : Y | CE : 8 | NE : NF |
| 5 | DN : SUB11 | DA : Y | CE : 9 | NE : 6 |
| 6 | DN : SUB12 | DA : Y | CE : NF | NE : 7 |
| 7 | DN : SUB13 | DA : Y | CE : 10 | NE : 11 |
| 8 | DN : SUB31 | DA : Y | CE : NF | NE : NF |
| 9 | DN : SUB111 | DA : Y | CE : NF | NE : 12 |
| 10 | DN : SUB131 | DA : Y | CE : NF | NE : 14 |
| 11 | FN : FILE14 | FA : Y | | NE : 15 |
| 12 | FN : FILE112 | FA : Y | | NE : 13 |
| 13 | FN : FILE113 | FA : Y | | NE : NF |
| 14 | FN : FILE132 | FA : Y | | NE : NF |
| 15 | FN : FILEA | FA : Y | | NE : NF |
| n | Unassigned file system information recording area | | | |

Fig. 24

DATA RECORDING/REPRODUCING DEVICE, FILE MANAGING METHOD, FILE INFORMATION GENERATING METHOD, FILE MANAGING METHOD, MANAGEMENT INFORMATION GENERATING DEVICE, MANAGEMENT INFORMATION ANALYZING DEVICE, AND MEDIUM

SPECIFICATION

Data recording/reproducing apparatus, file management method, file system information generation method, file management method, file system information generation apparatus, file system information analysis apparatus and medium.

TECHNICAL FIELD

The present invention relates to a data recording/reproducing apparatus for recording/reproducing digital stream data. Furthermore, it relates to a data recording/reproducing apparatus for recording/reproducing digital video and audio stream data as files.

BACKGROUND ART

Various digital interfaces and peripheral apparatuses connected thereto have been developed at present. In addition, it has been increasing to control the peripheral apparatuses by using personal computers, thereby to record/reproduce video and audio signals.

In accordance with the progress of such technologies, problems described below at 1) to 6) have been caused. Those conventional technologies and problems related thereto will be described below.

1) A control apparatus and a conventional recording/reproducing apparatus connected thereto will be described. FIG. 43 is a block diagram showing the configuration of the conventional recording/reproducing apparatus. In FIG. 43, the numeral 401 represents a control apparatus, the numeral 402 represents a transmission line, the numeral 403 represents a recording/reproducing unit, the numeral 404 represents an operation panel, the numeral 415 represents an operation signal, the numeral 411 represents data, the numeral 413 represents a response, the numeral 412 represents a command, the numeral 408 represents a recording/reproducing apparatus, the numeral 406 represents an IEEE1394 Interface (hereinafter referred to as an I/F), the numeral 405 represents a processor, and the numeral 414 represents a control signal.

The operation of the recording/reproducing apparatus configured as described above will be described.

The control apparatus 401 is connected to the recording/reproducing apparatus 408 by the transmission line 402. In the transmission and reception of the data 411 and the command 412 between the control apparatus 401 and the recording/reproducing apparatus 408, the data 411 to be recorded is transmitted from the control apparatus 401 to the recording/reproducing unit 403 via the I/F 406, and the command 412 is transmitted to the processor 405 during transmission; the reproduced data 411 is transmitted from the recording/reproducing unit 403 to the control apparatus 401 via the I/F 406, and the response 413 to a specific command 412 required to be responded to the control apparatus 401 is transmitted in the same way from the processor 405 to the control apparatus 401 via the I/F 406 during reception. Furthermore, the operation panel 404 generates the operation signal 415 for instructing the operation of the recording/reproducing unit 403; the processor 405 outputs the control signal 414 for controlling the recording/reproducing unit 403 to the recording/reproducing unit 403; and the recording/reproducing unit 403 records the data 411 on a recording medium or reproduces the data 411 from the recording medium on the basis of the control signal 414.

In the above-mentioned conventional configuration, when the processor 405 receives the operation signal 415 generated by the operation panel 404 during the transmission/reception of the data 411 and the command 412 between the control apparatus 401 and the recording/reproducing apparatus 408, the processor 405 controls the recording/reproducing unit 403 on the basis of the operation signal 415, whereby trouble occurs during the transmission and reception, causing a problem of making the recording/reproducing apparatus 408 malfunction.

2) Furthermore, the contents of data recorded on a recording medium are generally grasped only by an individual who carried out recording; in addition, efforts to attach a seal to the recording medium, to put a list in a cassette case and keep them together, and the like are required. Besides, in actual reproduction, in the case when the recording medium is a tape, search for portions where data is recorded is required while checking the contents by fast forward operation, thereby causing a problem of improper operability.

3) Furthermore, when MS-DOS is taken as an example for explanation, such a data recording apparatus as a hard disk (hereinafter referred to as an HDD) of a conventional personal computer (hereinafter referred to as a PC) is configured to have a boot sector having physical characteristics of the disk and a routine for booting (starting) the computer, a file allocation table indicating locations where individual files are recorded on the disk in cluster units, a root directory wherein the entries of files and subdirectories are recorded, and a file area wherein subdirectories and data are recorded, thereby being capable of recording files.

A file entry used as information regarding a file comprises information of 32 bytes including a file name (eight bytes), an extension (three bytes), a file attribute (1 byte), a creation date and time or the last renewal date and time (four bytes), a recording position (two bytes) indicated by the first cluster number, a file size (four bytes), etc. Among these, the file attribute is information for indicating what kind of characteristics the file has, and the individual bits thereof are supposed to indicate file/read-only/hidden file/system file/volume label/subdirectory/archive file, etc. Furthermore, the extension indicates what kind of computer software the file is compatible with.

In actual operation, the PC transmits commands to the HDD, and a data reading instruction and data the number of bytes of which has been designated are transmitted, whereby file data is read; in a similar way, a data writing instruction and data the number of bytes of which has been designated are received, whereby file data can be written. In reading/writing files, instructions are not issued in file units, but a proper byte length is designated and data is transferred; furthermore, since instruction issuing timing is not controlled, the transfer rate of file data is not constant. The rate depends on the inherent transfer rate of the HDD and the processing speed of the PC; furthermore, when the PC is carrying out another process, the processing speed of the PC may be affected thereby.

This kind of system cannot treat data required to have a real-time characteristic, in particular, video data, audio data, etc; however, since data treated by computers at present includes a lot of data required to have a real-time characteristic, such as video and audio data, the above-mentioned system is improper.

Furthermore, in the case when data is transferred to a sequentially recording/reproducing medium such as a tape instead of the HDD, repositioning, that is, a method wherein operation, interruption, slight rewinding and operation once again are repeated, is carried out to adjust the difference between the transfer rate and recording rate; however, since this operation takes time, and the actual transfer rate becomes lower. To solve this problem, a method of preventing the repositioning is available wherein the difference between the transfer rate and the recording rate is recorded as a dummy; however, if recording is carried out in accordance with this method, the amount of data treated in byte units is changed; when data is copied or moved between different recording media, checking empty areas and the like cannot be accomplished, even if attempted.

4) Furthermore, a home-use digital VCR "DV" (Digital Video) using a magnetic tape is available as a medium for storing multimedia information including video and audio data at present. It is now under consideration to connect this DV to a PC and to use it as a recording medium for the PC, just as a hard disk, a floppy disk, etc. existing at present.

In the case when data on an existing recording medium is treated in a file format, a file management system (hereinafter referred to as a file system) peculiar to each recording medium is required, just as FAT (File Allocation Table) for a hard disk and a floppy disk, or CDFS for a CD-ROM. However, no file system is available for-the DV at present.

It is herein thought to adopt an existing file system, such as the FAT or CDFS, for the DV. However, the FAT and CDFS are file systems for media capable of carrying out random access, such as magnetic disks and magneto-optic disks; if the above-mentioned existing file systems are adopted for a medium like a magnetic tape for the DV and the like wherein sequential access is carried out basically, a problem of requiring longer time for access or the like is caused.

5) Furthermore, the MPEG2-coding system is one of typical compression formats of video/audio information; in order to transmit this, the MPEG2-TS (Transport Stream) Standard is available, and there is a method wherein MPEG2-coded audio/video information is divided into packets referred to as transport packets having a fixed length and then transmitted.

In the MPEG2-TS Standard, jitter is strictly required to be within ±30 ppm with respect to the arrival timing of a packet; in order to receive and record transmitted data by a recording/reproducing apparatus, to retransmit data reproduced by the recording/reproducing apparatus, to receive the data by a decoder and then to output images, the restoration of the packet output timing at the time of reception becomes a problem.

When transmitting transport packets by using a digital interface stipulated as IEEE1394 as a transmission line, a four-byte transmission time stamp is generated for each transport packet by an apparatus on the transmission side by using a CTR (Cycle Time Register) wherein 24.576 MHz count value used as the clock of the IEEE1394 transmission line is retained. Since the transmission time stamp is used to stipulate the timing when output is carried out from the receiving means of an apparatus for receiving the MPEG-TS signal to the inside of the apparatus, it is generated by calculating offset values such as a delay due to the buffer of the transmission means of a signal source, a delay due to the transmission line, and a delay due to the buffer of the reception means of the reception apparatus. A source packet is formed by adding the transmission time stamp to each transport packet of 188 bytes, and the packets are divided/connected in accordance with transmission ranges in the IEEE1394 transmission line and transmitted by isochronous communication wherein the real-time characteristic can be maintained.

The recording/reproducing apparatus generates timing information referred to as a recording time stamp on the basis of 27 MHz, i.e., the operation clock of the recording/reproducing apparatus so that the transmission time interval between packets at the time of recording can be maintained at the time of reproduction; and the information is added to the transport packets and recorded.

If a difference occurs between the operation clock of the recording/reproducing apparatus and the operation clock of a transmission destination, the difference accumulates during long-time recording, and data overflow or underflow occurs, whereby recording cannot be carried out properly; therefore, the operation clock of the recording/reproducing apparatus is required to follow the operation clock of the transmission destination. For this purpose, the content of each transport packet is analyzed, and the operation clock of the recording/reproducing apparatus is generated from the PCR (Program Clock Reference) value included therein by using a PLL (Phase Locked Loop) circuit.

At the time of reproduction, the recording/reproducing apparatus restructures transport packets, restores the same time interval between packets as that at the time of recording on the basis of the recording time stamp added to each restructured transport packet and the count value of the operation clock of the recording/reproducing apparatus, regenerates and adds the transmission time stamp, and carries out output and transmission to the IEEE1394 transmission line.

The packets transmitted from the recording/reproducing apparatus are received by the MPEG decoder, and transport packets are restructured. If a difference occurs between the operation clock of the recording/reproducing apparatus and the operation clock of the MPEG decoder at this time just as at the time of recording, data overflow or under flow occurs during long-time reproduction, whereby reproduction cannot be carried out properly; therefore, the operation clock of the decoder is required to follow the operation clock of the recording/reproducing apparatus. For this purpose, the content of each transport packet is analyzed, and the operation clock of the MPEG decoder is generated from the PCR (Program Clock Reference) value included therein by using a PLL (Phase Locked Loop) circuit.

As described above, in the conventional recording/reproducing apparatus, the restoration of the output timing by the detection of the transmission time stamp, and the restoration of 27 MHz clock by the analysis of a transport packet header and PCR, the generation and addition of the recording time stamp are required, and the apparatus has a disadvantage of becoming larger in size to carry out transmission, recording and reproduction. In particular, the analysis of the MPEG header requires simplified decoding, and the apparatus becomes larger in size. In the recording/reproducing apparatus which is supposed not to have any MPEG decoding means therein so that decoding is carried out by an external decoder, this impairs the essential purpose of reducing the size of the apparatus by not having any decoding means.

6) Furthermore, as PCs are improved in performance, data required to be treated in real time as video/audio data is increasingly treated by the PCs. The IEEE1394 is available as an interface for this purpose. Video/audio data can be transmitted in real time by using isochronous transmission wherein data is kept transmitted at nearly regular intervals, that is, one of the transmission modes of the IEEE1394.

Furthermore, the IEEE1394 is provided for the home-use digital VCR "DV" (Digital Video); by connecting it to a PC provided with the IEEE1394, data transmission can be carried out between the PC and the DV, and operation control for the DV can be carried out from the PC.

Furthermore, a hard disk has been used conventionally as a recording medium of a PC, and data transfer between two hard disks are carried out as described below.

A processor transmits a reading command to a SCSI I/F circuit; after receiving the reading command, the SCSI I/F circuit reads data having a predetermined size from one of the hard disks, and writes the data in a memory. Next, the processor transmits a writing command to the SCSI I/F circuit; after receiving the writing command, the SCSI I/F circuit takes out all data or only the required data written in the memory, and writes the data on the other hard disk. Furthermore, when data is transferred, the above-mentioned operation is repeated as necessary.

However, in the above-mentioned conventional configuration, when data is read from a hard disk, only the predetermined size of data can be read each time one reading command is issued from the processor; when reading more amount of data, a reading command is required to be issued newly. In the case when writing on a hard disk is carried out after reading from the hard disk is completed, and data reading from the hard disk is followed, it is necessary to wait for the completion of the writing. Therefore, a wait period is required when reading data from the hard disk.

Since data transfer is carried out in accordance with a data request from the SCSI I/F interface, the above-mentioned SCSI hard disk operates with no problem; however, in the case when a DV is used instead of one of the hard disks, and when the IEEE1394 Interface is used instead of the SCSI I/F, data packets having a predetermined size are transmitted/received nearly periodically; therefore, a problem of causing data loss is apt to occur during the wait period.

As described above, the various conventional technologies have the above-mentioned problems.

DISCLOSURE OF INVENTION

The present invention has the following objects, solving means and effects.

1) The present invention is intended to solve the above-mentioned problems, and it is also intended to provide a data recording/reproducing apparatus which, during transmission/reception between a control apparatus and the recording/reproducing apparatus, is capable of preventing the above-mentioned transmission/reception from malfunctioning by inputting an operation signal generated by an operation panel to a processor in the case when the control apparatus controls the recording/reproducing apparatus.

Claims

One aspect of the invention is a recording/reproducing apparatus comprising:

a transmission/reception means for transmitting/receiving data and command signals from a transmission line;

a recording/reproducing means for recording data received from said transmission/reception means on a recording medium during reception and for transmitting data reproduced from said recording medium to said transmission/reception means during transmission;

an operation means for generating an operation signal for determining the operation of said recording/reproducing means;

a control means for controlling said recording/reproducing means in accordance with said command signals or said operation signal; and a switching signal generation means for outputting a switching signal for determining whether said operation signal is valid or invalid to said control means, wherein said switching signal generation means outputs an operation means valid signal for validating said operation signal to said control means as said switching signal in the case when a command received from said transmission/reception means is a first command, and said switching signal generation means outputs an operation means invalid signal for invalidating said operation signal to said control means as said switching signal in the,case when a command received from said transmission/reception means is a second command, and said control means validates said operation signal output from said operation means in the case of receiving said operation means valid signal, and said control means invalidates said operation signal output from said operation means in the case of receiving said operation means invalid signal.

Another aspect of the invention is a recording/reproducing apparatus comprising:

a transmission/reception means for transmitting/receiving data and command signals from a transmission line, and generating a transmission line reset signal in the case when the connection of said transmission line is disconnected;

a recording/reproducing means for recording data received from said transmission/reception means on a recording medium during reception and for transmitting data reproduced from said recording medium to said transmission/reception means during transmission;

an operation means for generating an operation signal for determining the operation of said recording/reproducing means;

a control means for controlling said recording/reproducing means in accordance with said command signals or said operation signal; and a switching signal generation means for outputting a switching signal for determining whether said operation signal is valid or invalid to said control means, wherein said switching signal generation means outputs an operation means valid signal for validating said operation signal to said control means as said switching signal in the case of receiving said transmission line reset signal from said transmission/reception means, and said control means validates said operation signal output from said operation means in the case of receiving said operation means valid signal.

Still another aspect of the present invention is a recording/reproducing apparatus comprising:

a transmission/reception means for transmitting/receiving data and command signals, and for receiving manufacturer information from a transmission line;

a recording/reproducing means for recording data received from said transmission/reception means on a recording medium during reception and for transmitting data reproduced from said recording medium to said transmission reception means during transmission;

an operation means for generating an operation signal for determining the operation of said recording/reproducing means;

a control means for controlling said recording/reproducing means in accordance with said command signals or said operation signal;

a switching signal generation means for outputting a switching signal for determining whether said operation signal is valid or invalid to said control means; and a memory for comparing said manufacturer information with specific manufacturer information stored in itself, and outputs a specific manufacturer information reception signal in the case of coincidence;

wherein said switching signal generation means outputs an operation means invalid signal for invalidating said operation signal to said control means as said switching signal in the case of receiving said specific manufacturer information reception signal from said memory, and said control means invalidates said operation signal output from said operation means in the case of receiving said operation means invalid signal.

Yet another aspect of the present invention is a recording/reproducing apparatus comprising:

a transmission/reception means for transmitting/receiving data and command signals from a transmission line;

a recording/reproducing means for recording data received from said transmission/reception means on a recording medium during reception and for transmitting data reproduced from said recording medium to said transmission/reception means during transmission;

an operation means for generating an operation signal for determining the operation of said recording/reproducing means;

a control means for controlling said recording/reproducing means in accordance with said command signals or said operation signal;

a switching signal generation means for outputting a switching signal for determining whether said operation signal is valid or invalid to said control means; and a binary switch for outputting a binary signal, wherein said switching signal generation means generates said operation means invalid signal only when said binary signal is a predetermined value, and said control means invalidates said operation signal output from said operation means in the case of receiving said operation means invalid signal.

In accordance with the present invention, even if the operation signal generated by the operation panel is transmitted to the processor during the transmission/reception of data and commands between the control apparatus and the recording/reproducing apparatus, the processor controls the recording/reproducing unit on the basis of the switching signal generated by the switching signal generation unit, whereby the recording/reproducing apparatus can be prevented from malfunctioning.

2) Furthermore, in view of the above-mentioned problems of the conventional data recording apparatus, the present invention is intended to provide a data recording/reproducing apparatus, a file generation method and a file management method capable of generating file system information and controlling the generated files so that contents recorded on a recording medium can be confirmed more easily than ever before Still yet another aspect of the present invention is a file system information generation method comprising:

a step of reproducing a recording medium on which record information regarding the division of recording target data and/or regarding the recording date and time of said data added to said recording target data is recorded;

a step of extracting said record information from data recorded on said recording medium;

a step of judging the division positions of said recording target data from said extracted record information on the basis of a predetermined reference; and a step of generating file system information including data divided at said division positions.

A further aspect of the present invention is a data recording apparatus comprising:

a recording means for recording, on a predetermined recording medium, record information regarding the division of said recording target data and/or regarding the recording date and time of said data added to said recording target data;

a reproducing means for reproducing said recording medium;

an extraction means for extracting said record information from said recording target data recorded on said recording medium; and a filing means for judging the division positions of data recorded on said recording medium on the basis of a predetermined reference from said record information extracted from said extraction means.

A still further aspect of the present invention is a file management method comprising:

a step of recording subsequent data after data having already been recorded on a recording medium on the basis of predetermined recording start position information;

a step of recording and controlling information indicating the recording end position of said subsequent data as said recording start position information for starting the recording of subsequent data;

a step of generating file system information regarding all of said recorded data; and a step of recording said generated file system information after said subsequent data.

A yet further aspect of the present invention is a file management method comprising:

a step of recording subsequent data after data having already been recorded on a recording medium on the basis of predetermined recording start position information;

a step of generating file system information regarding all of said recorded data;

a step of repeatedly recording said generated file system information in a plurality of areas after the recording end position of said subsequent data; and a step of recording and controlling information indicating predetermined positions among said plural areas as said recording start position information for starting the recording of said subsequent data.

A still yet further aspect of the present invention is a file management method comprising:

a step of recording subsequent data after data having already been recorded on a recording medium on the basis of predetermined recording start position information in a recording apparatus for recording data in one or more divided areas and for recording information regarding positions wherein said areas are recorded;

a step of generating file system information regarding all of said recorded data;

a step of recording said generated file system information as areas different from said subsequent data after said subsequent data; and a step of recording and controlling information indicating the recording end position of said file system information as said recording start position information for starting the recording of subsequent data.

One aspect of the present invention is a data recording apparatus for starting recording data from the practical head of a recording medium and for recording recording end position information indicating the end position of said recording, comprising:

a file system information generation means for generating file system information regarding said data;

a first recording means for recording said data and said file system information; and a second recording means for recording said recording end position information.

In accordance with the present invention, it has an advantage wherein contents recorded on a recording medium can be confirmed more easily than ever before. By recording file system information, data to be recorded can be filed and controlled; when reproduction is attempted after this cassette is ejected once, the contents recorded on the recording medium can be confirmed easily. Furthermore, processes such as dubbing, editing, deletion, division and the like of recorded data can also be carried out easily by indicating a file as a unit. Moreover, when data on the display screen is used as file system information, the content of the data can be confirmed by video, and therefore, can be confirmed easily. In addition, compatibility with a conventional data recording apparatus can be attained. The above-mentioned effects are provided, and their practical effects are significant.

3) Furthermore, in view of the above-mentioned conventional problems, the present invention is intended to provide a data recording/reproducing apparatus and a file management method capable of carrying out file management capable of treating data having a real-time characteristic.

Another aspect of the present invention relates to a file management method for a system for recording, on a recording medium, the medium information of the above-mentioned recording medium itself, one or more files and file system information for each of the above-mentioned files, wherein the above-mentioned file system information has real-time characteristic identification information for indicating whether data in files has a real-time characteristic or not.

Still another aspect of the present invention is a file management method for a system for recording, on a recording medium, the medium information of said recording medium itself, one or more files and file system information for each of said files, wherein rate information indicating the original data rate of data is used for files including data having a real-time characteristic as said file system information.

Yet another aspect of the present invention is a file management method for a system for recording, on a recording medium, the medium information of said recording medium itself, one or more files and file system information for each of said files, wherein in the case when the original data rate of data is variable, the maximum rate information indicating the maximum data rate among said rates is used for files including data having a real-time characteristic as said file system information.

A Further another aspect of the present invention is a file management method for a system for recording, on a recording medium, the medium information of said recording medium itself, one or more files and file system information for each of said files, wherein file size information indicating a time required for the original data rate of data is used for files including data having a real-time characteristic as said file system information.

A further aspect of the invention is a data control apparatus comprising a transfer means for transmitting control instructions to a data recording/reproducing apparatus for recording/reproducing one or more pieces of digital data, and for transmitting/receiving data, wherein said transfer means transmits/receives data for files including data having a real-time characteristic at a transfer rate set on the basis of information regarding data rates used as file file system information.

In accordance with the present invention, by recording file system information, data having a real-time characteristic, such as video and audio data, can be treated. Furthermore, even data having a variable transfer rate can be treated in consideration of the difference between the transfer rate and recording rate. The practical effect of the present invention is significant in a present situation wherein various video and audio data as well as simple numeral data and text data are increasingly being used as data to be treated as files.

4) Furthermore, in view of the above-mentioned conventional problems, the present invention is intended to provide a file system information generation apparatus and a file system information analysis apparatus for generating file system information constituting a DV file system required to record and control computer data in a file format on a DV and for recording the information at a predetermined position on a tape.

A still further aspect of the present invention is a file system information generation apparatus for generating file system information for controlling data recorded on a recording medium, wherein the minimum structural unit of said data is a file, and the maximum structural unit of said data is a volume, said volume is a first hierarchical level, a second hierarchical level is a root directory, and plural hierarchical levels from a third hierarchical level to the Mth ($M \geq 3$) hierarchical level are files or directories, thereby providing plural hierarchical levels, said file system information is formed of information comprising entries used as units, each of said entries has an entry ID for identification of each, an entry is generated from information for controlling said volume, an entry is generated for each of said directories from information for controlling said directories, an entry is generated for each of said files from information for controlling said files, said volume entry has information regarding said entry ID of said root directory, each of said entries generated for directories has information regarding the entry ID of said entry generated for a directory belonging to said directory or the entry ID of said entry generated for a file belonging to said directory as a content entry ID, each of said entries generated for files and each of said entries generated for directories have information regarding the entry ID of said entry generated for a file or a directory belonging to a directory to which said file or said directory belong as a next entry ID, and all files or directories under said volume are designated once by said next entry IDs and said content entry IDs.

A yet further aspect of the invention is a file system information analysis apparatus for analyzing file system information for controlling data recorded on a recording medium, wherein said entries generated for said volume, directories and files are analyzed from file system information generated such that:

the minimum structural unit of said data is a file, the maximum structural unit of said data is a volume, said volume is a first hierarchical level, a second hierarchical level is a root directory, and plural hierarchical levels from a third hierarchical level to the Mth (M≧3) hierarchical level are files or directories, thereby providing plural hierarchical levels, said file system information is formed of information comprising entries used as units, each of said entries has an entry ID for identification of each, an entry is generated from information for controlling said volume, an entry is generated for each of said directories from information for controlling said directories, an entry is generated for each of said files from information for controlling said files, said volume entry has information regarding said entry ID of said root directory, each of said entries generated for directories has information regarding the entry ID of said entry generated for a directory belonging to said directory or the entry ID of said entry generated for a file belonging to said directory as a content entry ID, each of said entries generated for files and each of said entries generated for directories have information regarding the entry ID of said entry generated for a file or a directory belonging to a directory to which said file or said directory belong as a next entry ID, and all files or directories under said volume are designated once by said next entry IDs and said content entry IDs.

In accordance with the present invention, just as conventional magnetic disc media such as hard disks, floppy disks and CD-ROMs, even magnetic tape media for a DV and the like can treat file format data. In addition, it is possible to generate file system information for controlling file format data and to analyze the generated file system information.

5) Furthermore, the present invention is intended to solve the above-mentioned problems, thereby being capable of restoring packet output timing during reproduction by using minimal additional circuits in the case of recording MPEG2data, and being capable of recording data in the MPEG2transport stream format while the existing digital VCR "DV" (Digital Video) format is utilized in particular.

A still yet further aspect of the present invention is a recording/reproducing apparatus for receiving and recording digital data transmitted via a transmission line, and for reproducing and transmitting said recorded digital data to said transmission line, wherein when each packet constituting said digital data is transmitted through said transmission line, said each packet is generated on the basis of output timing from a signal source to a transmission means connected to said transmission line, and a transmission time stamp used as information added to all or part of said packets is recorded while being kept added to each of said packets.

One aspect of the present invention is a recording/reproducing apparatus for receiving and recording digital data transmitted via a transmission line, and for reproducing and transmitting said recorded digital data to said transmission line, wherein the type of said digital data is discriminated, depending on said type, switching is carried out between recording with said transmission time stamp kept added to said each packet constituting said digital data and recording without said time stamp, and information indicating whether said time stamp has been added or not is also recorded.

21-th present invention (corresponding to claim 58) is a recording/reproducing apparatus for receiving and recording digital data transmitted via a transmission line, and for reproducing and transmitting said recorded digital data to said transmission line, wherein the type of said digital data is discriminated, depending on said type, switching is carried out between recording with said transmission time stamp kept added to said each packet constituting said digital data and recording without said time stamp, and information indicating whether said time stamp has been added or not is also recorded.

In accordance with the present invention, packet output timing during reproduction can be restored by using minimal additional circuits in the case of recording MPEG2data. Furthermore, data in the MPEG2transport stream format can be recorded while compatibility with the existing digital VCR format is maintained in particular.

6) Furthermore, in view of these conventional problems, the present invention is intended to provide a method of writing stream data being kept output at nearly regular intervals at all times on a recording medium without data loss in a PC, and a method of reading data from the recording medium and transmitting the data as stream data being kept transmitted at nearly regular intervals at all times in the PC.

A another aspect of the present invention is a method of writing stream data on a recording medium in a system comprising:

a stream data output unit for continuously outputting data at all times at substantially regular intervals;

a first interface for receiving said stream data;

a recording medium;

a second interface for writing data on said recording medium;

a memory for temporarily storing data;

a processor for controlling the operation of said first interface and said second interface; and a bus for connecting said first interface, said second interface, said memory and said processor, wherein said processor transmits a reception command to said first interface and a writing command to said second interface, respectively, after receiving said reception command, said first interface sequentially writes said received stream data in said memory through said bus, and after receiving said writing command, said second interface sequentially reads a necessary portion from said stream data written in said memory through said bus, and writes said portion in said recording medium.

Still another aspect of the present invention is a method of writing stream data on a recording medium in a system comprising:

a stream data output unit for continuously outputting data at all times at nearly regular intervals after receiving an output start command;

a first interface for receiving said stream data and transmitting a control command to said stream data output unit;

a recording medium;

a second interface for writing data on said recording medium;

a memory for temporarily storing data;

a processor for controlling the operation of said first interface and said second interface, for generating the control command of said stream data output unit, and for outputting to said first interface; and a bus for connecting said first interface, said second interface, said memory and said processor, wherein said processor transmits a reception command to said first interface and a writing command to said second interface, respectively, after transmitting said output start command as said control command to said stream data output unit through said first interface, after receiving said reception command, said first interface sequentially writes said received stream data in said memory through said bus, after receiving said writing command, said second interface sequentially reads a necessary portion from said stream data written in said memory through said bus, and writes the portion in said recording medium, in the case when necessary data cannot be written completely at the time of writing on said recording medium, said processor transmits a data retransmission command as said control command to said stream data output unit through said first interface, said first interface sequentially writes said received steam data in said memory through said bus, and said second interface reads a portion not written at the last time from said stream data written in said memory through said bus, and writes said portion on said recording medium.

Yet another aspect of the present invention is a method of reading stream data from a recording medium in a system comprising:

a stream data input unit for continuously outputting data at all times at substantially regular intervals;

a first interface for transmitting said stream data;

a recording medium;

a second interface for reading data from said recording medium;

a memory for temporarily storing data;

a processor for controlling the operation of said first interface and said second interface; and a bus for connecting said first interface, said second interface, said memory and said processor, wherein said processor transmits a transmission command to said first interface and a reading command to said second interface, respectively, after receiving said reading command, said second interface reads data from said recording medium, and writes through said bus, and after receiving said transmission command, said first interface reads data written in said memory through said bus, and transmits as said stream data to said stream data input unit.

In accordance with the present invention, once the processor issues the reception command and the writing command, the process of the IEEE1394 Interface and the process of the SCSI Interface are conducted in parallel, whereby all of the received data or required data among the received data can be written completely on the hard disk.

In addition, once the processor issues the reception command and the writing command, the process of the IEEE1394 Interface and the process of the SCSI Interface are conducted in parallel; furthermore, in the case when a data loss occurs, the processor transmits the retransmission command to the DV, whereby the same data is received a plurality of times to recover the lost data, and the required data can thus be written in the hard disk completely.

Moreover, once the processor issues the transmission command and the reading command, the process of the IEEE1394 Interface and the process of the SCSI Interface are conducted in parallel, whereby data read from the hard disk can be transmitted to the DV via the IEEE1394 Interface without interruption.

BRIEF DESCRIPTION OF DRAWINGS

FIG. 7 is a view of an example of individual file information/cassette information generated/controlled by the recording apparatus in accordance with the fifth embodiment;

FIGS. 16(a) to 16(b) are a view of an example of a condition of a recording medium on which recording is carried out by the data recording/reproducing apparatus in accordance with the tenth embodiment;

FIG. 17 is a view showing an example of file system information/medium information generated/controlled in accordance with the tenth embodiment;

FIGS. 20(a) to 20(c) are a view showing an example of each entry generated by a file system information generation apparatus in accordance with the twelfth embodiment;

FIG. 22 is a view showing file system information comprising entries;

FIG. 24 is a view showing file system information comprising entries;

BEST MODE FOR CARRYING OUT THE INVENTION

Embodiments in accordance with the present invention will be described below referring to FIGS. 1 to 42.

Embodiment 1

Figure 1:
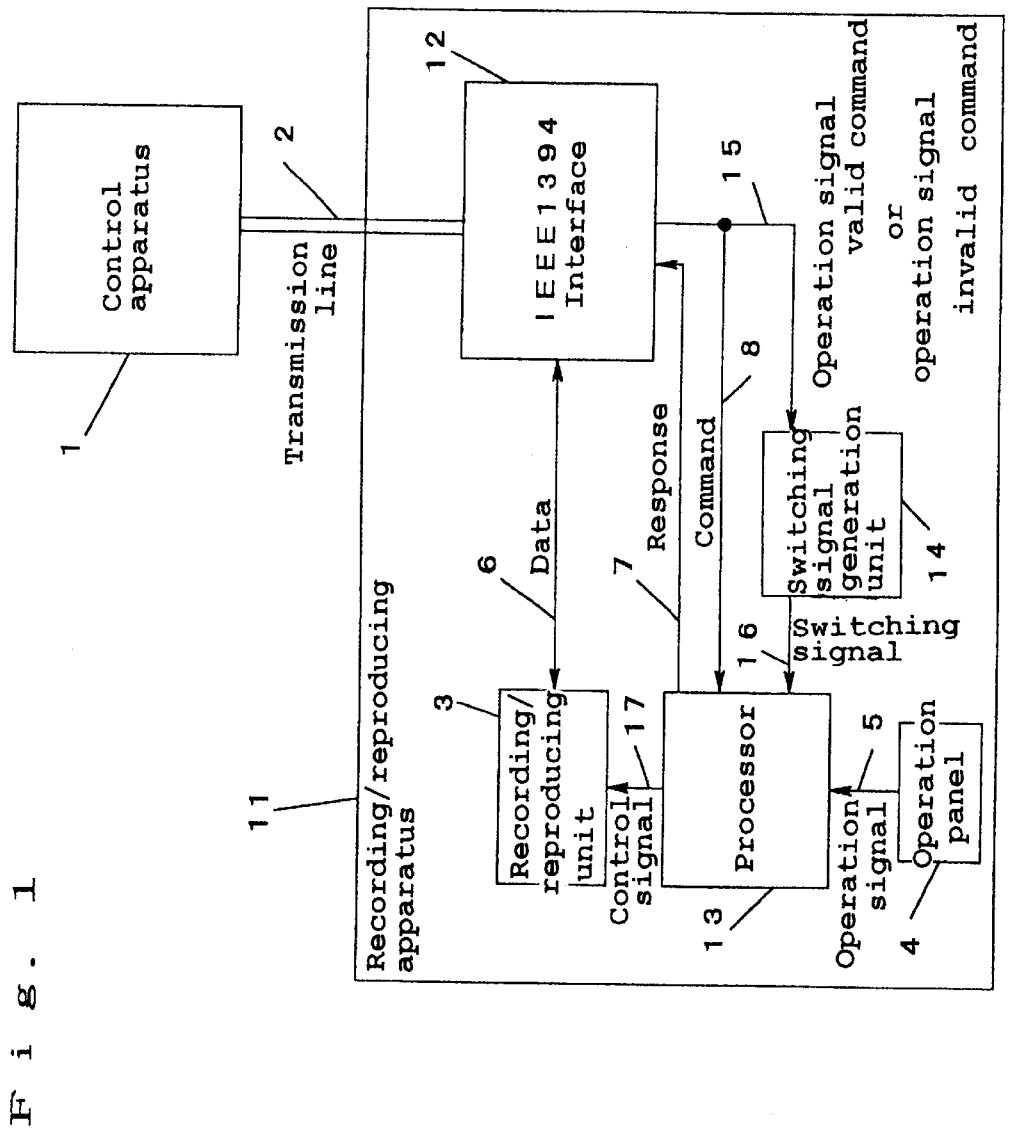
FIG. 1 is a block diagram in accordance with a first embodiment of the present invention.

FIG. 1 is a block diagram in accordance with a first embodiment of the present invention; in FIG. 1, the numeral 1 represents a control apparatus, the numeral 2 represents a transmission line, the numeral 3 represents a recording/reproducing unit, the numeral 4 represents an operation panel, the numeral 5 represents an operation signal, the numeral 6 represents data, the numeral 7 represents a response, the numeral 8 represents a command, the numeral 11 represents a recording/reproducing apparatus, the numeral 12 represents an IEEE1394 Interface (hereinafter referred to as an I/F), the numeral 13 represents a processor, the numeral 14 represents a switching signal generation unit, the numeral 15 represents an operation signal valid command or an operation signal invalid command, the numeral 16 represents a switching signal, and the numeral 17 represents a control signal.

In the recording/reproducing apparatus configured as described above, its operation will be described below.

In the transmission and reception of the data 6 and the command 8 between the control apparatus 1 and the recording/reproducing apparatus 11, the data 6 to be recorded is transmitted from the control apparatus 1 to the recording/reproducing unit 3 via the I/F 12, and the command 8 is transmitted to the processor 13 and the switching signal generation unit 14 during transmission; and the reproduced data 6 is transmitted from the recording/reproducing unit 3 to the control apparatus 1 via the I/F 12, and the response 7 to a specific command 8 required to be responded to the control apparatus 1 is transmitted in the same way from the processor 13 to the control apparatus 1 via the I/F 12 during reception. Furthermore, the operation panel 4 generates the operation signal 5 for determining the operation of the recording/reproducing unit 3.

The switching signal generation unit 14 generates the switching signal 16 for switching the operation signal 5 to its valid or invalid state; the processor 13 outputs the control signal 17 for controlling the recording/reproducing unit 3 on the basis of the switching signal 16 to the recording/reproducing unit 3; and the recording/reproducing unit 3 records the data 6 on a recording medium or reproduces the data 6 from the recording medium on the basis of the control signal 17.

In the above-mentioned configuration, in the case when the operation signal invalid command 15 is present among the commands 8 received from the control apparatus 1 via the I/F 12, the switching signal generation unit 14 outputs an operation panel invalid signal for invalidating the operation signals 5 generated subsequently at the operation panel 4 as the switching signal 16 to the processor 13, and priority is given to subsequent commands 8; after all the commands 8 are processed completely, the operation signal valid command 15 is output, and an operation panel valid signal for validating the operation signals 5 generated subsequently at the operation panel 4 is output as the switching signal 16 to the processor 13. And the processor 13 validates or invalidates the operation signal 5 on the basis of the switching signal 16; when valid, the recording/reproducing unit 3 is controlled on the basis of the operation signal 5; and when invalid, the recording/reproducing unit 3 is controlled on the basis of a specific command 8 for controlling the recording/reproducing unit 3 among the commands 8 received from the control apparatus 1 via the I/F 12.

Therefore, even if the operation signal 5 generated at the operation panel 4 during the transmission/reception of the data 6 and the command 8 between the control apparatus 1 and the recording/reproducing apparatus 11 is transmitted to the processor 13, the processor 13 controls the recording/reproducing unit 3 on the basis of the switching signal 16 generated by the switching signal generation unit 14, whereby the recording/reproducing apparatus 11 can be prevented from malfunctioning.

The present invention is applicable even when the above-mentioned control apparatus 1 is an editing apparatus, and the present invention is also applicable even when an interface other than the above-mentioned IEEE1394 I/F 12 is used. Furthermore, generally speaking, instead of the operation panel installed in the recording/reproducing apparatus, a remote controller having the same function can carry out control; however, by invalidating an operation signal from the remote controller just as invalidating the operation signal from the operation panel, it is possible to obtain the same effect of preventing the recording/reproducing apparatus from malfunctioning because of the operation signal supplied from the remote controller while the data/command is transmitted or received between the control apparatus and the recording/reproducing apparatus.

Embodiment 2

Figure 2:
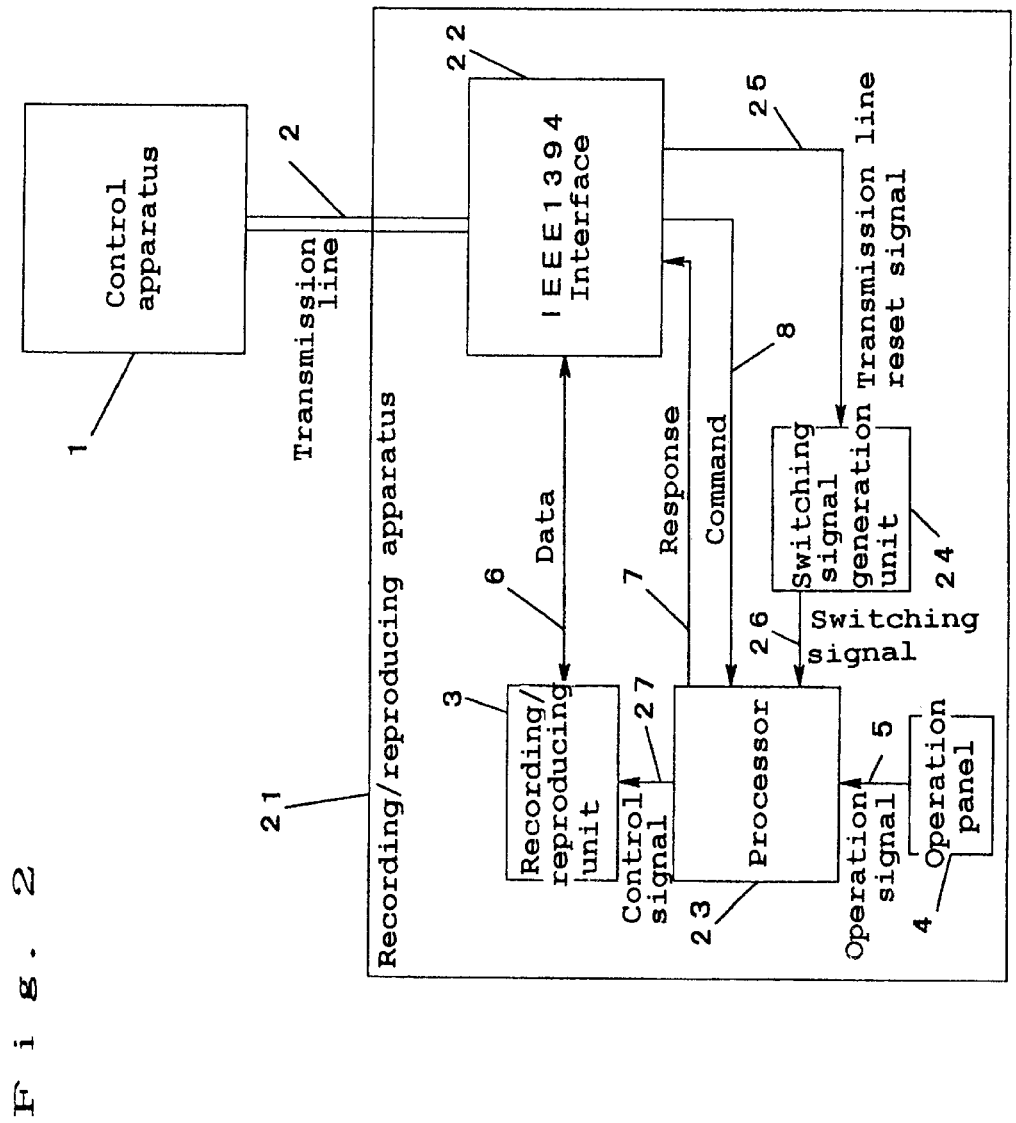
FIG. 2 is a block diagram in accordance with a second embodiment of the present invention.

FIG. 2 is a block diagram in accordance with a second embodiment of the present invention; in FIG. 2, the numeral 21 represents a recording/reproducing apparatus, the numeral 22 represents an IEEE1394 Interface (hereinafter referred to as an I/F), the numeral 23 represents a processor, the numeral 24 represents a switching signal generation unit, the numeral 25 represents a transmission line reset signal, the numeral 26 represents a switching signal, and the numeral 27 represents a control signal. In FIG. 2, the same portions as those of the recording/reproducing apparatus of FIG. 1 are represented by the same numerals, and their descriptions are omitted.

In the recording/reproducing apparatus configured as described above, its operation will be described below.

In the transmission and reception of the data 6 and the command 8 between the control apparatus 1 and the recording/reproducing apparatus 21, the data 6 to be recorded 6 is transmitted from the control apparatus 1 to the recording/reproducing unit 3 via the I/F 22, and the command 8 is transmitted to the processor 23 during transmission; and the reproduced data 6 is transmitted from the recording/reproducing unit 3 to the control apparatus 1 via the I/F 22, and the response 7 to a specific command 8 required to be responded to the control apparatus 1 is transmitted in the same way from the processor 23 to the control apparatus 1 via the I/F 22 during reception. Furthermore, the operation panel 4 generates the operation signal 5 for determining the operation of the recording/reproducing unit 3, and the switching signal generation unit 24 generates the switching signal 26 for switching the operation signal 5 to its valid or invalid state; the processor 23 outputs the control signal 27 for controlling the recording/reproducing unit 3 on the basis of the switching signal to the recording/reproducing unit 3; and the recording/reproducing unit 3 records the data 6 on a recording medium or reproduces the data 6 from the recording medium on the basis of the control signal 27.

In the above-mentioned configuration, in the case when the transmission line reset signal 25 generated from the I/F 22 is received from the I/F 22 when the connection to the transmission line 2 is disconnected, the switching signal generation unit 24 outputs an operation panel valid signal for validating the operation signals 5 generated at the operation panel 4 as the switching signal 26 to the processor 23. And the processor 23 validates the operation signal 5 on the basis of the switching signal 26 and controls the recording/reproducing unit 3 on the basis of the operation signal 5.

Therefore, even if the operation signal 5 generated at the operation panel 4 during the transmission/reception of the data 6 and the command 8 between the control apparatus 1 and the recording/reproducing apparatus 21 is transmitted to the processor 23, the processor 23 controls the recording/reproducing unit 3 on the basis of the switching signal 26 generated by the switching signal generation unit 24, whereby the recording/reproducing apparatus 21 can be prevented from malfunctioning. Furthermore, when the transmission line is reset, control from the control apparatus cannot be carried out; however, the recording/reproducing apparatus can be controlled interlocked with the reset by the operation panel of the recording/reproducing apparatus, thereby being capable of preventing trouble.

The present invention is applicable even when the above-mentioned control apparatus 1 is an editing apparatus, and the present invention is also applicable even when an interface other than the above-mentioned IEEE1394 I/F 22 is used. Furthermore, generally speaking, instead of the operation panel installed in the recording/reproducing apparatus, a remote controller having the same function can carry out control; however, by invalidating an operation signal from the operation panel, or by invalid/valid switching of the operation signal from the remote controller, just as validating the operation signal from the operation panel on the basis of the transmission line reset signal, it is possible to obtain the same effect of preventing the recording/reproducing apparatus from malfunctioning because of the operation signal supplied from the remote controller while the data/command is transmitted or received between the control apparatus and the recording/reproducing apparatus.

Embodiment 3

Figure 3:
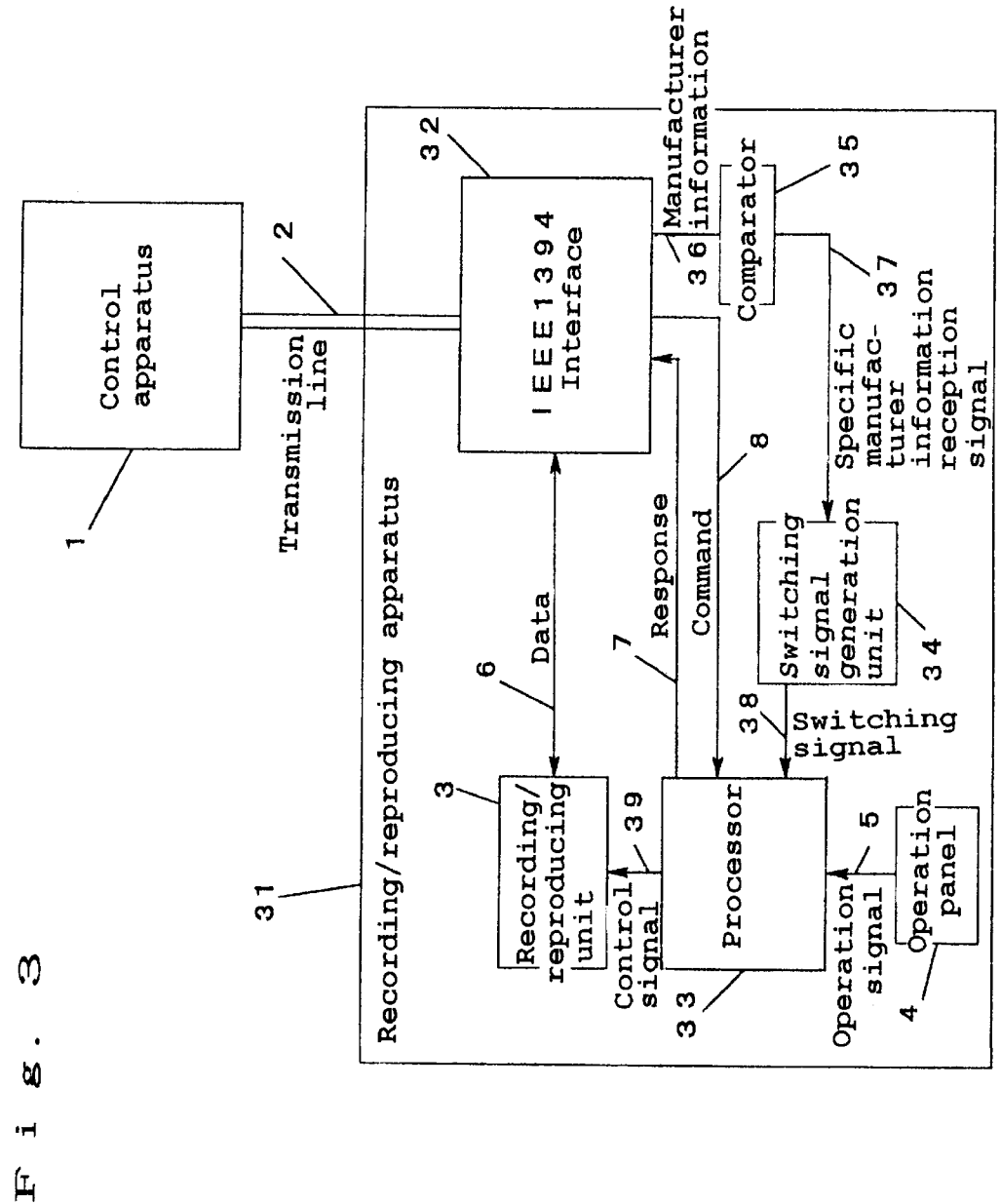
FIG. 3 is a block diagram in accordance with a third embodiment of the present invention.

FIG. 3 is a block diagram in accordance with a third embodiment of the present invention; in FIG. 3, the numeral 31 represents a recording/reproducing apparatus, the numeral 32 represents an IEEE1394 Interface (hereinafter referred to as an I/F), the numeral 33 represents a processor, the numeral 34 represents a switching signal generation unit, the numeral 35 represents a comparator, the numeral 36 represents a manufacturer information, the numeral 37 represents a specific manufacturer information reception signal, the numeral 38 represents a switching signal, and the numeral 39 represents a control signal. In FIG. 3, the same portions as those of the recording/reproducing apparatus of FIG. 1 are represented by the same numerals, and their descriptions are omitted.

In the recording/reproducing apparatus configured as described above, its operation will be described below.

In the transmission and reception of the data 6 and the command 8 between the control apparatus 1 and the recording/reproducing apparatus 31, the data 6 to be recorded is transmitted from the control apparatus 1 to the recording/reproducing unit 3 via the I/F 32, and the command 8 is transmitted to the processor 33 during transmission; and the reproduced data 6 is transmitted from the recording/reproducing unit 3 to the control apparatus 1 via the I/F 32, and the response 7 to a specific command 8 required to be responded to the control apparatus 1 is transmitted in the same way from the processor 33 to the control apparatus 1 via the I/F 32 during reception. Furthermore, the operation panel 4 generates the operation signal 5 for determining the operation of the recording/reproducing unit 3, and the switching signal generation unit 34 generates the switching signal 38 for switching the operation signal 5 to its valid or invalid state; the processor 33 outputs the control signal 39 for controlling the recording/reproducing unit 3 on the basis of the switching signal 38 to the recording/reproducing unit 3; and the recording/reproducing unit 3 records the data 6 on a recording medium or reproduces the data 6 from the recording medium on the basis of the control signal 39.

In the above-mentioned configuration, the I/F 32 transmits the manufacturer information 36 among the data 6 and the command 8 received from the control apparatus 1 to the memory 35. And the comparator 35 compares the manufacturer information 36 with specific manufacturer information stored in itself; if there is a coincidence, the specific manufacturer information is turned ON and output; if there is no coincidence, the information is turned OFF and output. When the switching signal generation portion 34 receives the specific manufacturer information reception signal 37 having been turned ON from the comparator 35, the operation panel invalid signal for invalidating the operation signal 5 generated at the operation panel 4 is output as the switching signal 38 to the processor 33. And the processor 33 invalidates the operation signal 5 on the basis of the switching signal 38, and controls the recording/reproducing unit 3 on the basis of a specific command 8 for controlling the recording/reproducing unit 3 among the commands 8 received from the control apparatus 1 via the I/F 32.

Therefore, even if the operation signal 5 generated at the operation panel 4 during the transmission/reception of the data 6 and the command 8 between the control apparatus 1 and the recording/reproducing apparatus 31 is transmitted to the processor 33, the processor 33 controls the recording/reproducing unit 3 on the basis of the switching signal 38 generated by the switching signal generation unit 34, whereby the recording/reproducing apparatus 31 can be prevented from malfunctioning. Malfunction can be prevented even if commands transmitted from the control apparatus are treated differently by the recording/reproducing apparatus.

The present invention is applicable even when the above-mentioned control apparatus 1 is an editing apparatus, and the present invention is also applicable even when an interface other than the above-mentioned IEEE1394 I/F 32 is used. Furthermore, generally speaking, instead of the operation panel installed in the recording/reproducing apparatus, a remote controller having the same function can carry out control; however, by invalidating an operation signal from the remote controller, just as invalidating an operation signal from the operation panel, it is possible to obtain the same effect of preventing the recording/reproducing apparatus from malfunctioning because of the operation signal supplied from the remote controller while the data/command is transmitted or received between the control apparatus and the recording/reproducing apparatus.

Embodiment 4

Figure 4:
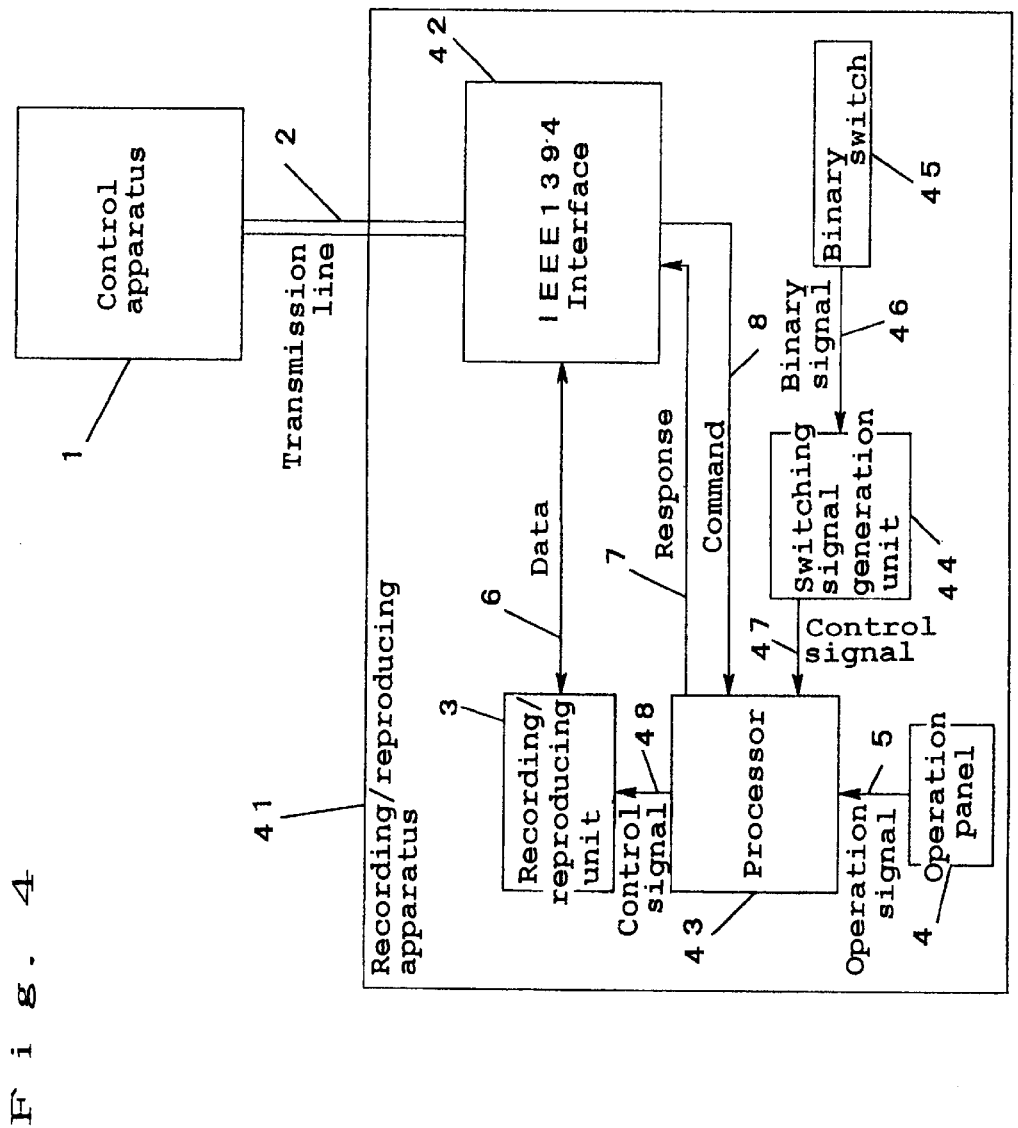
FIG. 4 is a block diagram in accordance with a fourth embodiment of the present invention.

FIG. 4 is a block diagram in accordance with a fourth embodiment of the present invention; in FIG. 4, the numeral 41 represents a recording/reproducing apparatus, the numeral 42 represents an IEEE1394 Interface (hereinafter referred to as an I/F), the numeral 43 represents a processor, the numeral 44 represents a switching signal generation unit, the numeral 45 represents a binary switch, the numeral 46 represents a binary signal, the numeral 47 represents a switching signal, and the numeral 48 represents a control signal. In FIG. 4, the same portions as those of the recording/reproducing apparatus of FIG. 1 are represented by the same numerals, and their descriptions are omitted.

In the recording/reproducing apparatus configured as described above, its operation will be described below.

In the transmission and reception of the data 6 and the command 8 between the control apparatus 1 and the recording/reproducing apparatus 41, the data 6 to be recorded is transmitted from the control apparatus 1 to the recording/reproducing unit 3 via the I/F 42, and the command 8 is transmitted to the processor 43 during transmission; the reproduced data 6 is transmitted from the recording/reproducing unit 3 to the control apparatus 1 via the I/F 42, and the response 7 to a specific command 8 required to be responded to the control apparatus 1 is transmitted in the same way from the processor 43 to the control apparatus 1 via the I/F 42 during reception. Furthermore, the operation panel 4 generates the operation signal 5 for determining the operation of the recording/reproducing unit 3, and the switching signal generation unit 44 generates the switching signal 47 for switching the operation signal 5 to its valid or invalid state; the processor 43 outputs the control signal 48 for controlling the recording/reproducing unit 3 on the basis of the switching signal 47 to the recording/reproducing unit 3; and the recording/reproducing unit 3 records the data 6 on a recording medium or reproduces the data 6 from the recording medium on the basis of the control signal 48.

In the above-mentioned configuration, the binary switch 45 is a switch capable of being turned ON and OFF externally. If the binary signal 46 received from the binary switch 45 is ON, the switching signal generation unit 44 outputs the operation panel invalid signal for invalidating the operation signal 5 generated at the operation panel 4 as the switching signal 47 to the processor 43. And the processor 43 invalidates the operation signal 5 on the basis of the switching signal 47, and controls the recording/reproducing unit 3 on the basis of a specific command 8 for controlling the recording/reproducing unit 3 among the commands 8 received from the control apparatus 1 via the I/F 42.

Therefore, even if the operation signal 5 generated at the operation panel 4 during the transmission/reception of the data 6 and the command 8 between the control apparatus 1 and the recording/reproducing apparatus 41 is transmitted to the processor 43, the processor 43 controls the recording/reproducing unit 3 on the basis of the switching signal 47 generated by the switching signal generation unit 44, whereby the recording/reproducing apparatus 41 can be prevented from malfunctioning.

The present invention is applicable even when the above-mentioned control apparatus 1 is an editing apparatus, and the present invention is also applicable even when an interface other than the above-mentioned IEEE1394 I/F 42 is used. Furthermore, generally speaking, instead of the operation panel installed in the recording/reproducing apparatus, a remote controller having the same function can carry out control; however, by invalidating an operation signal from the remote controller, just as invalidating an operation signal from the operation panel, it is possible to obtain the same effect of preventing the recording/reproducing apparatus from malfunctioning because of the operation signal supplied from the remote controller while the data/command is transmitted or received between the control apparatus and the recording/reproducing apparatus. Furthermore, by the ON/OFF operation of the switch, the switchable valid/invalid setting on the operation panel can be made different depending on the function of the operation panel. (For example, reproduction, rewinding, etc. may be carried out by the operation at the operation panel when the switch is ON; however, if a recording medium ejection function is made inoperable at the operation panel regardless of the ON/OFF state of the switch once an instruction is given from the control apparatus, it is possible to prevent such serious trouble as forcible ejection of an recording medium during data transmission.

Embodiment 5

Figure 5:
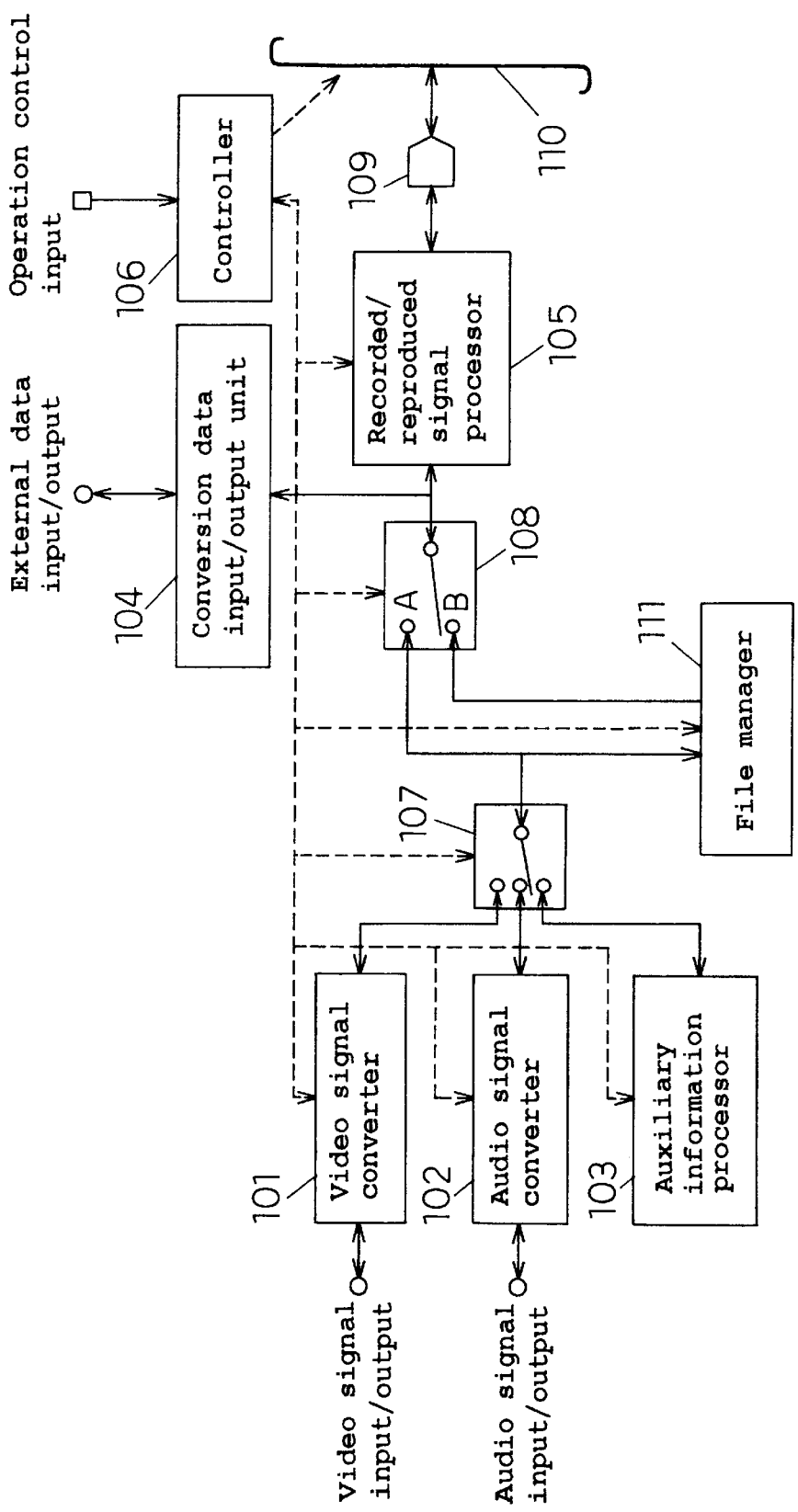
FIG. 5 is a block diagram of a data recording apparatus in accordance with a fifth embodiment.

FIG. 5 is a block diagram showing a data recording/reproducing apparatus in accordance with a fifth embodiment of the data recording apparatus of the present invention.

As shown in the figure, the numeral 101 represents a video signal converter, the numeral 102 represents an audio signal converter, the numeral 103 represents an auxiliary information processor, the numeral 104 represents a conversion data input/output unit, the numeral 105 represents a recorded/reproduced signal processor, the numeral 106 represents a controller, the numeral 107 represents a first selector, the numeral 108 represents a second selector, the numeral 109 represents a head, the numeral 110 represents a recording medium, and the numeral 111 represents a file manager.

In the above-mentioned configuration, the operation of the present embodiment will be described next, and at the same time, embodiments of the file system information generation method and the file management method of the present invention will also be described.

First, the video signal converter 101 converts an input video signal as predetermined; at the same time, the audio signal converter 102 converts an input audio signal as predetermined. In accordance with an instruction input to the controller 106, the auxiliary information processor 103 generates predetermined auxiliary information, and the second selector 108 is connected to side A; furthermore, by the recorded/reproduced signal processor 105, the converted video and audio signals, and the auxiliary information to be input are formatted to signals to be recorded while being switched by the first selector 107, and then recorded on the recording medium 110 by the head 109. Furthermore, to the conversion data input/output unit 104, the same type of video signal as that subjected to the predetermined conversion carried out by the video signal converter 101, the same type of audio signal as that subjected to the predetermined conversion carried out by the audio signal converter 102 and the auxiliary information are input, the second selector 108 is connected to side A; by the recorded/reproduced signal processor 105, the converted video and audio signals, and the auxiliary information to be input are formatted to signals to be recorded, and then recorded on the recording medium 110 by the head 109. Such an instruction as recording/reproduction/search/stop is input to the controller 106; furthermore, in addition to setting for processing the video signal and the audio signal, instructions for generating auxiliary information, etc., the control of the entire apparatus is carried out.

Next, the file system information generation operation in the data recording/reproducing apparatus in accordance with the present embodiment will be described below.

First of all, it is necessary to check whether file system information has already been recorded or not in the video and audio signals and the auxiliary information recorded on the recording medium 110 by the above-mentioned controller 106, the head 109 and the like. If recorded, it is not necessary to generate or renew the file system information unless new data is recorded. Furthermore, if the file system information has already been recorded, the file manager 111 instructs the controller 106 to reproduce the file system information. The reproduction of the file system information will be described further below.

In other words, the power supply of the present apparatus is turned on, and a video tape used as the recording medium 110 is set in the present apparatus, whereby a file system information search command is issued from the controller 106. Consequently, the file manager 111 checks the recorded data on the recording medium 110, and judges whether the file system information has already been recorded or not. In this case, the above-mentioned judgment is carried out by searching a recording-start flag 115 (see FIG. 6) specially intended for the file system information, which is described later. If it is judged that no file system information has not been recorded as the result of the judgment, a reproduction execution instruction is issued, and the next operation proceeds.

In other words, the reproduction execution instruction is issued, and a signal reproduced from the recording medium 110 by the head 109 is processed by the recorded/reproduced signal processor 105; data is input to the video signal converter 101, the audio signal converter 102 and the auxiliary information processor 103 through the second selector 108 and the first selector 107; the video-signal converter 101, the audio signal converter 102 and the auxiliary information processor 103 inversely convert the video signal, the audio signal and the auxiliary information, respectively, thereby reproducing and outputting the original data. At this time, the second selector 108 can output its input signal to the video signal converter 101, the audio signal converter 102 and the auxiliary information processor 103, and at the same time, can completely output the signal to the conversion data input/output unit 104, and the conversion data input/output unit 104 can output this signal from the second selector 108 to an external device.

Then, the above-mentioned output signal is input to the file manager 111 and the conversion data input/output unit 104 at the same time. The file manager 111 divides the recorded signal by using the above-mentioned auxiliary information, generates individual file information for each divided signal to form files. In addition, at the file manager 111, cassette information related to the entire recording medium is generated, these individual file information pieces are collected as file system information, the second selector 108 is switched to side B, the file system information is formatted by the recorded/reproduced signal processor 105 into a signal to be recorded, and recorded on the recording medium 110. The details of the method of dividing the recorded signal by using the auxiliary information will be described in seventh and eighth embodiments referring to FIGS. 9 and 10.

The conversion data input/output unit 104 can also be configured so as to transmit instructions given to the data recording apparatus as well as various signals.

Figure 6:
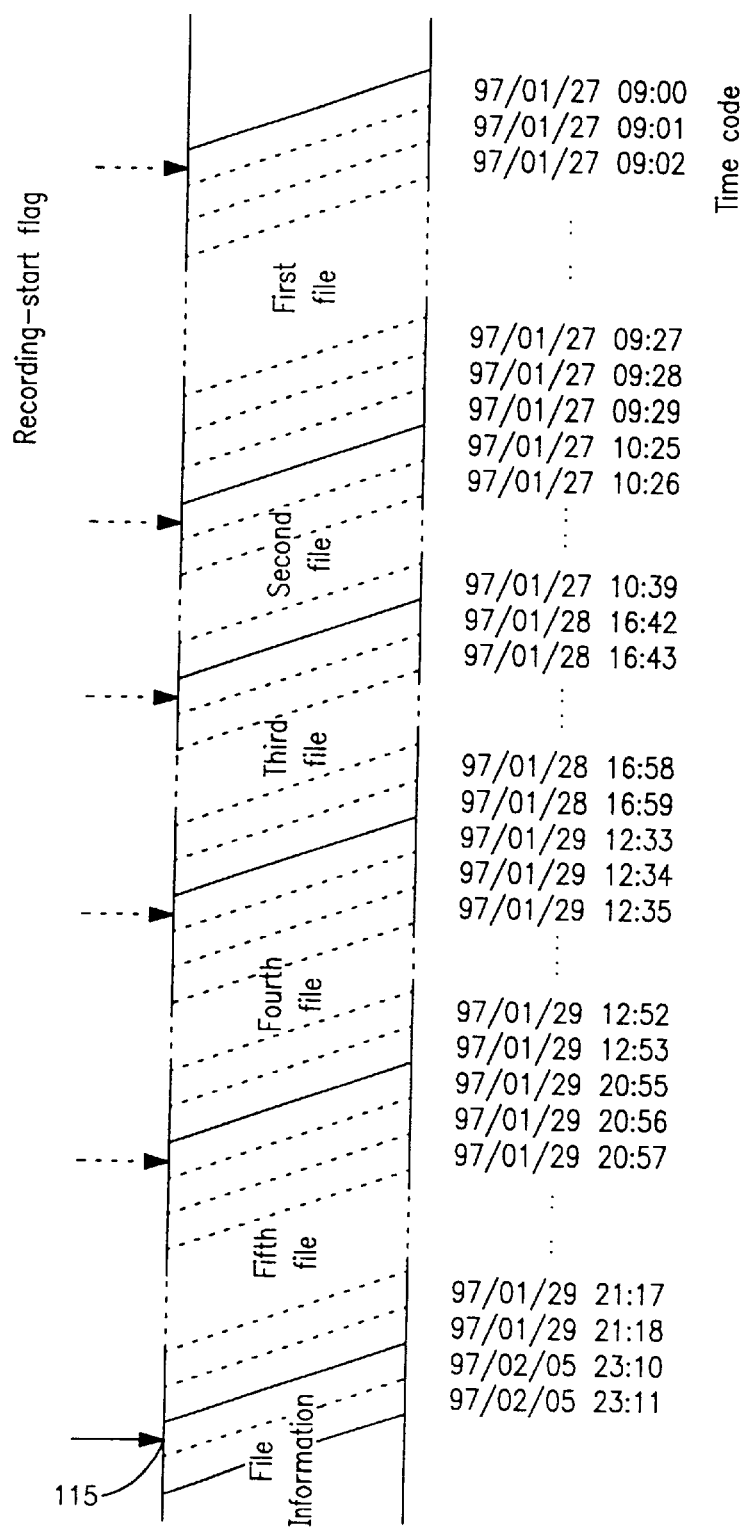
FIG. 6 is a view of an example showing a condition of a recording medium on which recording is carried out by the data recording apparatus in accordance with the fifth embodiment.

The file system information is generated from the recorded medium, and an example of a state of the recorded medium on which the file system information is recorded is shown in FIG. 6. Furthermore, when the file system information is begun to be recorded, the recording-start flag 115 specially intended for the file system information is also recorded at the same time. The recording-start flag 115 may be approximate information reproducible during high-speed search or information indicating a one point reproducible only during ordinary reproduction, or both of these. Recording is carried out while a time code indicating a recording date and time is given to each predetermined unit of the video signal. The predetermined unit of the video signal is herein minute in FIG. 6; although the unit may be second, it is generally a frame/field unit.

An example of generated individual file information/cassette information is shown in FIG. 7. The cassette ID and the cassette label are information for identifying a cassette; even if they are not set, no problem occurs.

A file system information recording position is aposition wherein the recording of this file system information started; although a time code is indicated herein, if numbers (although the numbers are desired to be sequential, errors may occur) indicating the physical positions of the recording medium from the beginning have been added and recorded, the numbers can also be used.

The number of recorded files should only be information indicating the amount of individual file information. For example, if the size of the cassette information is known, it is possible to count files by using the file manager 111. In addition, only when additional recording is carried out, deletion operation can be carried out by placing a mark or the like indicating impossible reference to the individual file information, although data is actually present on the recording medium. In this case, as an item of the number of recorded files, the number of files capable of being referenced externally, the number of filed actually recorded or both information can be used.

It is not necessary to set the length of the tape; however, if it is set, when an attempt is made to externally record a file later, the file manager 111 can easily check its size and confirm whether the recording capacity is sufficient or not.

In addition, it is not necessary to set log information; however, this is an area capable of recording what kind of process has been carried out or what kind of trouble has been caused.

Each file requires a name, a file size and a recording start position. The file manager 111 is supposed to generate these on the basis of the time code. A date is used as a directory name, and a time is used as a file name in this example; however an appropriate configuration can be taken.

As the recording start position, information capable of easily locating the head of this file is necessary. Although the time code is used herein, designation is possible by using a number indicating a physical position from the beginning of a recording medium or by using the number of order of the recording-start flag position from the beginning.

The file size is herein indicated by time information; however, the number of bytes or the number of tracks can be used without causing problems.

When only one type of recorded data is present, it is not necessary to set the type of recorded data; however, when plural types of recorded data are present, and if they cannot be identified, their contents cannot be confirmed.

By recording this kind of file system information, data to be recorded can be filed and controlled. Therefore, for example, when a cassette with file system information recorded in this way is attempted to be reproduced after it is ejected once, whether file system information has been recorded or not is first checked by the file manager 111 as described above. And, since the file system information has already been recorded in this case, the file system information is reproduced first, and indicated on a predetermined display screen; by watching it, the user can easily confirm the content of data recorded on the recording medium. Furthermore, processes such as dubbing, editing, deletion, division and the like of the recorded data can also be carried out easily by indicating a file as a unit.

In the present embodiment, file system information is generated and recorded while a recording medium on which recording is carried out by this data recording/reproducing apparatus or another data recording apparatus having a function similar thereto is being reproduced; however, without being limited to this, it is possible to generate file system information while recording and to continuously record the file system information after the end of the recording, for example.

Embodiment 6

Figure 8:
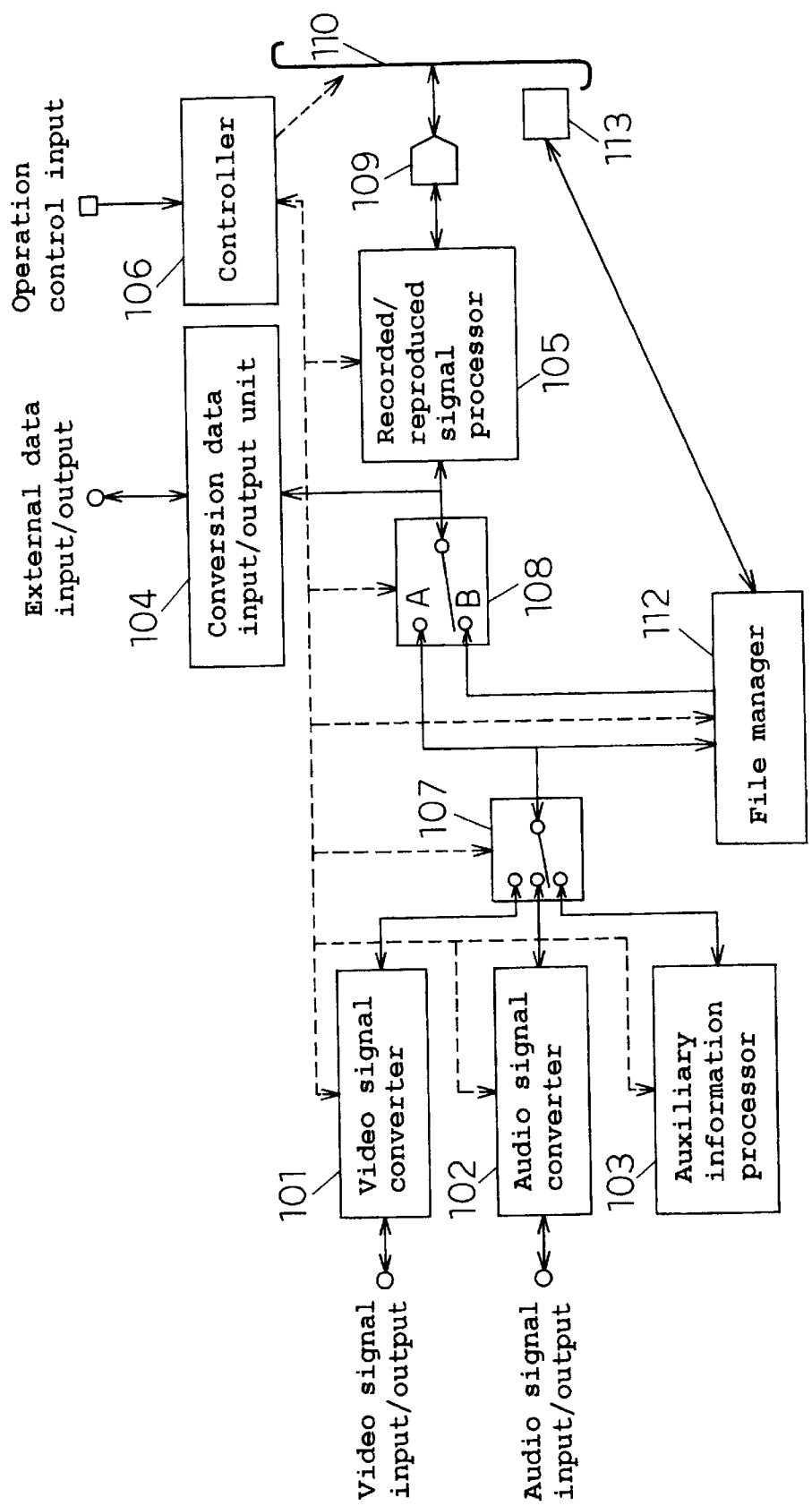
FIG. 8 is a block diagram of a data recording apparatus in accordance with a sixth embodiment.

Next, FIG. 8 is a block diagram showing a data recording/reproducing apparatus in accordance with a sixth embodiment of the present invention; the configuration of the present embodiment will be described referring to the figure.

In the figure, the video signal converter 101, the audio signal converter 102, the auxiliary information processor 103, the conversion data input/output unit 104, the recorded/reproduced signal processor 105, the controller 106, the first selector 107, the second selector 108, the head 109 and the recording medium 110 are the same as those of the first embodiment; the numeral 112 represents a file manager, the numeral 113 represents anadditional recording midium, and the additional recording midium 113 is supposed to be installed in a housing accommodating the recording medium 110.

Next, the operation of the present embodiment will be described, and at the same time, embodiments of the file system information generation method and the file management method will also be described.

In other words, the operation such as recording or reproduction is the same as in the fifth embodiment; when file system information is recorded on the recording medium 110, information for indicating the data recording end position or indicating the file system information recording start position is recorded on the additional recording midium 113 so that its recorded position can be found easily. It is also possible to record part of file system information on the additional recording midium 113.

By recording file system information on the additional recording midium 113 in this way, after this cassette is ejected once, and reproduction is attempted again, it is possible to easily search the file system information on the recording medium (tape) 110 (or it is not necessary to carry out search); therefore, it is possible to quickly confirm the contents of the cassette.

Even in the present embodiment, it is possible that file system information is generated while a recording medium on which recording is carried out by this data recording/reproducing apparatus or another data recording apparatus having a function similar thereto is being reproduced, and the file system information is recorded after the reproduction; it is also possible that the file system information is generated during recording, and after the end of the recording, the file system information is recorded continuously.

Embodiment 7

Next, a seventh embodiment of the present embodiment will be described referring to FIG. 9, etc.

Figure 9:
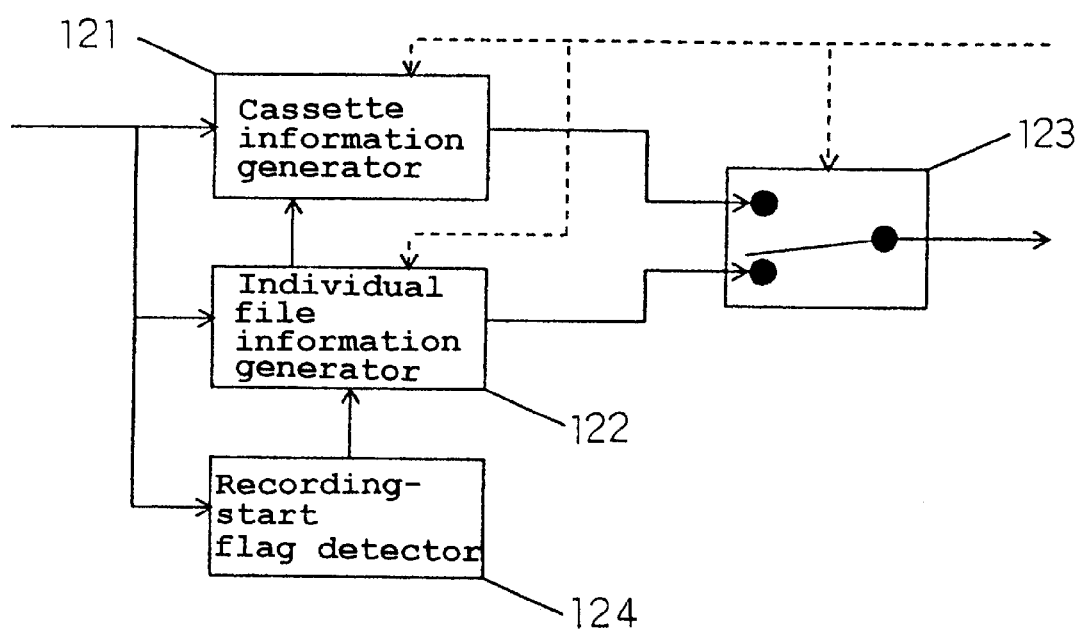
FIG. 9 is a block diagram of an example of the configuration of a file manager 111 or 112 in accordance with a seventh embodiment.

FIG. 9 is a block diagram of an example of the configuration of the file manager 111 (see FIG. 5) or 112 (see FIG. 8) in accordance with the present embodiment. In the present embodiment, as described above, the details of an example of a method of dividing a recorded signal by using auxiliary information will be detailed.

In the figure, the numeral 121 represents an cassette information generator, the numeral 122 represents an individual file information generator, the numeral 123 represents a file system information selector, and the numeral 124 represents a recording-start flag detector.

First, the recording-start flag detector 124 extracts a recording-start flag storage portion from input data input, and judges whether the recording-start flag is in the ON state or not; if it is ON, a signal for instructing to divide the recorded data is output to the individual file information generator 122. The individual file information generator 122 divides the recorded data on the basis of the signal, generates predetermined file system information, and outputs file quantity information to the cassette information generator 121. The cassette information generator 121 generates predetermined information beginning with the file quantity information, and detects the last data at present, thereby determining the recording start position of the file system information. The file system information selector 123 selects the cassette information and the individual file information and outputs them when the data recording apparatus is controlled in a state of recording the file system information.

Furthermore, the individual file information generator 122 can select an appropriate display screen and can carry out addition to the file system information. As the appropriate display screen, the first display screen or a display screen as designated by external input during reproduction for example can be used.

In this way, the file system information can be generated, and data to be recorded can be filed and controlled, whereby various processes can be carried out easily. Moreover, when data on the display screen is used as file system information, the content of the data can be confirmed by video, thereby attaining easy confirmation.

Embodiment 8

Next, an eighth embodiment in accordance with the present embodiment will be described referring to FIGS. 10(a), (b), etc.

Figure 10A:
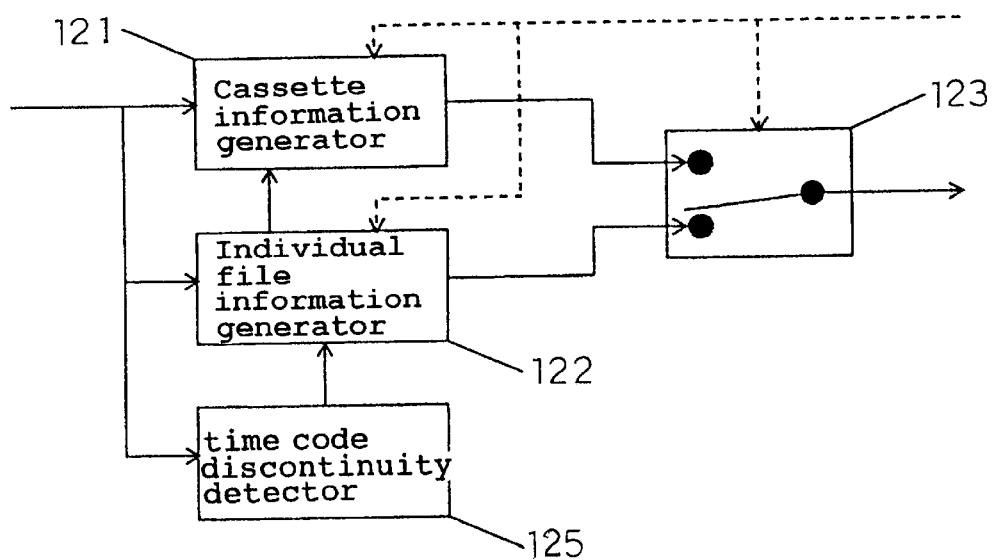
FIG. 10(a) is a block diagram of another example of the configuration of a file manager 111 or 112 in accordance with an eighth embodiment.

FIG. 10(a) is a block diagram of another example of the configuration of the file manager 111 or 112 in accordance with the present embodiment. In the present embodiment, as described above, another example of a method of dividing a recorded signal by using auxiliary information will be detailed.

Figure 10B:
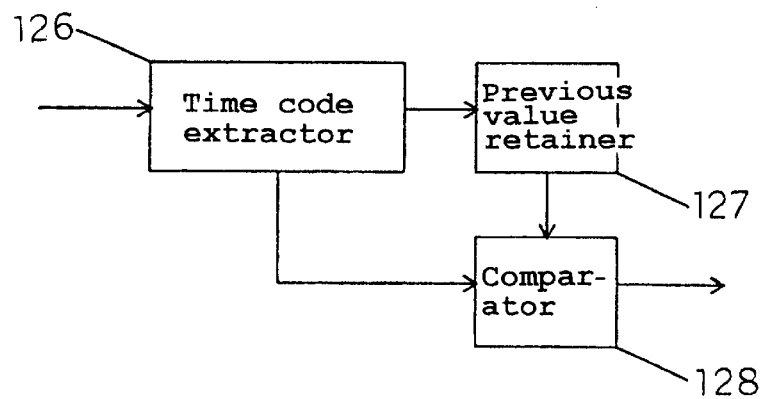
FIG. 10(b) is a block configuration diagram of a time code discontinuity detector shown in FIG. 10(a)

In the figure, the cassette information generator 121, the individual file information generator 122 and the file system information selector 123 are the same as those of the seventh embodiment, and the numeral 125 represents a time code discontinuity detector. FIG. 10(b) is a view showing the block configuration of the time code discontinuity detector 125, the numeral 126 represents a time code extractor, the numeral 127 represents a previous value retainer, and the numeral 128 represents a comparator.

The cassette information generator 121, the individual file information generator 122 and the file system information selector 123 operate in the same way as those of the third embodiment. The time code discontinuity detector 125 first extracts a time code storing portion from data input from the time code extractor 126, and moves a value obtained one unit time ago to the previous value retainer 127. The value obtained one unit time ago is compared with the current input value by the comparator 128; if the continuity of the time code is not maintained, a signal for instructing to divide recorded data is output to the individual file information generator 122.

In this way, the file system information can be generated, and data to be recorded can be filed and controlled, whereby various processes can be carried out easily just as in the case of the seventh embodiment. Furthermore, it is possible to carry out detection more accurately by combining the seventh embodiment with the eighth embodiment.

In the above-mentioned embodiment, it is described that various effects can be obtained by introducing the file managers 111 and 112 into a conventional data recording apparatus. However, when new data is additionally recorded by using the conventional data recording apparatus on a recording medium on which file system information is generated and recorded as described in the above-mentioned embodiment, it is supposed that invalid data has been recorded in this file system information; this may cause trouble of overwriting and deleting part of the file system information having been recorded once.

An embodiment in view of measures for preventing this trouble will be described next.

Embodiment 9

Next, a ninth embodiment in accordance with the present invention will be described referring to FIG. 11, etc.

Figure 11:
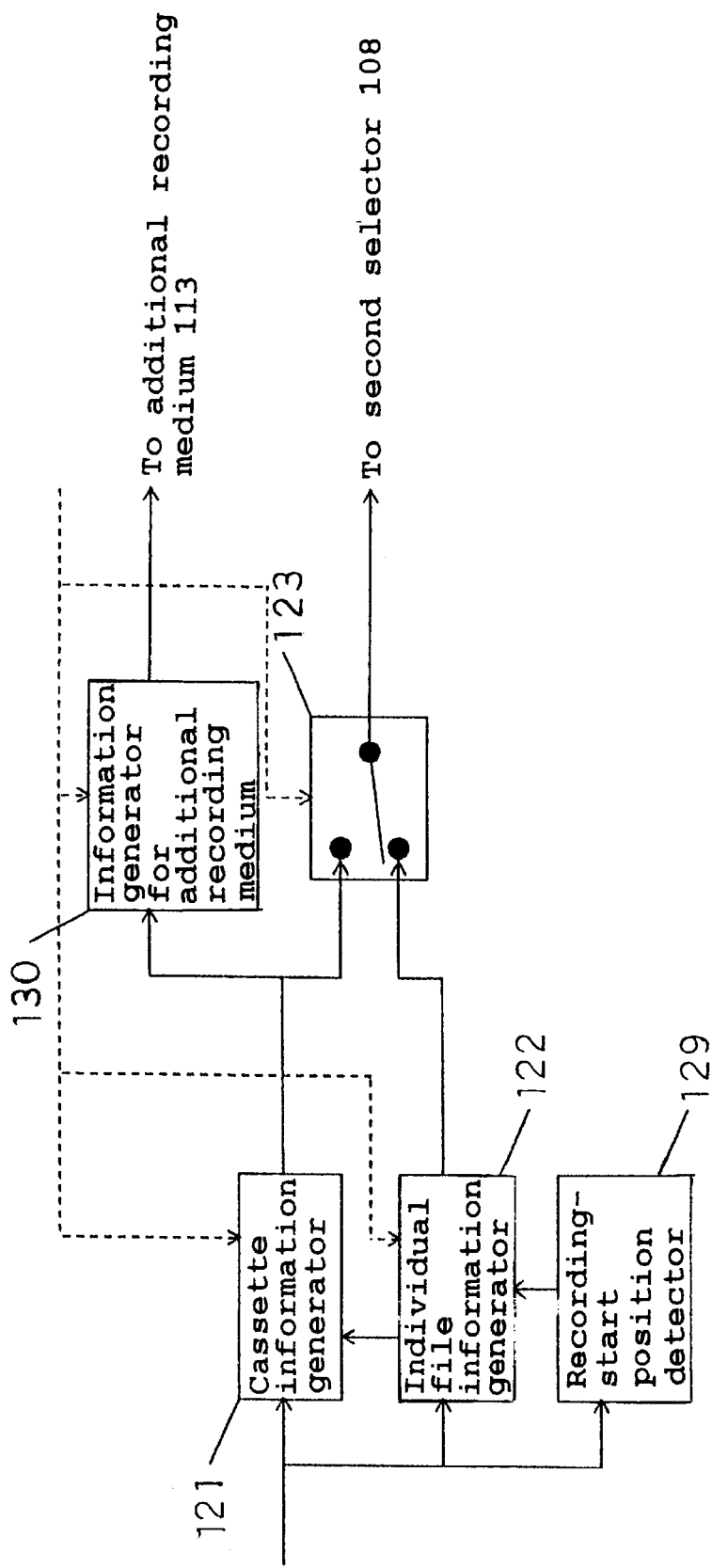
FIG. 11 is a block diagram of another example of the configuration of a file manager 112 in accordance with a ninth embodiment.

FIG. 11 is a block diagram of another example of the configuration of the file manager 112 in accordance with the present embodiment. This file manager 112 is applicable to the data recording/reproducing apparatus described in FIG. 8.

In the figure, the cassette information generator 121, the individual file information generator 122 and the file system information selector 123 are the same as those of the seventh embodiment; a recording-start information detector represented by the numeral 129 is a block having such a function as that described in the seventh or eighth embodiment. The numeral 130 represents an additional recording midium information generator.

By using auxiliary information prepared in a conventional data recording apparatus, the additional recording midium information generator 130 is used to control areas in which data and file system information are recorded. The first recording means of the present invention is a means including the recorded/reproduced signal processor 105, the head 109, etc. In addition, the second recording means of the present invention is a means included in the additional recording midium information generator 130.

Among the information prepared as auxiliary information, information (title end) indicating the end position of a program and information (chapter) indicating the configuration of the recorded program can be used.

Figure 12:
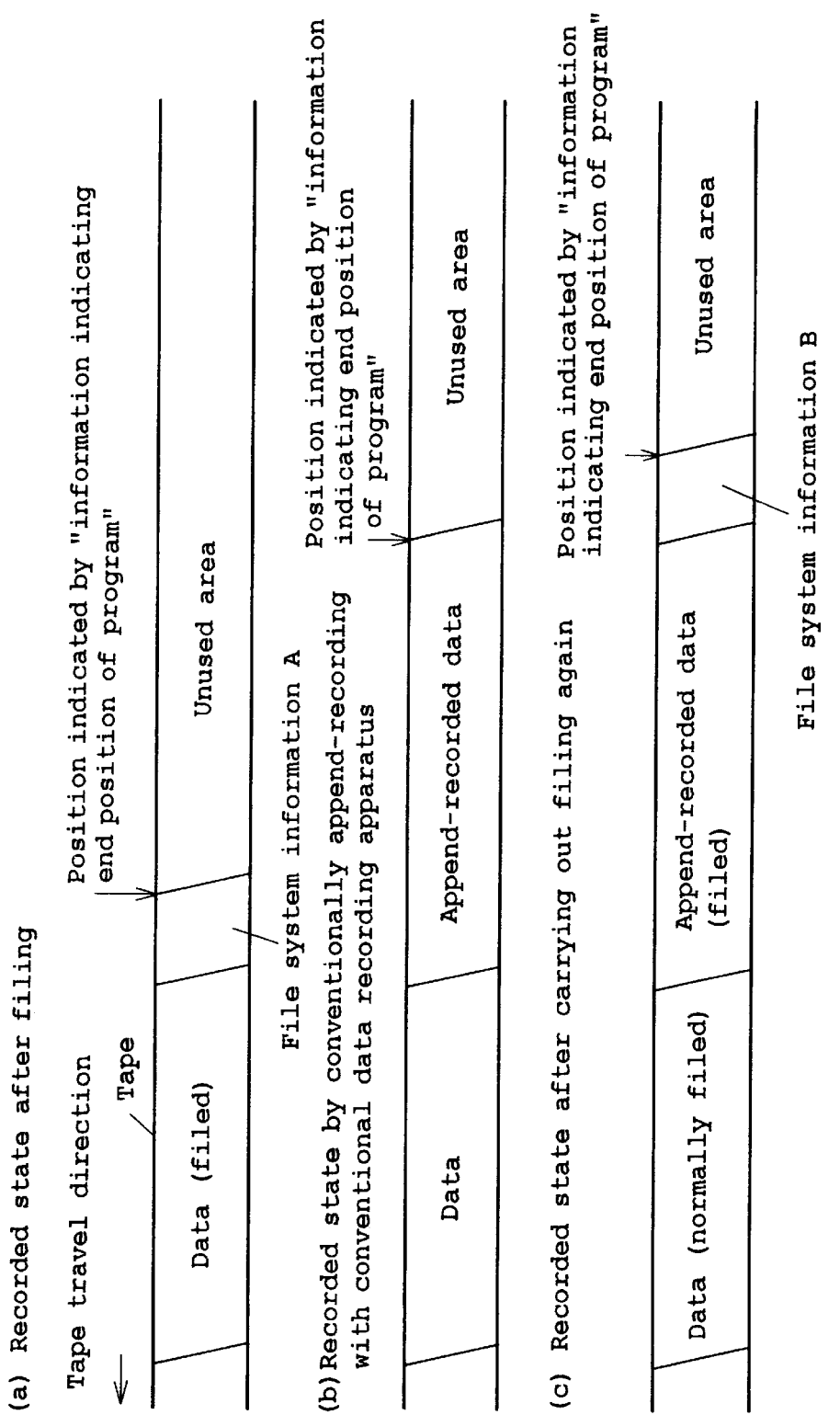
FIG. 12 is explanatory views for explaining the conditions of a recording medium on which recording is carried out by the data recording apparatus in accordance with the sixth embodiment.
Figure 13:
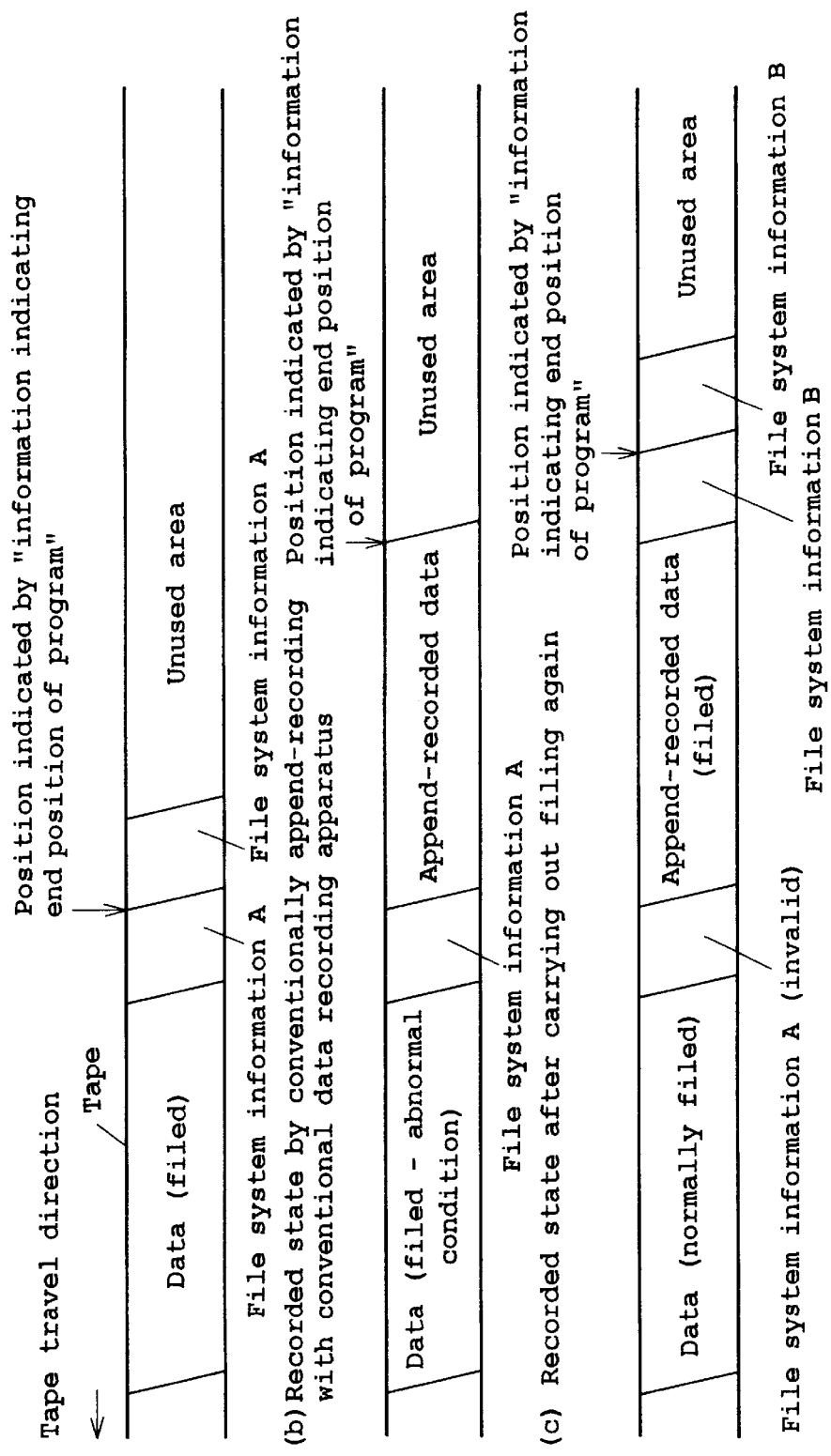
FIG. 13 is explanatory views for explaining the conditions of a recording medium on which recording is carried out by the data recording apparatus in accordance with the sixth embodiment.
Figure 14:
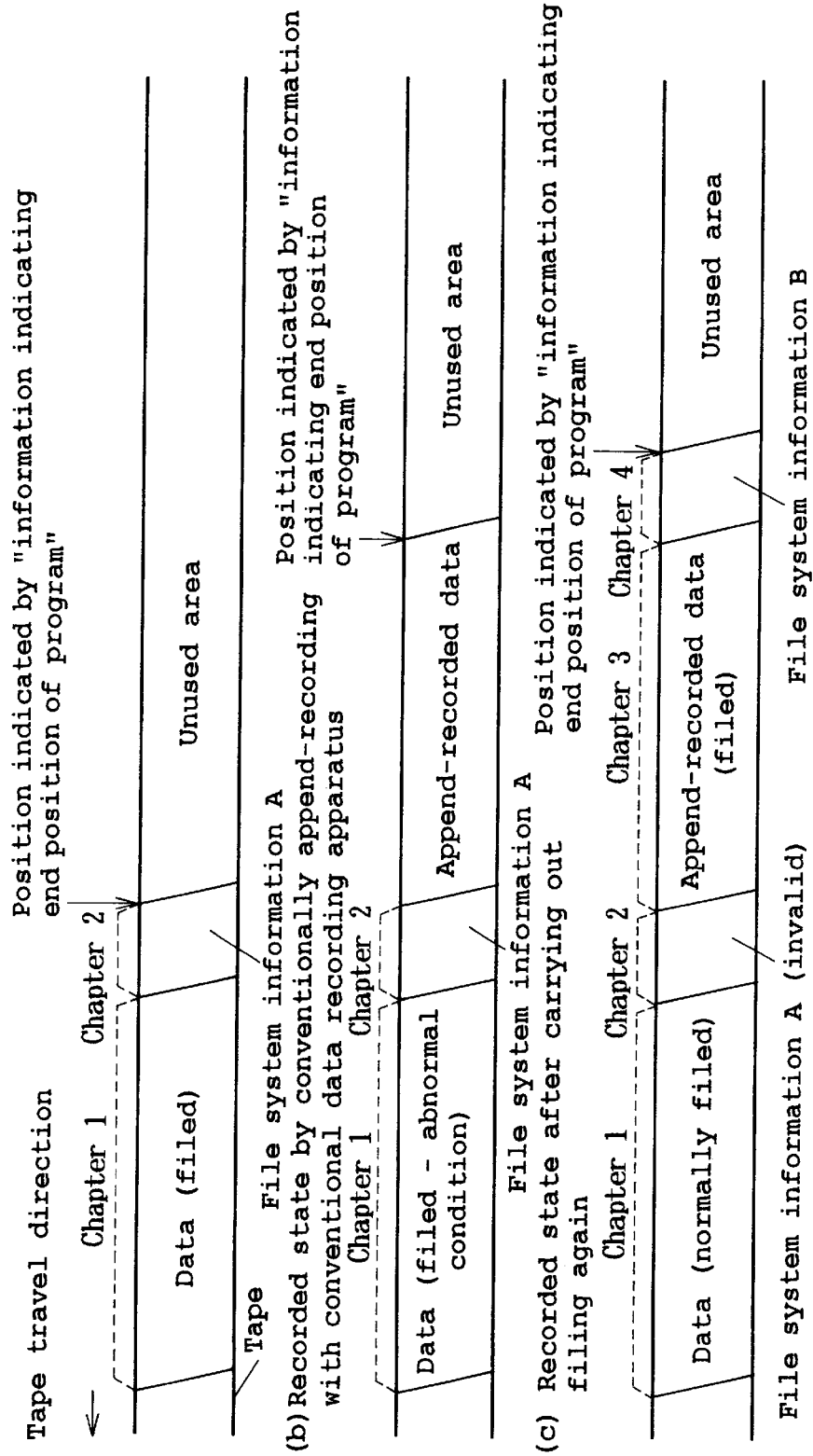
FIG. 14 is explanatory views for explaining the conditions of a recording medium on which recording is carried out by the data recording apparatus in accordance with the sixth embodiment.

FIG. 12(a) first shows a condition wherein file system information A is recorded in data having already been recorded, and information (title end) indicating the end position of a program indicates the position wherein data recording is ended. After this recording, if additional recording is carried out by a conventional apparatus not conforming to the file system information in accordance with the present embodiment, the file system information A is not recognized as shown in FIG. 12 (b), data is recorded from the information (title end) indicating the end position of the program, the file system information A is deleted completely, and filed data having already been recorded becomes an unfiled condition. As shown in FIG. 12(c), by recording file system information B having the data having already been recorded and the append-recorded data, a normal condition can be restored. In this case, file system information is required to be re-created by carrying out filing again; however no trouble is caused.

Next, FIG. 13(a) first shows a condition wherein the file system information A is recorded in data having already been recorded. The same file system information A is recorded twice, and the information (title end) indicating the end position of the program is set so as to indicate the recording end position of the entry of first file system information and then recorded. In other words, in this case, the file system information A is recorded in two adjacent areas; for example, an address indicating the position between the two areas is recorded at the predetermined position of the tape 110 or on the additional recording midium 113. After recording is carried out as described above, if additional recording is carried out by a conventional apparatus not conforming to the file system information, the file system information A recorded at the second time is not recognized as shown in FIG. 13(b), data is recorded from the information (title end) indicating the end position of the program, and the file system information A recorded at the second time is deleted completely. In this condition, an abnormal condition can be recognized because two pieces of the file system information A are not present, and file restructuring can be carried out without problems hereafter because the file system information A itself regarding filed data having already been recorded remains. By recording the file system information B having the data having already been recorded and the append-recorded data as shown in FIG. 13(c), the normal condition can be restored.

FIG. 14(a) is a condition wherein the file system information A is recorded in data having already been recorded. Data and the file system information A are recorded as different chapters, and the information (title end) indicating the end position of the program is set so as to indicate the end position of the recording position of the file system information A and then recorded. Furthermore, as auxiliary information, information regarding the positions wherein the respective chapters are recorded is also recorded. The type of data to be recorded at each chapter may be recorded as auxiliary information. After recording is carried out as described above, if additional recording is carried out by a conventional apparatus not conforming to the file system information, as shown in FIG. 14(b), a condition occurs wherein the recording end position indicating the end position of the program does not coincide with the end position of the last chapter, or a condition occurs wherein the last chapter is not file system information. Thereby, an abnormal condition can be recognized, and file restructuring can be carried out without problems hereafter because the file system information A itself regarding filed data having already been recorded remains. By recording the file system information B having the data having already been recorded and the append-recorded data as shown in FIG. 14(c), and by recording the information (title end) indicating the end position of the program and the information regarding the chapters as auxiliary information, the normal condition can be restored.

With the above-mentioned configuration, compatibility with a conventional data recording apparatus can be attained.

The terms of the cassette information and individual file information are just taken as examples, and even when other information is used, the present invention is applicable. Furthermore, in the above-mentioned embodiment, in the case when generated file system information is repeatedly recorded in plural areas after a position wherein the recording of the next data is ended, an example of recording the same file system information at two positions is described; however, without limited to this, recording can be carried out at three or more positions as a matter of course. Moreover, in that case, recording start position information for starting the recording of the next data should only be information indicating one of positions among the plural areas thereof.

Embodiment 10

Figure 15:
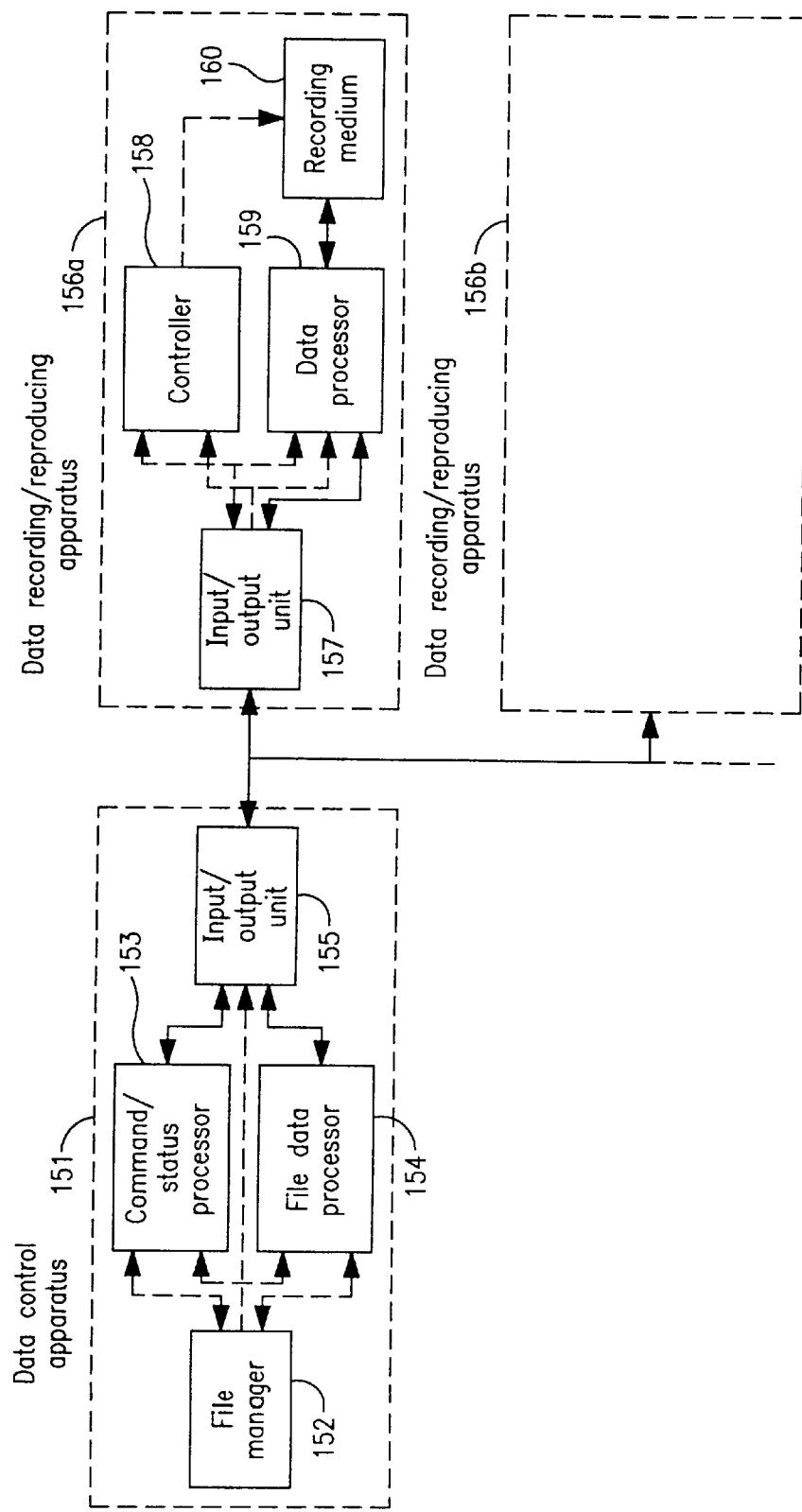
FIG. 15 is a block diagram showing a data control apparatus and a data recording/reproducing apparatus in accordance with a tenth embodiment.

FIG. 15 is a block diagram showing a data control apparatus 151 and a data recording/reproducing apparatus 156 in accordance with a tenth embodiment of the present invention; the numeral 152 represents a file manager, the numeral 153 represents a command/status processor, the numeral 154 represents a file data processor, the numeral 155 represents the input/output unit of the data control apparatus, the numeral 127 represents the input/output unit of the data recording/reproducing apparatus, the numeral 158 represents a controller, the numeral 159 represents a data processor, and the numeral 160 represents a recording medium.

First, the data control apparatus 151 transmits commands for recording and reproducing data, commands for making inquiries about statuses, and other commands, receives transmitted statuses, transmits data to be recorded, and receives reproduced data.

The file manager 152 controls files recorded on the recording medium 160 by using medium information, i.e., information regarding the information medium 160, and the file system information for each file recorded-on the recording medium 160.

The command/status processor 153 generates commands to be transmitted to the data recording/reproducing apparatus 156 in accordance with file reading/writing and other instructions from the file manager 152, and processes received statuses as necessary.

The file data processor 154 treats actual file data.

In order to carry out transmission and reception of commands/statuses and transmission and reception of data, the input/output unit 155 carries out format conversion inside the data control apparatus 151 and on the transmission line connected to the data recording/reproducing apparatus 156.

In accordance with the commands transmitted from the data control apparatus 151, the data recording/reproducing apparatus 156 receives transmitted data, transmits recorded and reproduced data, carries out status notification, and the like. In actual practice, the input/output unit 127 carries out transmission and reception, interprets transmitted commands, and gives instructions for data recording/reproducing and the like in accordance with the commands. Furthermore, in the case when a status is requested, a predetermined process is carried out to obtain the information. The controller 158 carries out the operation control of a mechanism for carrying out recording to the recording medium 160 or carrying out reproduction from the recording medium in accordance with the instructions from the input/output unit 127. When recording operation is instructed, the data processor 159 carries out a predetermined process such as error correction coding/modulation or the like for data to be input from the input/output unit 127, thereby to carry out conversion to a format recordable on the recording medium 160. In addition, when reproduction operation is instructed, a process for taking out original data from the reproduced signal is carried out.

In the case when the recording medium is a tape for example, as shown in FIG. 16, file system information (medium information regarding the recording medium 160 and file system information for each file recorded on the recording medium 160) can be recorded after a file is recorded. The file manager 152 of the data control apparatus 151 watches real-time characteristic identification information for indicating whether data has a real-time characteristic or not, that is, one of file system information pieces of the file system information provided for each file, and transmits instructions capable of ensuring the real-time characteristic in the entire system to each portion, if the real-time characteristic is requested for the data of the file.

In addition, when there are various rates capable of being treated by the system, the real-time characteristic of the data can be ensured by controlling information indicating the rate itself for each file.

For this purpose, the file manager 152 of the data control apparatus 151 is required to have a function to make an inquiry about a rate applicable to each peripheral portion and to judge whether they can be processed entirely or not, and the each of the peripheral portions is required to have a function applicable to the above-mentioned inquiry.

Furthermore, in the case when the recording medium 160 is secured to the datarecording/reproducing apparatus 156 just as a hard disk, an applicable rate is a value inherent in each data recording/reproducing apparatus 156; however, in the case of a removable medium, both the data control apparatus 151 and the data recording/reproducing apparatus 156 are required to have a function applicable to the inquiry for a rate applicable to the recording medium 160.

Some of actual data have a constant rate at all times, but some have variable rates. In the case of such data, it is necessary to carry out control at the maximum rate; if file system information is applicable to information regarding the maximum rate, such a function can be ensured.

In the case when information indicating a time required to transmit data in real time is included in the file system information, the amount of capacity of each file can be known easily. This is because, when treating data having various rates, a dummy is sometimes required to be recorded to ensure the real-time characteristic depending on the type of the recording medium, particularly when the recording medium is a tape. To judge whether a capacity capable of recording one data file is available or not, a capacity including the dummy is required, instead of the net amount of the number of bytes. It is possible to properly judge the capacity of the dummy added to the net information on the basis of information regarding the rate and time for recording/reproducing by the data recording apparatus 156.

FIG. 17 shows an example of medium information and file system information prepared for each file. First, as the medium information, contents as shown in FIG. 17 can be designated. When it is assumed herein that the amount of data recorded on one track is constant and that a reference transfer rate is 300 tracks/second, a data recording/reproducing apparatus applicable to multiples or 1/multiples thereof is taken as an example.

By recording not only the number of bytes but also the number of tracks (file time) as a file size of each file, the amount of capacity being used can be clarified, and the recording medium can be controlled. In other words, it is possible to know a range where writing is carried out. In particular, in the case of the fourth and fifth files, files having variable transfer rates, wherein the number of tracks required for actual recording is not known from only the file size represented by the number of bytes, can also be treated.

Furthermore, in the case of files having variable transfer rates just as the fourth and fifth files, if the transfer rate momentarily exceeds a transfer rate treatable by each apparatus, the real-time characteristic cannot be maintained; therefore, by recording information having the maximum rate, such trouble can be prevented.

By recording the transfer rate, the number of tracks (file time) and time for transfer (reproduction time when reproduction of a video data file is instructed) can be clarified; furthermore, by the data control apparatus and the data recording/reproducing apparatus, the transfer rate is maintained, whereby the real-time characteristic of data can be maintained.

The recording start position is herein described as the number of order of a track from the beginning, from which recording is started.

By recording this kind of file system information, data having the real-time characteristic such as video and audio data can be treated. Furthermore, even data having variable transfer rates can be treated by considering the difference between the transfer rate and the recording rate.

The present invention is applicable even when the data control apparatus 151 controls a plurality of data recording/reproducing apparatus 156. Furthermore, files can be copied/moved by instructing a data recording/reproducing apparatus 156*a* to carry out recording and by instructing a data recording/reproducing apparatus 156*b* to carry out reproduction at the same time. At this time, the file manager 152 can have a function to refer to a rate applicable to each data reproducing apparatus and to judge whether this kind of operation is possible or not.

The data recording/reproducing apparatus 156*a* and the data recording/reproducing apparatus 156*b* may have the same specifications, or may have different specifications having the same function.

Embodiment 11

Figure 18:
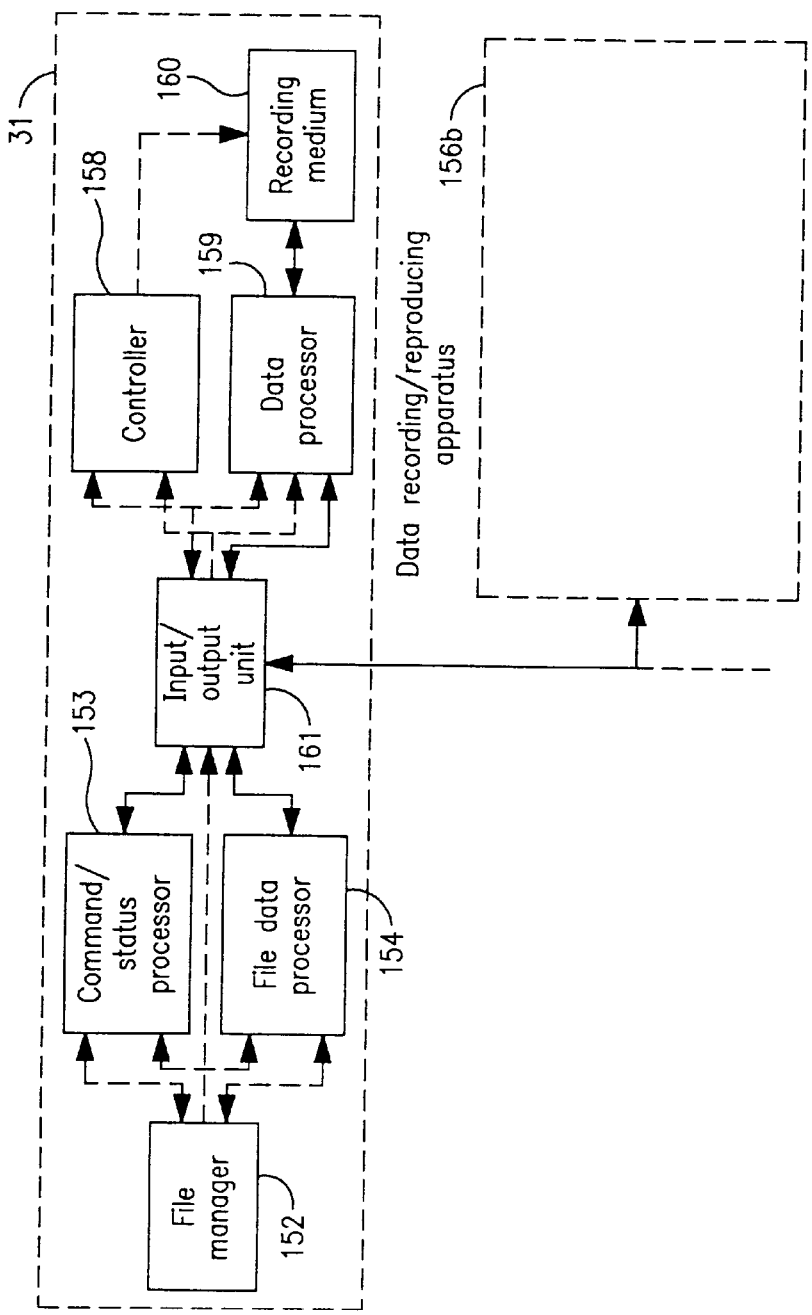
FIG. 18 is a block diagram showing a data control apparatus and a data recording/reproducing apparatus in accordance with an eleventh embodiment.

The present invention can also be applied as it is even when the data control apparatus 151 and the data recording/reproducing apparatus 156 are integrated into one apparatus. This corresponds to an eleventh embodiment of the present invention, and its block diagram is shown in FIG. 18. In this case, it is possible to have a configuration wherein the data control apparatus 151 and the data recording/reproducing apparatus 156a are integrated into one apparatus and connected to the data recording/reproducing apparatus 156b. In this case, the input/output unit 161 is supposed to have the same function as the function of the input/output unit 155 combined with the function of the input/output unit 157.

Herein, the file time is represented by the number of tracks; however, even when the number of frames, time in terms of second or other unit is used, the same effect can be obtained. When recording is carried out sequentially on a tape medium, file time can be obtained by using a combination of a recording start position and a recording end position, instead of using a combination of the recording start position and the number of tracks; and the same effect as that of the present invention can be obtained.

Furthermore, although the transfer rate is set at 1 for 300 tracks/sec and indicated by a ratio with respect to this value, the same effect can be obtained regardless of any representation. Although the recording start position is represented by, so to speak, an absolute address by using the number of tracks counted from the beginning of the tape, the same effect can also be obtained regardless of any representation. The kind of recorded data is not limited to the VCR recording format, but any kinds of files can be treated.

Embodiment 12

Figure 19:
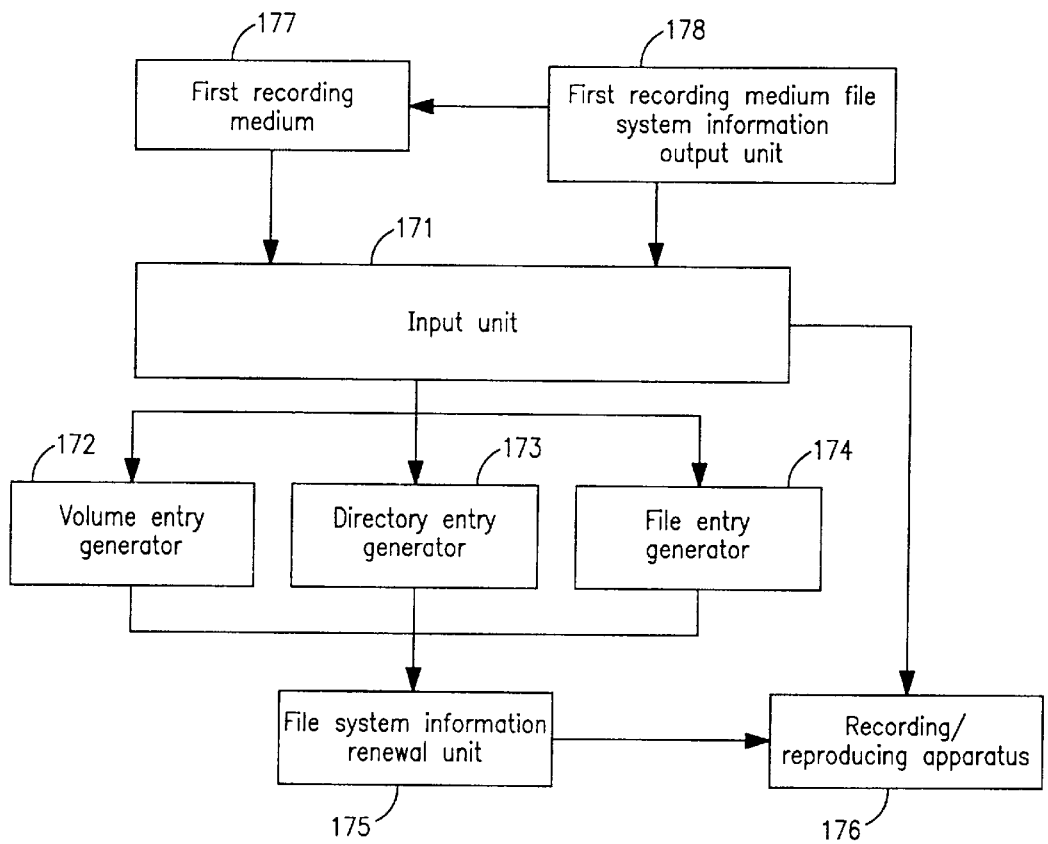
FIG. 19 is a block diagram of an apparatus for attaining a twelfth embodiment.

FIG. 19 shows a block diagram in accordance with a twelfth embodiment; in FIG. 19, the numeral 171 represents an input unit, the numeral 172 represents a volume entry generator, the numeral 173 represents a directory entry generator, the numeral 174 represents a file entry generator, the numeral 175 represents a file system information renewal unit, the numeral 176 represents a recording/reproducing apparatus, the numeral 177 represents a first recording medium, and the numeral 178 represents a first recording medium file system information output unit; and a file system information generation apparatus comprises the volume entry generator 172, the directory entry generator 173 and the file entry generator 174. It is supposed that portions represented by the same numerals have the same configurations and functions. The file system information generation apparatus in accordance with the present embodiment generates entries used as information for controlling a file, a directory and a volume, and the entries are referred to as a file entry and a directory entry and a volume entry, respectively. All the file entry, directory entry and volume entry related to the recording/reproducing apparatus 176 (or a recording medium retained by the recording/reproducing apparatus 176) are linked to form file system information.

Regarding the file system information generation apparatus configured as described above, its operation will be described below.

It is supposed that file data (hereinafter referred to as file A) is transferred from the first recording medium 177 to the file system information generator 175. The first recording medium is assumed to be an existing recording medium, such as a hard disk, a floppy disk, a CD-ROM or the like. Furthermore, data transfer from the first recording medium 177 to the file system information renewal unit 175 is to subject the file A recorded on the first recording medium 177 to a predetermined conversion by using the input unit 171 and to move (hereinafter referred to as move) it to the recording/reproducing apparatus 176 (or a recording medium retained in the recording/reproducing apparatus 176), or to subject the file A recorded on the first recording medium 177 to a predetermined conversion by using the input unit 171 and to copy (hereinafter referred to as copy) it to the recording/reproducing apparatus 176 (or a recording medium retained by the recording/reproducing apparatus 176), for example. In the case of move, the file A is deleted from the first recording medium 177 after the file A is recorded by the recording/reproducing apparatus 176.

For example, in order to control data to be recorded on a home-use digital VCR "DV" by using file system information generated by the present embodiment, the file system information is required to be recorded on the DV tape. By using such a method as disclosed in Japanese Patent Application No. Hei 9-67633, data of 64 bytes can be recorded with a sync block, i.e., the minimum recording unit, used as a physical sector. Therefore, by dividing each entry in units of 64 bytes and by assigning to one or more sectors, entries used as logical recording units can be matched with sectors used as physical recording units, whereby an information restoration process and the like can be carried out easily if an error occurs.

The recording medium retained by the recording/reproducing apparatus 176 is herein referred to as a second recording medium. In addition, the second recording medium may have such anadditional recording midium as MIC (Memory In Cassette) of the DV, for example.

File file system information regarding the file A is input from the first recording medium file system information output unit 178 to the input unit 171. The information regarding the file A input to the input unit 171 is input to the volume entry generator 172, the directory entry generator 173 and the file entry generator 174; and a file entry regarding the file A recorded by the recording/reproducing apparatus 176, a directory entry regarding a directory to which the file A is belong as necessary or a volume entry as necessary is generated. Alternatively, for example, correction of a volume name/a directory name/a file name is also processed by the volume entry generator 172, the directory entry generator 173 and the file entry generator 174.

The file recorded by the second recording medium has a hierarchical structure of a volume, a root directory, directories and files; and only one root directory forming the root of directories is present in one volume. Furthermore, files or directories at the (n+1)th hierarchical level can be present under a directory at the nth hierarchical level. Files or directories are not always required to be present under a directory.

Figure 20A:
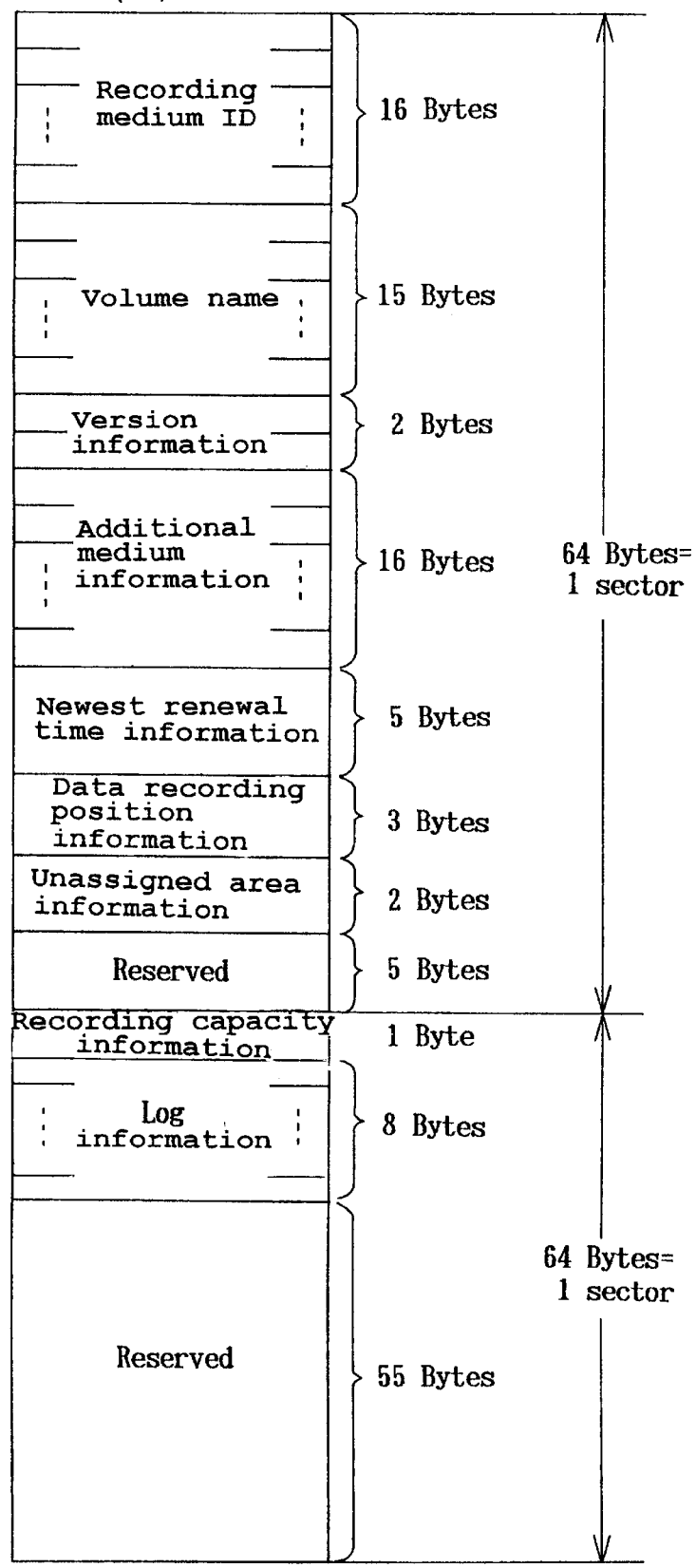

The volume entry generator 172 generates such information as that shown in FIG. 20(a). A recording medium ID for identifying the second recording medium, a volume name indicating the name of a volume used as the maximum unit of data to be recorded on the second recording medium, the newest renewal time information used as the newest time when the data of the second recording medium is renewed (including addition), data recording position information used as the information of a position wherein file system information is recorded on the second recording medium (when the next data is recorded, file system information recorded previously can be rewritten and deleted by starting recording from here), and file system information unassigned area information indicating unassigned areas in file system information are generated.

Regarding the data recording position information and the file system information unassigned area information, the volume entry generator 172 generates only the initial value to be used when a volume is set at first; and renewal by recording files and directories is carried out by the file system information renewal unit 175.

As information other than those described above, when this kind of entry information is improved for example, version information is used to control the version of its format. As for recording capacity information, in the case when the recording medium is a tape, the remaining amount of the recording medium can be calculated by setting a value indicating the length of the tape. As for log information, error generation condition and tape usage condition/environment are retained as information, whereby quality control for securely reading data from the recording medium can be attained.

In the case when a second recording medium has anadditional recording midium, part of data recorded on the additional recording midium is used as auxiliary information. In the case of the MIC (Memory In Cassette) of the DV, three bits of APM (Application ID on MIC), five bits of BCID (Basic Cassette ID), five bytes of Cassette ID Pack, five bytes of Tape Length Pack and five bytes of Title End Pack are assigned at the first 16 bytes of this memory. By these, information regarding the capacity of this memory and the tape recording end position can be obtained. In the case when there L is an apparatus capable of treating the additional recording midium and an apparatus incapable of treating it, if recording is carried out once by using the apparatus capable of treating the additional recording midium and recording is then carried out by using the apparatus incapable of treating the additional recording midium, a difference is caused between the content of the tape and the content of the additional recording midium for controlling it. When 16-byte information to be recorded at the head of the above-mentioned MIC is set at the volume entry, the additional recording midium is not renewed if recording is carried out by using the apparatus incapable of treating the additional recording midium; however, the auxiliary information in the volume entry is set as a value to be essentially recorded on the additional recording midium, whereby the difference can be confirmed by comparing both information again by using the apparatus incapable of treating the additional recording midium.

The directory generator 173 generates directory names, directory attribute information, the newest renewal time information of directories, and continuity flags indicating whether the directory entry information ends at this sector or continues to other sectors as shown in FIG. 20(b). By setting a continuity flag in each sector, application to a long directory name for example can be carried out efficiently.

The file entry generator 174 generates file names, a file attribute information, the newest renewal time information of files, file sizes, file recording position information on the second recording medium, and continuity flags indicating whether the file entry ends at this sector or continues to other sectors, as shown in FIG. 20(c). By setting a continuity flag in each sector, application to a long file name for example can be carried out efficiently.

As information other than those described above, recording format information is generated. In the case of the DV for example, although the basic recording format onto a tape is identical; however, the portion of data has compression/recording formats inherent to each of the video data of SD (NTSC and PAL systems), video data for low-rate recording of SD, video data of HD (HiVision), video data of MPEG and the like; in the case when video data recorded by the DV system is used as a file as it is, information regarding this recording format is required in order to know what kind of data this file has; therefore, a signal referred to as STYPE, 50/60 bit stipulated as the recording format of the DV may be used as recording format information.

Furthermore, in the case of a video recording apparatus such as a DV for example, recording in accordance with the standard track width may be mixed with recording in accordance with a narrow track width for long-time recording; therefore the recording density information is information required to control recording capacities and recording positions.

File copyright information indicates the copyright of the data of this file. As a value, information such as CGMS (Copy Generation Management System) can be used. In the CGMS, two-bit data is used; 11 represents copy prohibition, 10 represents copy OK only once, and 00 represents free copying. Defining for files is possible, and defining for each of video/audio is also possible.

By using the same information as those used for ordinary HDDs and CD-ROMs for example as directory attribute information and file attribute information, it is possible to indicate whether the information is a read-only file, a hidden file, a system file or a directory by using ON/OFF at each bit, and identification between the file entry and the directory entry can be carried out simultaneously. (If the attribute information has no directory bit, a file/directory identification flat is required for each entry.)

After adding new entries, the file system information renewal unit 175 renews the content entry ID and the next entry ID of the directory entry, the next entry ID of the file entry, and the data recording position information of the volume entry, from the entries generated by the volume entry generator 172, the directory entry generator 173 and the file entry generator 174.

The content entry ID of the directory entry selects either a file belonging to the directory or the directory (content), and sets the entry ID of the selected content. If there is no content, a value indicating no content is set. As this value, the entry ID of the volume entry for example can be used. Other than the value, a value exceeding the maximum value capable of being taken as the entry ID can be set, or a flag indicating the presence or absence of a content can be set separately.

As for the next entry ID of the directory entry, a directory or file belonging to the directory (parent directory) to which this directory belong is selected, and the entry ID of the entry of the selected one is set. At the time of the selection, it is supposed that the selection is carried out not to select a directory or file designated by the content entry ID of a parent directory entry, or a directory or file designated by the next entry ID of the entry of a file of directory already belonging to the same parent directory, whereby the same file or directory is not designated two or more times. When there is no more file or directory belonging to the parent directory, the next entry ID of the content entry selected last is set as a value indicating that there is no file or directory. As this value, the entry ID of the volume entry for example can be used. Other than the value, a value exceeding the maximum value capable of being taken as the entry ID can be set, or a flag indicating the presence or absence of a content can be set separately, or a flag indicating its presence or absence can also be set separately. The entry ID of the file entry can be set just as the above-mentioned directory entry.

Furthermore, the address of a sector can be used as an entry ID. Since each entry is assigned at one or more sectors, when entries are arranged in order, their locations cannot be determined immediately; however, since the addresses of the sectors are absolute positions, the casette information can be analyzed easily.

When these entries are registered in the file system information, it is possible to place a volume entry at the head at first, and directory and file entries can be placed thereafter; whereby sector addresses can also be used for the file system information unassigned area information. With this arrangement, the volume entry, being present as only one in the file system information, is placed at the same position at all times, and the file system information can be analyzed easily. Furthermore, since the root directory located at the top of the directory/file hierarchical structure is used as a reference, if the directory entry (hereinafter referred to as a root entry) of the root directory is registered at the position next to the volume entry in the file system information, the file system information can be analyzed easily.

In the case when a DV is used for example, data recording position information can be represented by using absolute addresses (Absolute Track no.) set at each track. In other words, at the time of recording, by confirming how far recording has been carried out, and by using this as data recording position information, its absolute address should only be accessed directly when append recording is attempted next, whereby it is not necessary to carry out extra processing.

Figure 21:
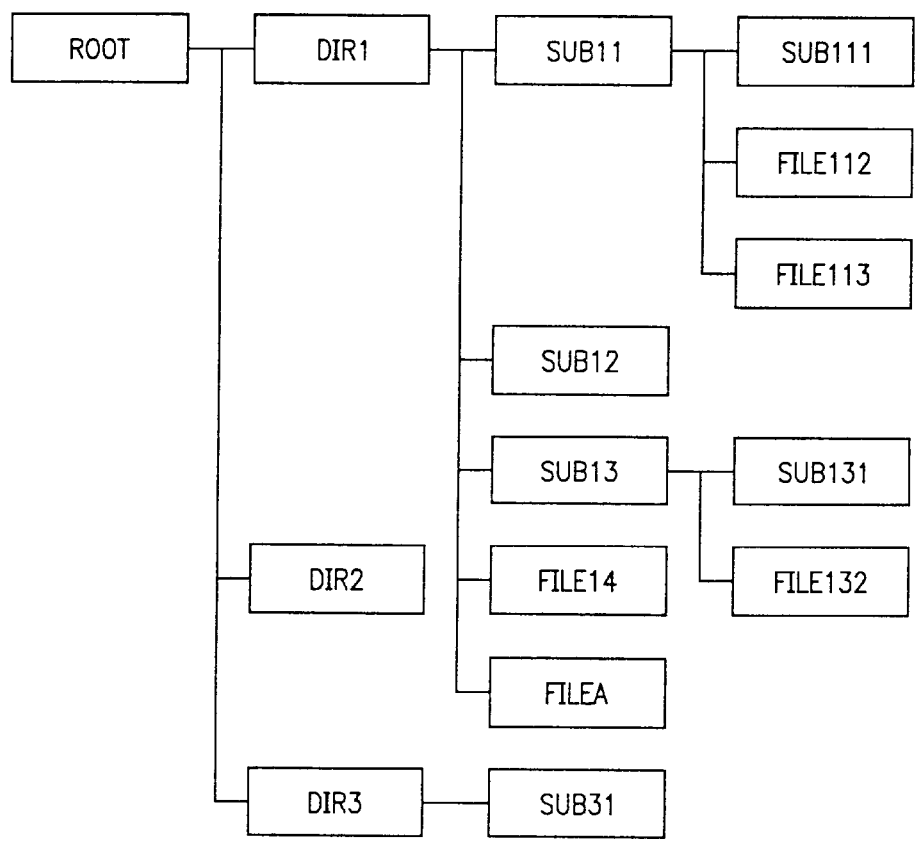
FIG. 21 is a hierarchical structural view of a root directory, directories and files.

Methods of renewing, adding and deleting entries in the file system information by using entries are described below. FIG. 21 is a view showing a hierarchical structure of a volume, directories and files, and FIG. 22 shows the entries of the volume, directories and files structured as shown in FIG. 21. In FIG. 21, ROOT represents a root directory, VOLUMEX represents a volumename, DIR1, DIR2, DIR3, SUB11, SUB12, SUB13, SUB31, SUB111 and SUB131 represent directory names, and FILE14, FILE112, FILE113 and FILE132 represent file names. In FIG. 22, for the sake of explanation, the volume name and file system information unassigned position information among the information constituting the volume entry are indicated; directory names, valid flags, content entry IDs and next entry IDs among the information constituting directory entries are indicated; and file names, valid flags and next entry IDs among information constituting file entries are indicated. Y in the valid flag column indicates that the directory or file indicated by the entry is valid.

In FIG. 22, in directories DIR2, SUB12, SUB31 and SUB111, the content entry ID is NF. This means that these directories do not have directories or files just as the configuration shown in FIG. 21. Furthermore, SUB11, SUB12, SUB13 and FILE14 are present under DIR1; the next entry ID of SUB11 is the entry ID of SUB12, that is, 6; the next entry ID of the SUB12 subsequent thereto is the entry ID of SUB13, that is, 7; the next entry ID of the SUB13 subsequent thereto is the entry ID of FILE14, that is, 11; the next entry ID of FILE14 subsequent thereto is NF indicating that there is no subsequent file or directory. Since the file name and volume name are not so long as that their entries occupy two or more sectors, one entry is assigned herein in one sector.

Figure 23:
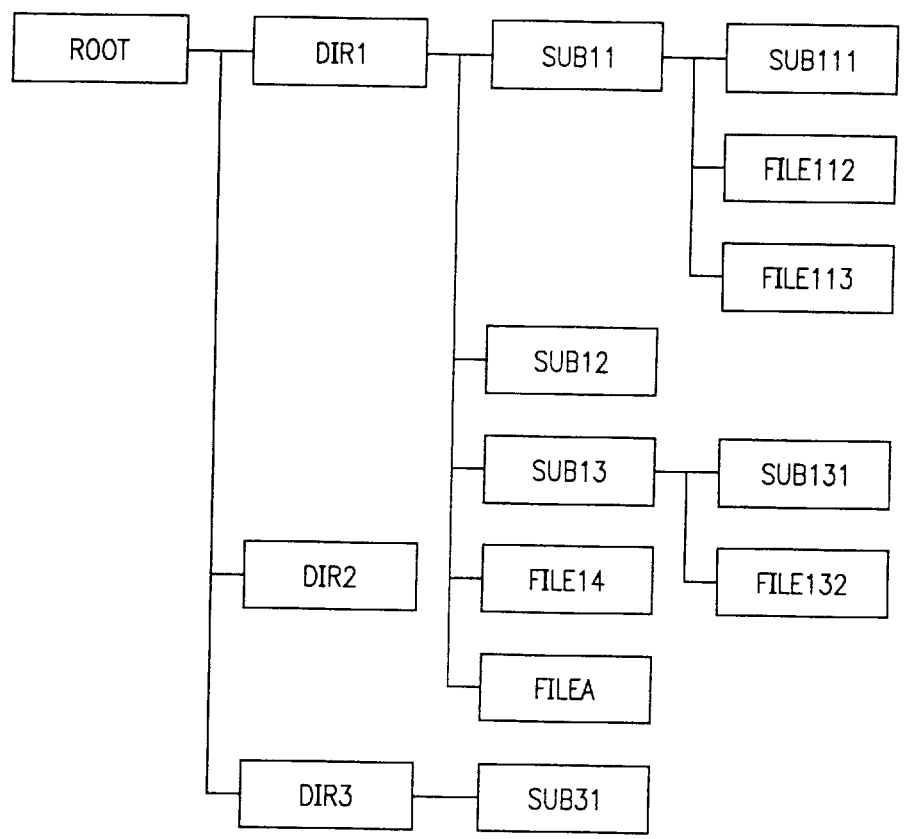
FIG. 23 is a hierarchical structural view of a root directory, directories and files.

Herein, a hierarchical structure wherein file A is copied under DIR1 is shown in FIG. 23, and entries in this case are shown in FIG. 24.

In the case when the file A is added under DIR1 as shown in FIG. 23 and FIG. 24, the next entry ID of FILE14 is changed from NF to the entry ID of the file A, that is, 15, and the next entry ID of the file A becomes NF. Furthermore, since the number of file entries has increased by one, the file system information unassigned position information of the volume entry is renewed from 15 to 16.

Next, a method of renewing the file system information at the time when a directory or a file in the file system information is deleted is described. When FILE112 shown in FIG. 21 is deleted, the file attribute of FILE112 is changed from Y to M which indicates that the file is invalid; since FILE112 becomes invalid, the next entry ID of SUB111 which is a directory located under SUB11 and at the same hierarchical level as that of FILE112 is changed from the entry ID of FILE112, i.e., 12 to the entry ID of FILE113, i.e., 13. Furthermore, when SUB131 and FILE132 are deleted, the directory attribute of SUB131 and the file attribute of FILE132 are set at M, and the content entry ID of SUB13, that is, a directory located thereabove is set at NF.

By generating file system information as described above, file format data can be treated.

In the present embodiment, it is possible to limit the amount of the file system information to a constant amount. By the limiting, the upper limit of the file system information on the second recording medium can be limited. Furthermore, access can be quickened when all of file system information are read at one time and renewed.

Although the capacity of one sector is set at 64 bytes in the present embodiment, the present invention is applicable to any capacity. Although file system information and file A renewed by file movement or the like is recorded in the recording/reproducing apparatus 176, it is sufficient that the renewed file system information should only be recorded on the second recording medium until the second recording medium is taken out of the recording/reproducing apparatus 176.

Entry examples are shown in FIG. 20; however, these are only examples; all of information are not necessarily required, and other information can be incorporated. Furthermore, the amounts of bytes/bits required to represent the information are also examples; and the same effect can be obtained by using other values. Although a sector address is used as an entry ID, the present invention is applicable even when other values are used.

Embodiment 13

Figure 25:
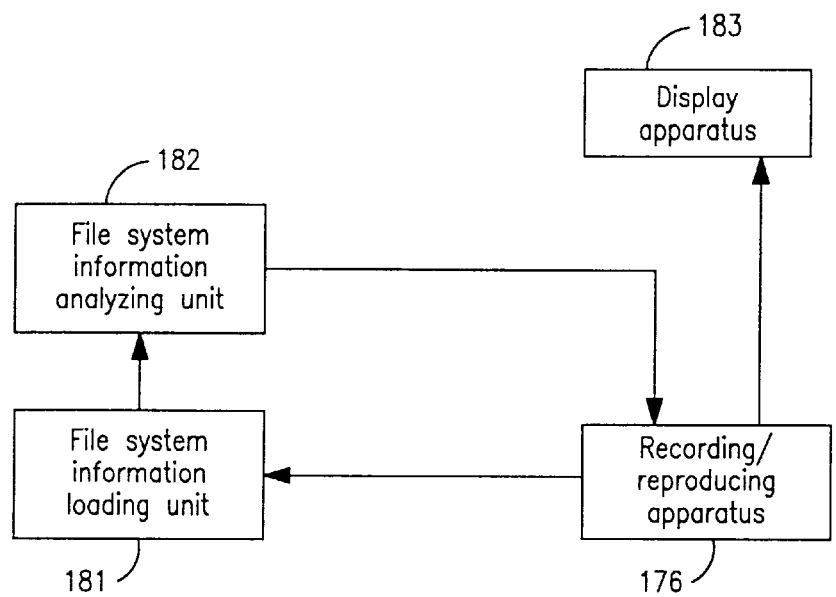
FIG. 25 is a block diagram of apparatuses for attaining a thirteenth embodiment.

A thirteenth embodiment in accordance with the present invention is shown in FIG. 25 as a block diagram; in FIG. 25, the numeral 181 represents a file system information loading unit, the numeral 182 represents a file system information analyzer, and the numeral 183 represents a display apparatus. Hereinafter, it is supposed that the portions represented by the same numerals have the same configuration and function. Its operation will be described below.

Figure 26:
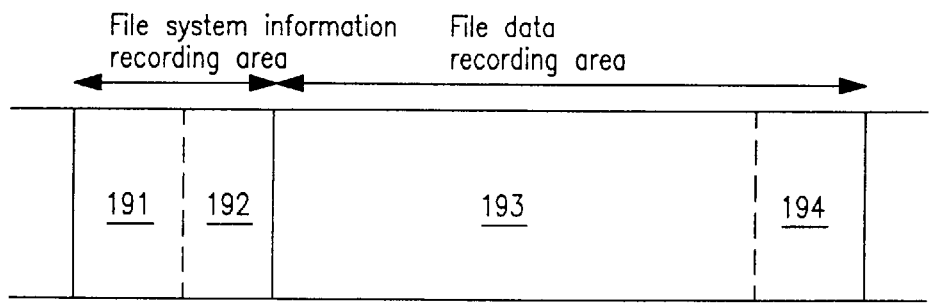
FIG. 26 is a view of an example showing a condition of a recording medium on which recording is carried out by the apparatuses in accordance with the twelfth and thirteenth embodiments.

In the recording medium inside the recording/reproducing apparatus 176, areas for recording file system information are stipulated. FIG. 26 shows an example of a tape wherein recording is carried out by the recording/reproducing appa ratus 176 in accordance with the present invention. In FIG. 26, the numerals 191 and 192 represent a file system information recording area; and the numerals 193 and 194 represent an actual data recording area, i.e., a file data recording area. Herein, among the file system information recording area, the area 191 is an area wherein file system information has already been recorded, and the area 192 is an unassigned file system information recording area wherein file system information is not yet recorded. The area 193 is an area wherein file data has already been recorded, and the area 194 is an unassigned file data recording area wherein file data is not yet recorded.

First, a signal obtained by reproducing the area 191 by the recording/reproducing apparatus 176 is input to the file system information loading unit 181, the file system information loading unit 181 converts its input signal into the format of the file system information, and outputs to the file system information analyzer 182. The volume entry, directory entries and file entries constituting the file system information are assumed to be the same as those indicated before (the twelfth embodiment). In other words, they are assumed to have the configurations shown in FIGS. 20, 21 and 22.

Since sectors have a fixed length, the file system information analyzer 182 first carries out separation in sector units, extracts/checks their continuity flags, and carries out division in entry units. The volume entry is analyzed to extract a recording medium ID, a volume name, auxiliary information which is part of data of the additional recording midium of the recording medium, the newest renewal time information of the recording medium, data recording position information indicating the head position of the area 194, i.e., the head position of the unassigned portion in the file data recording area of the recording medium, file system information unassigned area information indicating the head position of the area 192, i.e., the head position of the unassigned portion in the file system information recording area.

Figure 27:
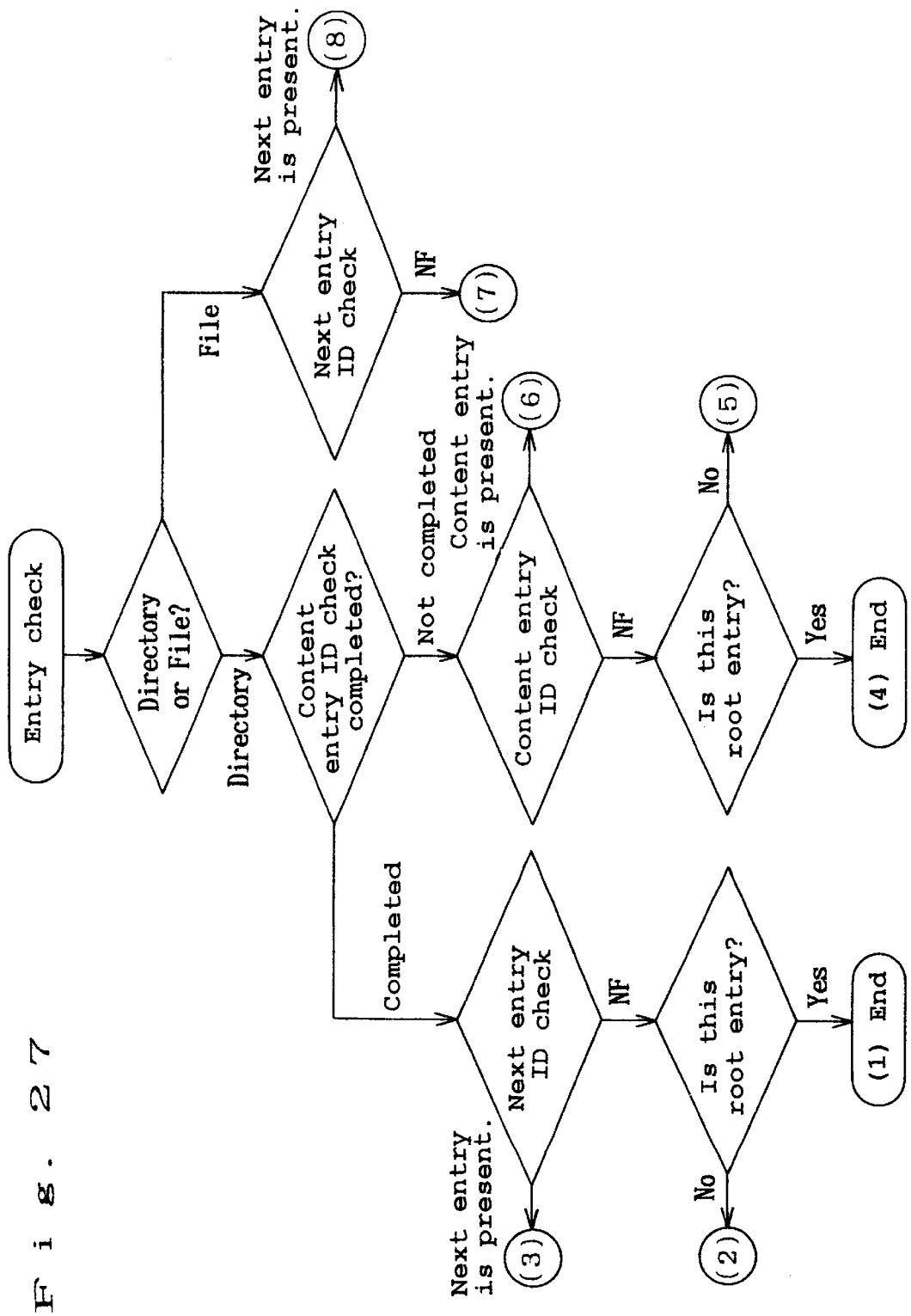
FIG. 27 is an explanatory view of an algorithm for attaining the thirteenth embodiment.

Next, content entry IDs and next entry IDs are extracted from all directory entries, and content entry IDs are extracted from all file entries; all entries are checked on the basis of an analysis rule shown in FIG. 27 and TABLE 1; and the hierarchical structure of directories and files is restructured in accordance with the relationship between the content entry IDs and the next entry IDs. The entry to be checked first by this analysis rule must be the root entry.

a file name are extracted; by using necessary information from among these information, the restructured hierarchical structure of directories/files is displayed by the display apparatus 183.

An example of file system information is shown in FIG. 22, and a hierarchical structure reflecting the file system information of FIG. 22 is shown in FIG. 21, and how the file system information is analyzed is described specifically.

First, the next entry ID of the root directory has been set at NF. This indicates that the root directory is at the top of the hierarchical structure and that other directories and files are not present at the same hierarchical level. The content entry ID of the root entry is the entry ID of DIR1, i.e., 2, whereby it is known that DIR1 is present just below the hierarchical level of the root directory. Next, the next entry ID of DIR1 is the entry ID of DIR2, i.e., 3; furthermore, the next entry ID of DIR2 is the entry ID of DIR3, i.e., 4. In addition, the next entry ID of DIR3 is NF indicating that there is no directory or file in the same hierarchical level. As a result, it is known that DIR1, DIR2 and DIR3 are present in the hierarchical level just under the root directory. Furthermore, the content entry ID of DIR2 is set at NF. This indicates that there is no directory or file in the hierarchical level just under DIR2.

By using the present embodiment as described above, it is possible to analyze file system information when file format data is treated by a magnetic tape medium for a DV and the like.

Embodiment 14

Figure 28:
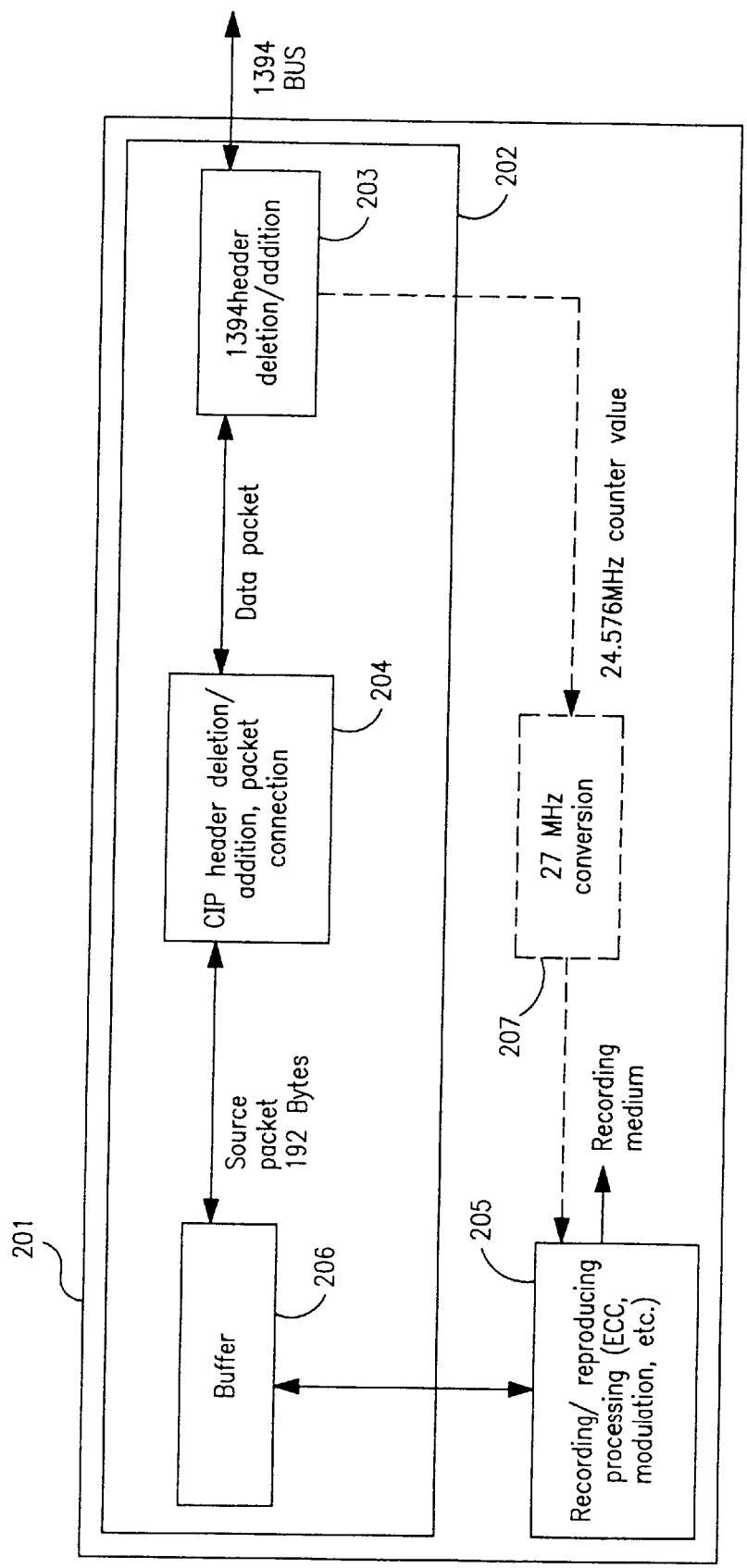
FIG. 28 is a block diagram of apparatuses for attaining a memorizing/reproducing apparatus in accordance with a fourteenth embodiment.

FIG. 28 is a block diagram showing a recording/reproducing apparatus in accordance with a fourteenth embodiment; in FIG. 28, the numeral 201 represents a recording/reproducing apparatus, the numeral 202 represents a transmission/reception unit, the numeral 203 represents a 1394 header deletion/addition means, the numeral 204 represents a CIP header deletion/addition and packet connection means, the numeral 205 represents a recording/reproducing processing means, the numeral 206 represents a buffer, and the numeral 207 represents a clock conversion means. In the recording/reproducing apparatus configured as described above, its operation will be described below.

The recording/reproducing apparatus 201 selects and receives packets to be received, from among data packets received by the transmission/reception unit 202 by watching the 1394 header and the CCIP header. Transmitted channel

TABLE 1

| | Directory entry or file entry? | Check of content entry ID completed or not? | Content of content entry ID? | Content of next entry ID? | Process to be carried out |
|---|---|---|---|---|---|
| (1) | Directory (Root) | Completed | — | NF | End |
| (2) | Directory (Other than Root) | Completed | — | NF | Moving to parent directory entry |
| (3) | Directory | Completed | — | Value other than NF | Moving to entry designated by next entry ID |
| (4) | Directory (Root) | Not completed | NF | — | End |
| (5) | Directory (Other than Root) | Not completed | NF | — | Moving to parent directory entry |
| (6) | Directory | Not completed | Value other than NF | — | Moving to entry designated by content entry ID |
| (7) | File | — | — | NF | Moving to patent directory entry |
| (8) | File | — | — | Value other than NF | Moving to entry designated by next entry ID |

From a directory entry, directory attribute information, the newest renewal time information of the directory and a directory name are extracted; and from a file entry, file attribute information, recording density information, recording format information, the newest renewal time information of the file, a file size, file recording position information and numbers, data transmission destinations, types of data and the like, that is, information regarding received data, can be distinguished by the header. The 1394 header and the CIP header in the received packets are removed by the 1394 header deletion/addition means 203 and the CIP header deletion/addition and packet connection means 204, and the source packet is restored. At this time, error processing and the like are also carried out simultaneously.

Figure 29:
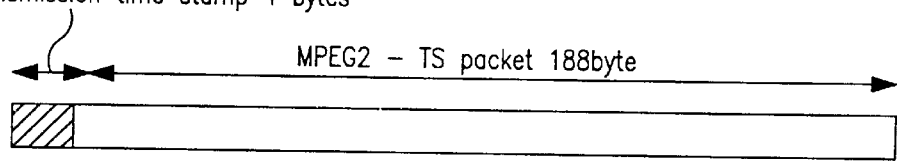
FIG. 29 is a diagrammatic view of a source packet for explaining processing at a signal source and others; ???

Herein, while transmission time stamps are not removed but remain added, the source packet of 192 bytes is output to the recording/reproducing processing means 205. The configuration of this source packet is shown in FIG. 29.

The recording/reproducing processing means 205 provides a recording process for the received source packet and carries out recording on a recording medium. At this time, by carrying out recording/reproduction after conversion into the format of the existing digital VCR "DV" by using such a method as disclosed in Japanese Patent Application No. Hei 9-67633, compatibility with the existing DV can be maintained; therefore, it is not necessary to make a distinction between the existing digital VCR format and MPEG recording, whereby cost reduction can be attained. Furthermore, it is not necessary to generate a recording time stamp and to add it to the source packet; and it is not necessary to analyze the content of each transport packet or to restore a clock following 27 MHz of the transmission source by using a PLL.

Furthermore, in the case when the problem of overflow/underflow may occur, it is possible to use a method of generating the clock of the IEEE1394 Interface ranging from 24.576 MHz to 27 MHz by using the clock conversion means 207 during recording or reproduction, or during both of them.

During reproduction, after processes such as demodulation and error correction are carried out by the recording/reproducing processing means 205, the source packet is restored. Since a transmission time stamp has already been included in the source packet, such a process of adding a transmission time stamp is not necessary at the transmission/reception unit 202 of the recording/reproducing apparatus.

Consequently, by using the transmission time stamp from the original signal source, the reception apparatus which receives transmission data from the recording/reproducing means 205 can transmit data having the same time interval as that of data, whereby decoding and image output can be carried out without causing the problem of overflow/underflow.

Embodiment 15

Figure 30:
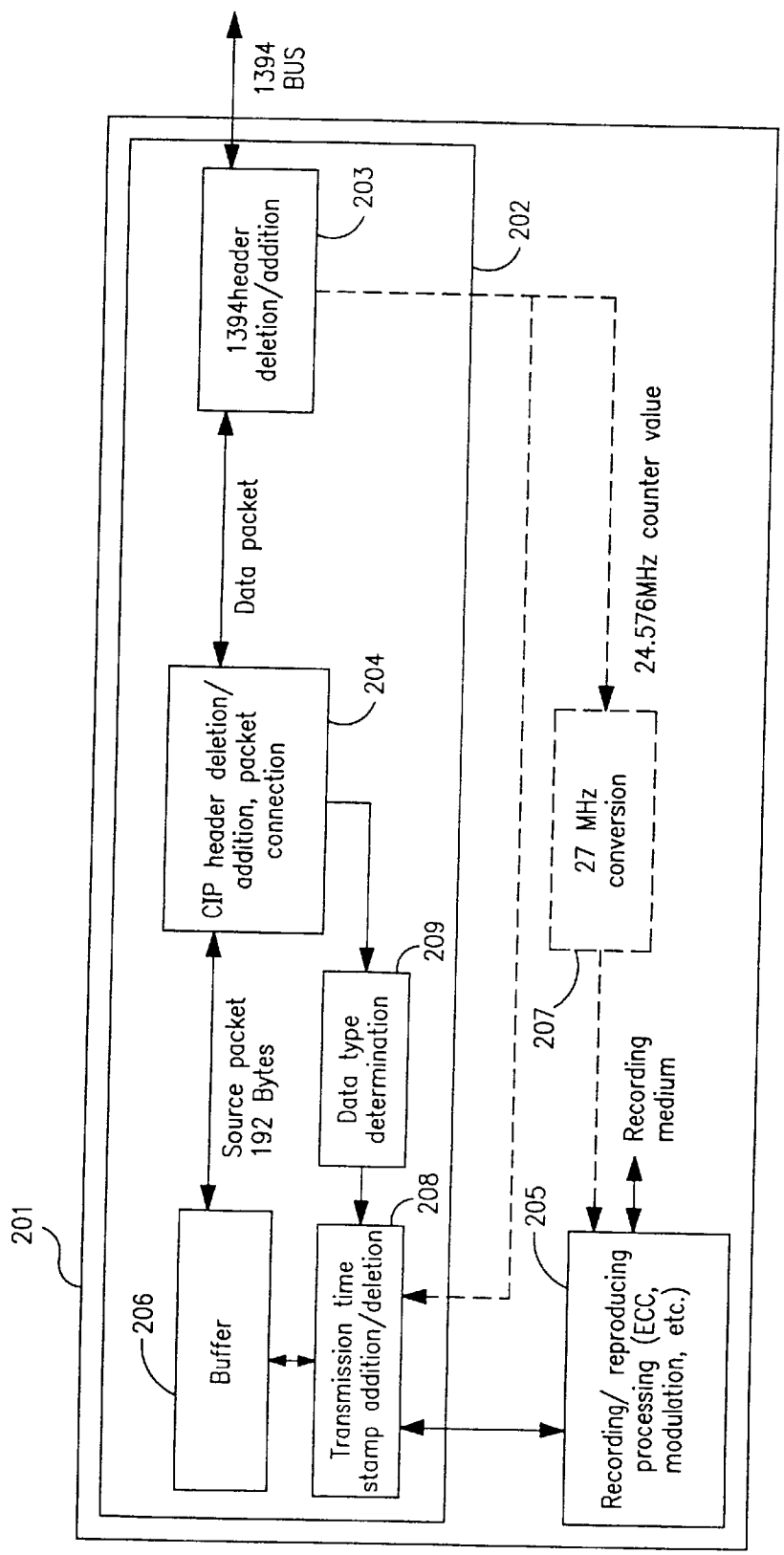
FIG. 30 is a block diagram of apparatuses for attaining a memorizing/reproducing apparatus in accordance with a fifteenth embodiment.

FIG. 30 is a block diagram showing a recording/reproducing apparatus in accordance with a fifteenth embodiment; in FIG. 30, the numeral 201 represents a recording/reproducing apparatus, the numeral 202 represents a transmission/reception unit, the numeral 203 represents a 1394 header deletion/addition means, the numeral 204 represents a CIP header deletion/addition and packet connection means, the numeral 205 represents a recording/reproducing processing means, the numeral 206 represents a buffer, the numeral 207 represents a clock conversion means, the numeral 208 represents a transmission time stamp addition/deletion means, and the numeral 209 represents a data type judgment means. In the recording/reproducing apparatus configured as described above, its operation will be described below.

The recording/reproducing apparatus 201 selects and receives packets to be received, from among data packets received by the transmission/reception unit 202 by watching the 1394 header and the CIP header. Transmitted channel numbers, data transmission destinations, types of data and the like, that is, information regarding received data, can be distinguished by the headers.

The 1394 header and the CIP header in the received packets are removed by the 1394 header deletion/addition means 203 and the CIP header deletion/addition and packet connection means 204, and the source packet is restored. At this time, error processing and the like are carried out simultaneously.

Herein, while transmission time stamps are not removed but remain added, the source packet of 192 bytes is output to the recording/reproducing processing means 205. The data type judgment means 209 distinguishes data type and the like by using the headers, and judges whether the transmission time stamp is to be deleted or not. As AV data transmittable on the IEEE1394, SD (the NTSC and PAL systems), HD (HighVision), SD-L (a compression system for low-rate recording of SD) and the like in the DV are available; information for identifying it is contained in the CIP header, whereby the input of the AV data and MPEG can be identified.

In the case when it is judged that the transmission time stamp is to be deleted, the transmission time stamp is deleted by the transmission time stamp addition/deletion means 208, and output is carried out to the recording/reproducing processing means 205. In the case when it is judged that the transmission time stamp is not to be deleted, the transmission time stamp is not deleted, and output is directly carried out to the recording/reproducing processing means 205. The data type judgment means 209 also transmits information regarding whether the transmission time stamp has been deleted or not to the recording/reproducing processing means 205.

The information regarding whether the transmission time stamp has been deleted or not is also recorded. The recording/reproducing processing means 205 provides a recording process for the received source packet and carries out recording on a recording medium. At this time, conversion into the format of the existing digital VCR "DV" is done, and recording/reproduction is carried out while compatibility with the existing DV is maintained, by using such a method as disclosed in Japanese Patent Application No. Hei 9-67633; therefore, it is not necessary to make a distinction between the existing digital VCR format and MPEG recording, whereby cost reduction can be attained.

Furthermore, it is not necessary to generate a recording time stamp and to add it to the source packet. Therefore, it is not necessary to analyze the content of each transport packet or to restore the 27 MHz clock by using a PLL. In the case when the problem of overflow/underflow may occur, it is possible to use a method of generating the clock of the IEEE1394 Interface ranging from 24.576 MHz to 27 MHz by using the clock conversion means 207.

During reproduction, after processes such as demodulation and error correction are carried out by the recording/reproducing processing means 205, the source packet is restored. In accordance with the information regarding whether the transmission time stamp has been deleted or not, whether the transmission time stamp is to be added or not is judged. In the case when a transmission time stamp has already been included in the source packet, such a process of adding a transmission time stamp is not necessary at the transmission/reception means 2 of the recording/reproducing apparatus. In the case when the transmission time stamp has already been included in the source packet, a transmission time stamp is generated and added by the transmission time stamp addition/deletion means 208 on the basis of reproduced timing.

Consequently, by using the transmission time stamp from the original signal source, the reception apparatus of a decoder which is supplied with transmission data from the recording/reproducing means and operates can transmit data having the same time interval as that of data, whereby decoding and image output can be carried out without causing the problem of overflow/underflow. By using this invention, application is possible to both cases: one case wherein the timing is required to be restored strictly, and the other case wherein the timing is not required to be restored strictly.

Embodiment 16

Figure 31:
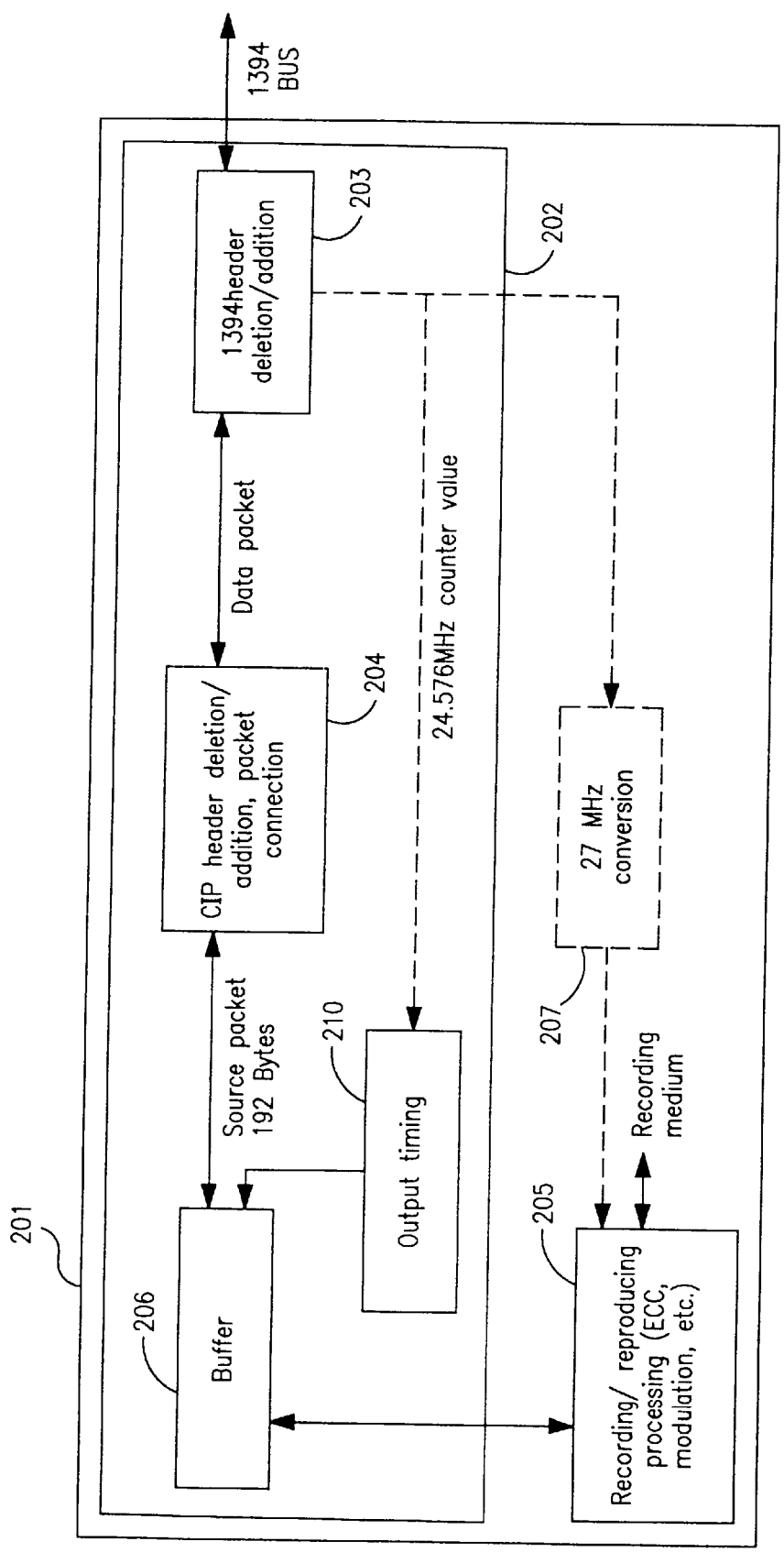
FIG. 31 is a data arrangement diagram for explaining a memorizing/reproducing apparatus in accordance with a sixteenth embodiment.

FIG. 31 is a block diagram showing a recording/reproducing apparatus in accordance with a sixteenth embodiment; in FIG. 31, the numeral 201 represents a recording/reproducing apparatus, the numeral 202 represents a transmission/reception unit, the numeral 203 represents a 1394 header deletion/addition means, the numeral 204 represents a CIP header deletion/addition and packet connection means, the numeral 205 represents a recording/reproducing processing means, the numeral 206 represents a buffer, the numeral 207 represents a clock conversion means, and the numeral 210 represents a timing extraction means. In the recording/reproducing apparatus configured as described above, its operation will be described below.

The recording/reproducing apparatus 201 selects and receives packets to be received, from among data packets received by the transmission/reception unit 202 by watching the 1394 header and the CIP header. Transmitted channel numbers, data transmission destinations, types of data and the like, that is, information regarding received data, can be distinguished by the headers.

The 1394 header and the CIP header in the received packets are removed by the 1394 header deletion/addition means 203 and the CIP header deletion/addition and packet connection means 204, and the source packet is restored. At this time, error processing and the like are also carried out simultaneously.

Herein, while transmission time stamps are not removed but remain added, each source packet of 192 bytes is output to the recording/reproducing processing means 205. The recording/reproducing processing means 205 provides a recording process for the received source packet and carries out recording on a recording medium. At this time, conversion into the format of the existing digital VCR "DV" is done, and recording/reproduction is carried out while compatibility with the existing DV is maintained (refer to Japanese Patent Application No. Hei 9-67633); therefore, it is not necessary to make a distinction between the existing digital VCR format and MPEG recording, whereby cost reduction can be attained.

Furthermore, it is not necessary to generate a recording time stamp and to add it to the source packet; and it is not necessary to analyze the content of each transport packet or to restore the 27 MHz clock by using a PLL.

In the case when the problem of overflow/underflow may occur, it is possible to use a method of generating the clock of the IEEE1394 Interface ranging from 24.576 MHz to 27 MHz by using the clock conversion means 207 during recording or reproduction, or during both of them.

During reproduction, after processes such as demodulation and error correction are carried out by the recording/reproducing processing means 205, the source packet is restored. Since a transmission time stamp has already been included in the source packet, such a process of adding a transmission time stamp is not necessary at the transmission/reception unit 202 of the recording/reproducing apparatus.

By the timing extraction means 210, the transmission time stamp added to the restored source packet is compared with the count value of the operation clock of the IEEE1394 Interface of the recording/reproducing apparatus, and output is carried out from the buffer 206 to the transmission/reception unit 202 at coincident timing.

As a result, the time interval for each packet, being shifted because of recording/reproducing, becomes identical to that being present before recording. Therefore, even if jitter which is increased because of recording/reproducing cannot be absorbed owing to a small buffer on the reception side, the condition wherein the above-mentioned jitter cannot be absorbed can be prevented by restoring the timing, to some extent, of transmission from the above-mentioned recording/reproducing apparatus to the above-mentioned transmission line on the basis of the transmission time stamp. Consequently, by using the transmission time stamp from the original signal source, the reception apparatus of a decoder which is supplied with transmission data from the recording/reproducing means can transmit data having the same time interval as that of data, whereby decoding and image output can be carried out without causing the problem of overflow/underflow.

Embodiment 17

Figure 32:
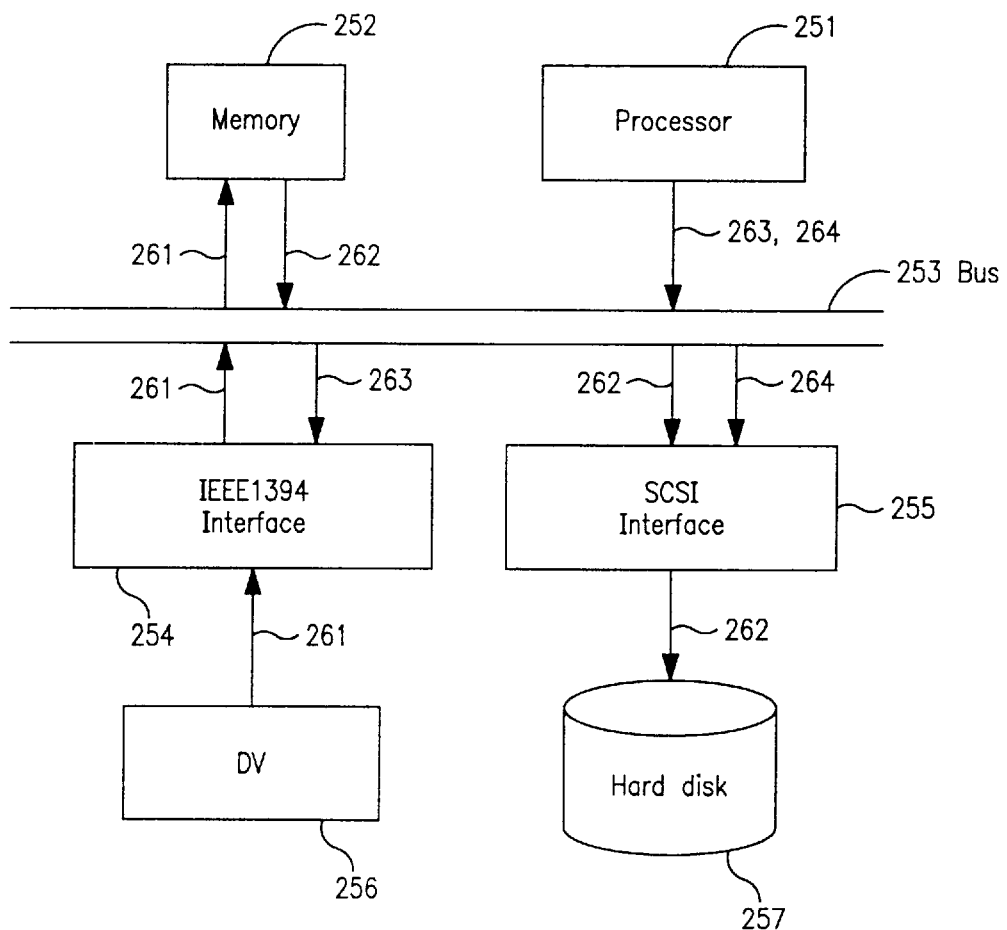
FIG. 32 is a block diagram of a computer in accordance with a seventeenth embodiment.

FIG. 32 is a block diagram showing the entire configuration of a computer in accordance with a seventeenth embodiment. In FIG. 32, the numeral 251 represents a processor, the numeral 252 represents a memory, the numeral 253 represents a bus, the numeral 254 represents an IEEE1394 Interface, the numeral 255 represents a SCSI Interface, the numeral 256 represents a DV, the numeral 257 represents a hard disk, the numeral 261 represents transmission data from the DV 256, the numeral 262 represents writing data to the hard disk 257, the numeral 263 represents a reception command for the reception data 261 of the DV 256, and the numeral 264 represents a writing command for the writing data 262 of the hard disk 257.

Figure 33:
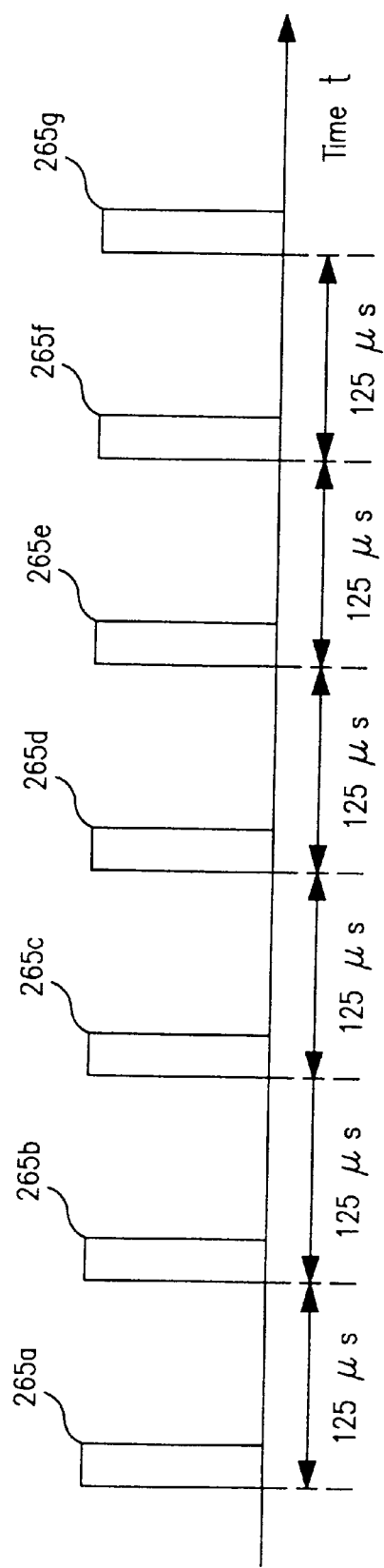
FIG. 33 is a view showing a concrete example of data 261 in accordance with the seventeenth embodiment.

FIG. 33 shows a concrete example of the data 261. In FIG. 33, the numerals 265a, 265b, 265c, 265d, 265e, 265f and 265g are transmission data packets from the DV 256.

Figure 34:
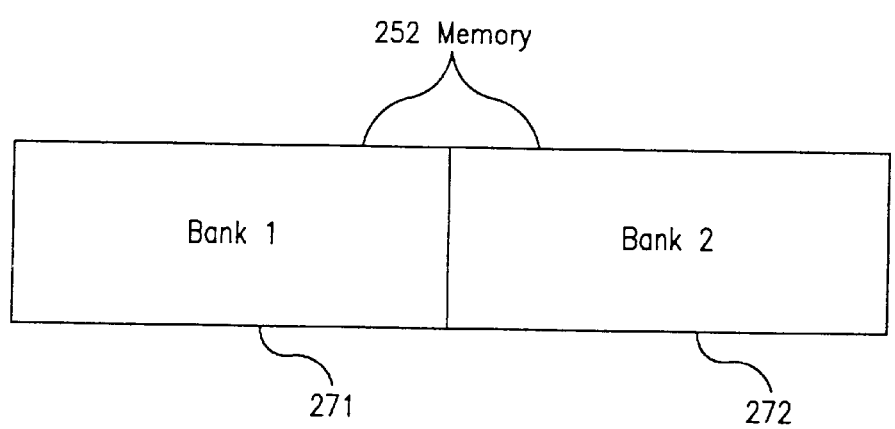
FIG. 34 is a view showing a configuration example of a memory 252 in accordance with the seventeenth embodiment.

FIG. 34 represents an example of the configuration of the memory 252. In FIG. 34, the numerals 271 and 272 represent banks.

Figure 35:
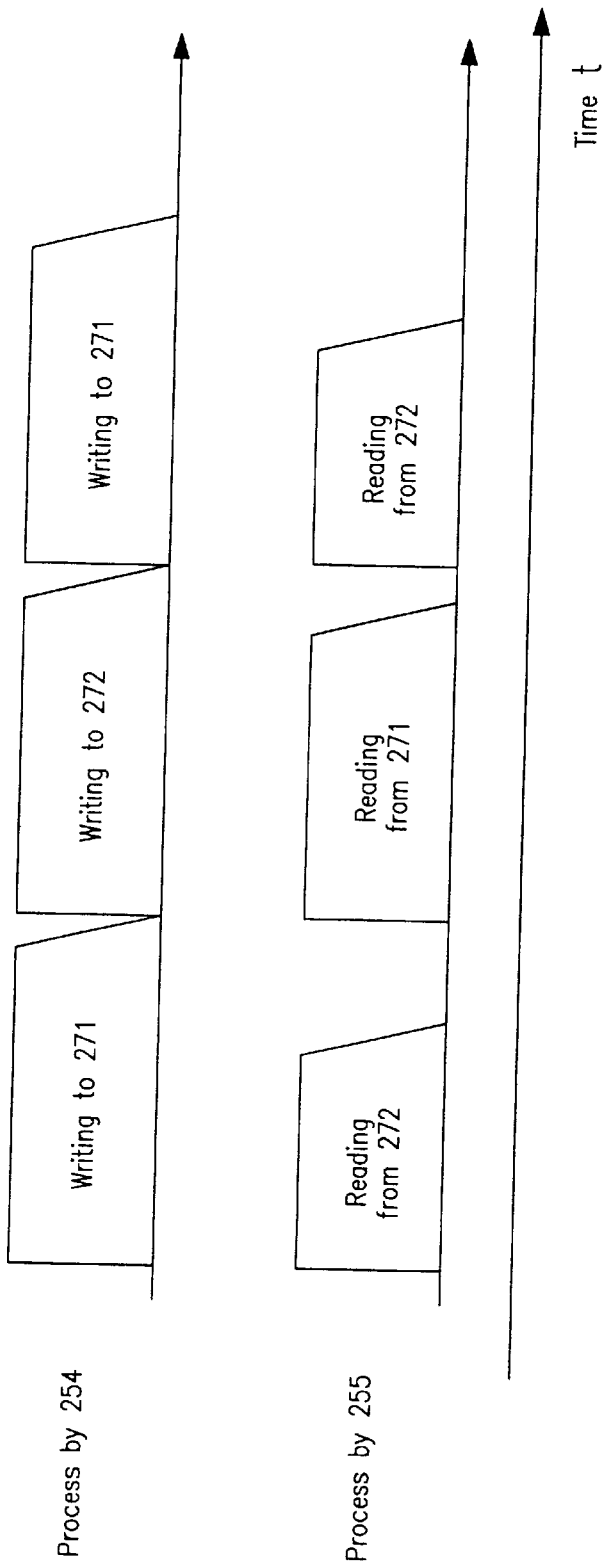
FIG. 35 is a time chart for data transmission in accordance with the seventeenth embodiment.

FIG. 35 is a time chart at the time when transmission data transmitted from the DV 256 is received and written on the hard disk 257.

The DV 256 keeps transmitting the data 261, and transmits the packets 265a to 265g every 125 microseconds as shown in FIG. 33.

First, the processor 251 transmits the reception command 263 to the IEEE1394 Interface 254. After receiving the reception command 263, the IEEE1394 Interface 254 receives the transmission data 261 transmitted from the DV 256, and writes it in the memory 252. At this time, data is written to the bank 271 of the memory 252 at first; when the bank 271 is filled, data is written to the bank 272. Furthermore, when the bank 272 is filled, data is written again to the bank 271.

Furthermore, the processor 251 transmits the writing command 264 to the SCSI Interface 255. After receiving the writing command 264, the SCSI Interface 255 takes out all of written data or only the required data, and writes the data as the writing data 262 on the hard disk 257. At this time, when the IEEE1394 Interface 254 is writing data to the bank 271 of the memory 252, data is read from the bank 272; when the IEEE1394 Interface 254 is writing data to the bank 272, data is read from the bank 271.

Once the processor 251 issues the reception command 263 and the writing command 264, the process of the IEEE1394 Interface 254 and the process of the SCSI Interface 255 are conducted in parallel as shown in FIG. 35. Therefore, the transmission data 261 transmitted from the DV 256 is written to the bank 271 or the bank 272 without fail; at the same time, the data written to the bank 271 and the bank 272 is written in the hard disk 257 via the SCSI Interface 105 without fail. As a result, all of the received transmission data 261 or required data among the transmission data 261 can be written completely on the hard disk 257.

Although it is configured that the process of the IEEE1394 Interface 254 and the process of the SCSI Interface 105 are conducted in parallel, a pseudo-parallel operation using time sharing or the like may be used.

Furthermore, although the memory 252 comprises two areas of the bank 271 and the bank 272, it may be divided into plural banks, and the size of each bank may be constant or variable. Moreover, all banks may have an equal size.

Besides, the writing of the transmission data 261 from the IEEE1394 Interface 254 to the memory 252 may be controlled by the processor 251 or may not be controlled by the processor 251.

In addition, the reading of the data 262 from the memory 252 to the SCSI Interface 255 may be controlled by the processor 251 or may not be controlled by the processor 251.

Furthermore, the IEEE1394 Interface may be a different interface capable of receiving stream data which is kept transmitted at nearly regular intervals at all times, and the SCSI Interface may be a different interface.

Moreover, the DV may be a different apparatus for outputting stream data which is kept transmitted at nearly regular intervals at all times, and the hard disk may be a different recording medium.

Embodiment 18

Figure 36:
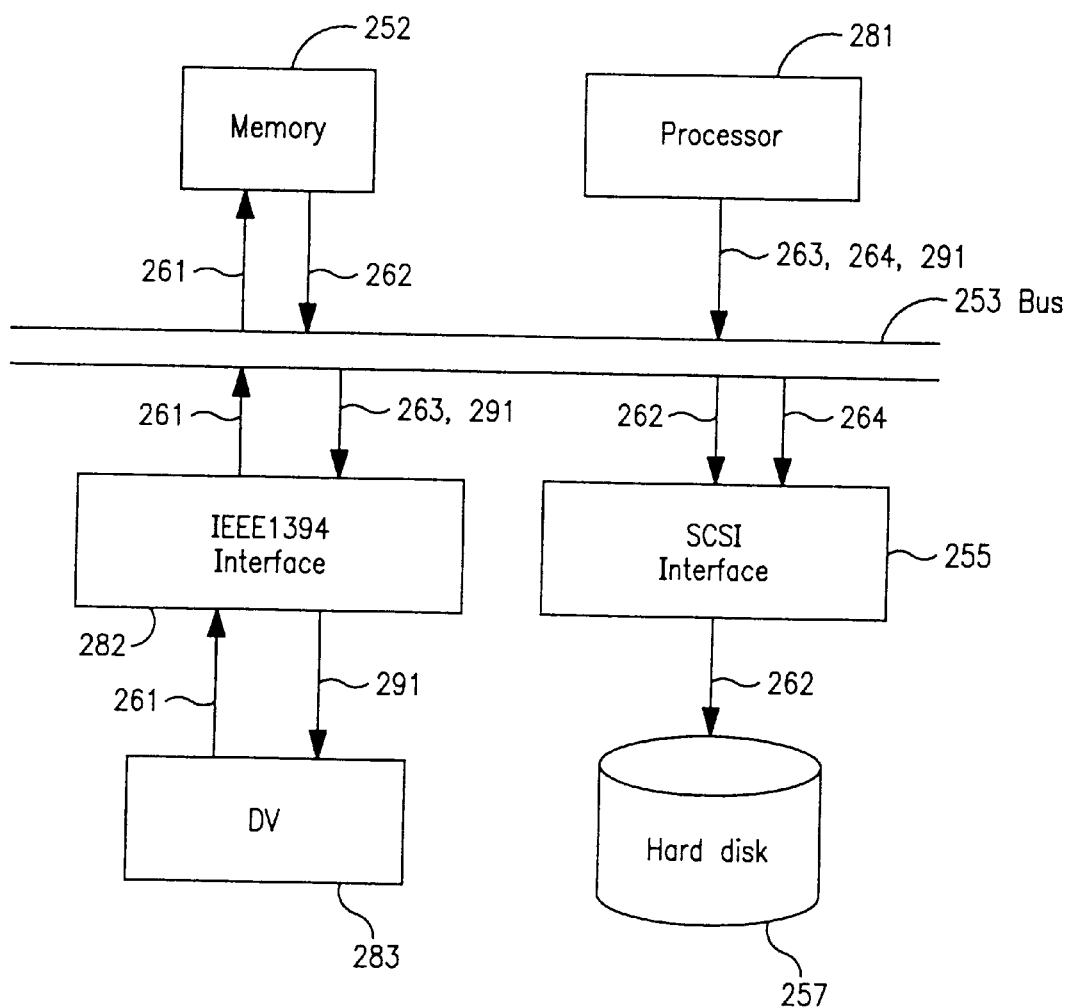
FIG. 36 is a block diagram of a computer in accordance with an eighteenth embodiment.

FIG. 36 is a block diagram showing the entire configuration of a computer in accordance with an eighteenth embodiment. In FIG. 36, the numeral 281 represents a processor, the numeral 282 represents an IEEE1394 Interface, the numeral 283 represents a DV, and the numeral 291 represents a control command of the DV 283.

Figure 37:
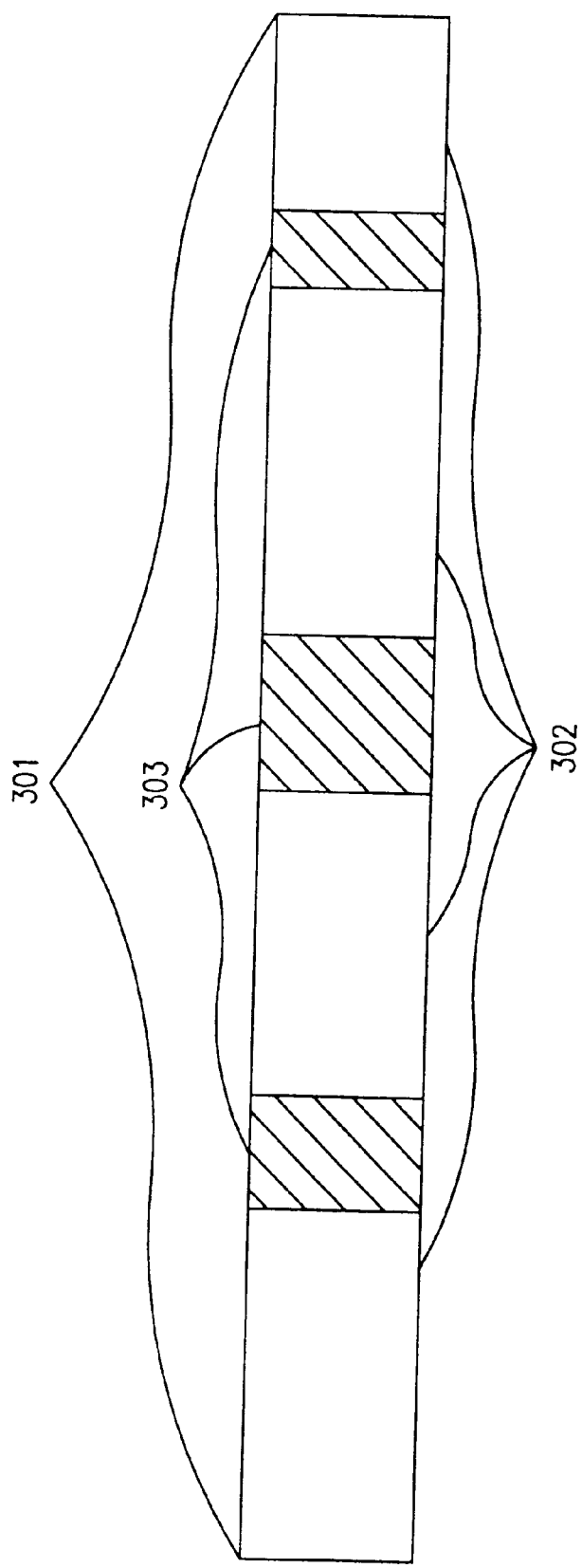
FIG. 37 is a view showing an example of data written on a hard disk 257 in accordance with the eighteenth embodiment.

FIG. 37 shows an example of data to be written on the hard disk 257. In FIG. 37, the numeral 301 represents data to be written on the hard disk 257, the numeral 302 represents data actually written on the hard disk 257, and the numeral 303 represents data, among the data 301, not written on the hard disk 257.

Figure 38:
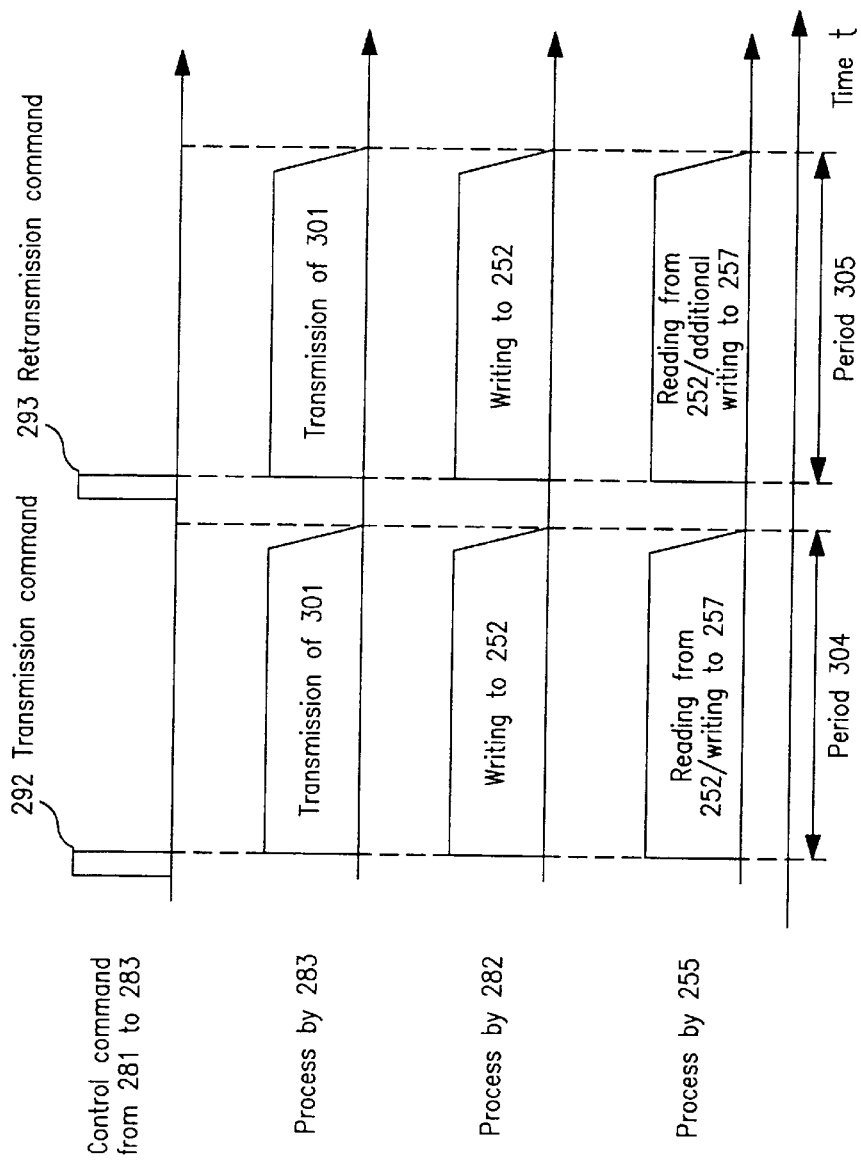
FIG. 38 is a time chart for data transmission in accordance with the eighteenth embodiment.

FIG. 38 is a time chart at the time when data transmitted from the DV 283 is received and written on the hard disk 257. The numeral 292 represents a transmission command, i.e., one of control commands 291, the numeral 293 represents a retransmission command, i.e., one of the control commands 291, the numeral 304 represents a first data transmission period, and the numeral 305 represents a second data transmission period.

First, the processor 251 transmits the transmission command 292 to the DV 283 as the control command 291. After receiving the transmission command 292, the DV 283 starts transmitting the transmission data 261. In order that the transmission data 261 can be transmitted as the packets 265a to 265g every 125 microseconds as shown in FIG. 33, the DV 283 keeps transmitting the transmission data 261 at nearly regular intervals. The transmission data 261 includes the data 301 to be written on the hard disk.

Next, the processor 251 transmits the reception command 263 to the IEEE1394 Interface 282. After receiving the reception command 263, the IEEE1394 Interface 282 receives the transmission data 261 transmitted from the DV 283, and writes it in the memory 252. At this time, data is written to the bank 271 of the memory 252 at first; when the bank 271 is filled, data is written to the bank 272. Furthermore, when the bank 272 is filled, data is written again to the bank 271.

Furthermore, the processor 281 transmits the writing command 264 to the SCSI Interface 255. After receiving the writing command 264, the SCSI Interface 255 takes out all of written data or only the required data, and writes the data as the writing data 262 on the hard disk 257. At this time, when the IEEE1394 Interface 282 is writing data to the bank 271 of the memory 252, data is read from the bank 272; when the IEEE1394 Interface 282 is writing data to the bank 272, data is read from the bank 271.

The time chart for the above-mentioned operation is the same as that shown in FIG. 35.

If the data transfer speed of the SCSI Interface 255 or the writing speed of the hard disk 257 is low, or if a transmission line error occurs, the data 303 among the data 301 is lost for example, and only the data 302 can be written on the hard disk 257. In this case, the processor 281 transmits the retransmission command 293 as the control command 291 to the DV 283.

After receiving the retransmission command 293, the DV 283 starts transmitting the transmission data 261 including the data 301 again, and carries out the same operation as that described above.

The SCSI Interface 255 takes out the lost data 303 among the transmission data 261 written in the memory 252, and additionally writes the data in the hard disk 257, whereby all the data 301 can be written on the hard disk 257.

Once the processor 281 issues the reception command 263 and the writing command 264, the process of the IEEE1394 Interface 282 and the process of the SCSI Interface 255 are conducted in parallel as shown in FIG. 35. Therefore, the transmission data 261 transmitted from the DV 283 is written to the bank 271 or the bank 272 without fail; at the same time, the data written on the bank 271 and the bank 272 is written on the hard disk 257 via the SCSI Interface 255 without fail. If a data loss occurs, the processor 281 transmits the retransmission command 293 to the DV 283, whereby the same operation is repeated to recover the lost data, and all the data 301 to be written on the hard disk 257 can thus be written completely.

Although it is configured that the process of the IEEE1394 Interface 282 and the process of the SCSI Interface 255 are conducted in parallel, a pseudo-parallel operation using time sharing or the like may be used.

Furthermore, although it is configured that the SCSI Interface 255 reads only the data 303 lost in the period 304 from the memory 252 during data retransmission, i.e., during the period 305 shown in FIG. 38, and additionally write the data on the hard disk 257, other data may be overwritten on the hard disk 257.

Moreover, although data transmission is carried out twice, it may be carried out three or more times.

Besides, the writing of the transmission data 261 from the IEEE1394 Interface 282 to the memory 252 may be controlled by the processor 281 or may not be controlled by the processor 281.

In addition, the reading of the data 262 from the memory 252 to the SCSI Interface 255 may be controlled by the processor 281 or may not be controlled by the processor 281.

Furthermore, the IEEE1394 Interface may be a different interface capable of receiving stream data which is kept transmitted at nearly regular intervals at all times and capable of transmitting control commands issued by the processor to the DV; and the SCSI Interface may be a different interface.

Moreover, the DV may be a different apparatus capable of outputting stream data which is kept transmitted at nearly regular intervals at all times and capable of controlling operation from the processor; and the hard disk may be a different recording medium.

Embodiment 19

Figure 39:
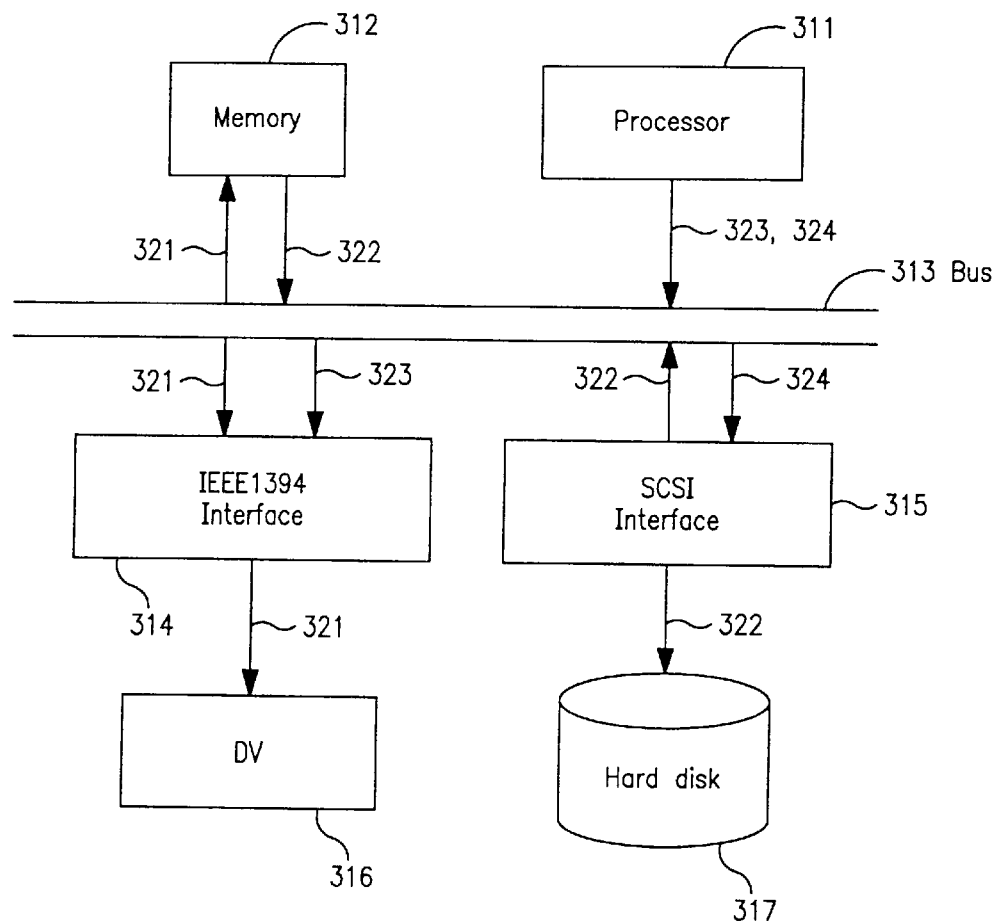
FIG. 39 is a block diagram of a computer in accordance with a nineteenth embodiment.

FIG. 39 is a block diagram showing the entire configuration of a computer in accordance with a nineteenth embodiment. In FIG. 39, the numeral 311 represents a processor, the numeral 312 represents a memory, the numeral 313 represents a bus, the numeral 314 represents an IEEE1394 Interface, the numeral 315 represents a SCSI Interface, the numeral 316 represents a DV, the numeral 317 represents a hard disk, the numeral 321 represents transmission data to the DV 316, the numeral 322 represents reading data from the hard disk 317, the numeral 323 represents a transmission command for the transmission data 321 to the IEEE1394 Interface 314, and the numeral 324 represents a reading command for the reading data 322 to the SCSI Interface 315.

Figure 40:
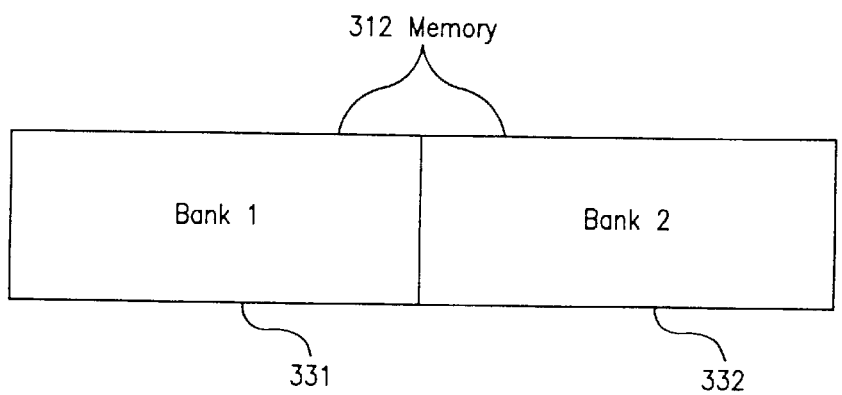
FIG. 40 is a view showing a configuration example of a memory 312 in accordance with the nineteenth embodiment.

FIG. 40 represents an example of the configuration of the memory 312. In FIG. 40, the numerals 331 and 332 represent banks.

Figure 41:
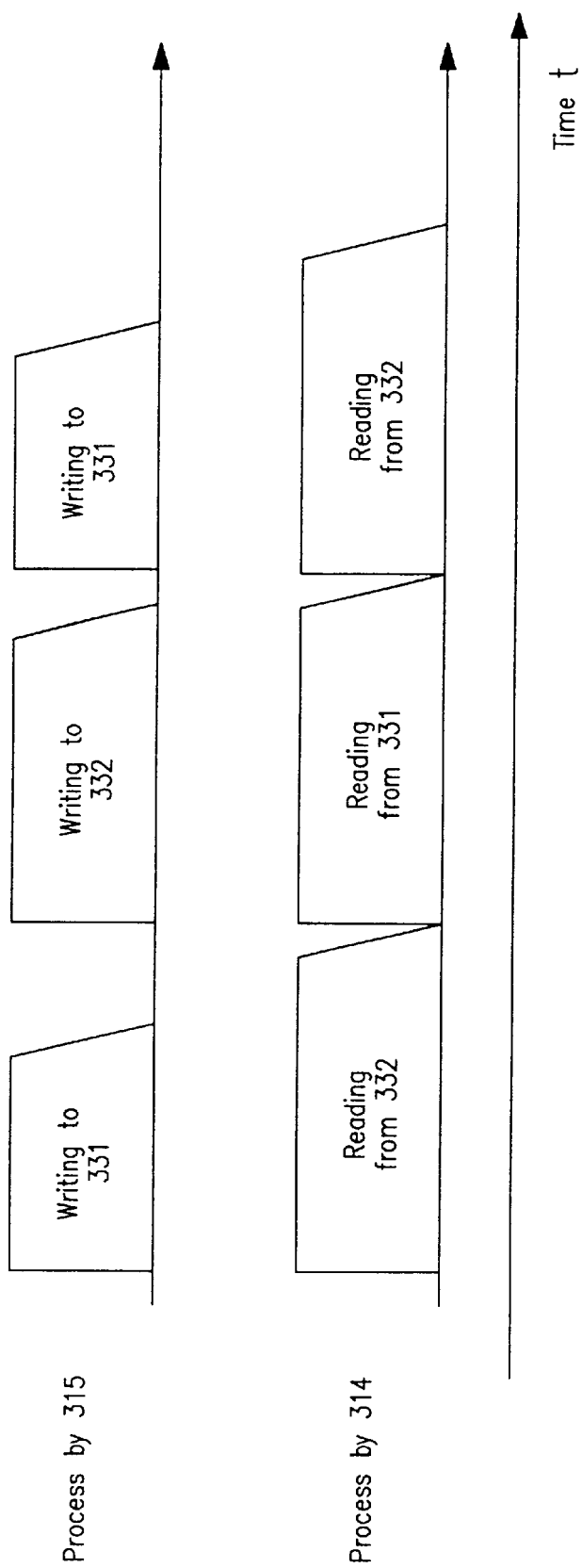
FIG. 41 is a time chart for data transmission in accordance with the nineteenth embodiment.

FIG. 41 is a time chart at the time when the reading data 322 is read from the hard disk 317 and the transmission data 321 is transmitted to the DV 316.

The DV 256 keeps receiving the transmission data 321, and the transmission data 321 is required to be transmitted in the same way as that shown in FIG. 33.

First, the processor 311 transmits the transmission command 323 to the IEEE1394 Interface 314. After receiving the transmission command 323, the IEEE1394 Interface 314 transmits predetermined data added to the data read from the memory 312 to the DV 316 as the transmission data 321. At this time, data is read from the bank 331 of the memory 312 at first; after the data of the bank 331 is transmitted completely, data is read from the bank 272. Furthermore, after the data of the bank 332 is transmitted completely, data is read from the bank 331 again.

Furthermore, the processor 311 transmits the reading command 324 to the SCSI Interface 315. After receiving the reading command 324, the SCSI Interface 315 reads reading data 322 to be transmitted to the DV 316 during the period C in FIG. 41 from the hard disk 317 and writes in the memory 312. At this time, when the IEEE1394 Interface 314 is reading data from the bank 331 of the memory 312, data is written to the bank 332; when the IEEE1394 Interface 314 is writing data to the bank 332, data is read from the bank 331.

Once the processor 311 issues the transmission command 323 and the reading command 324, the process of the IEEE1394 Interface 314 and the process of the SCSI Interface 315 are conducted in parallel as shown in FIG. 41. Therefore, the transmission data 321 is transmitted from the bank 331 or the bank 332 to the DV 316 without fail; at the same time, the reading data 322 having been read from the hard disk 317 and to be transmitted next is written to the bank 331 and the bank 332 via the SCSI Interface 315 without fail. Therefore, data read from the hard disk 317 is transmitted from the IEEE1394 Interface 314 to the DV 316 without interruption.

Although it is configured that the process of the IEEE1394 Interface 314 and the process of the SCSI Interface 315 are conducted in parallel, a pseudo-parallel operation using time sharing or the like may be used.

Furthermore, although it is configured that the memory 312 comprises two areas of the bank 331 and the bank 332, it may be divided into plural banks, and the size of each bank may be constant or variable. Moreover, all banks may have an equal size.

Besides, the reading of the transmission data 321 from the memory 312 to the IEEE1394 Interface 314 may be controlled by the processor 311 or may not be controlled by the processor 311.

In addition, the writing of the reading data 322 from the SCSI Interface 315 to the memory 312 may be controlled by the processor 311 or may not be controlled by the processor 311.

Furthermore, the IEEE1394 Interface may be a different interface capable of receiving stream data which is kept transmitted at nearly regular intervals at all times; and the SCSI Interface may be a different interface.

Moreover, the DV may be a different apparatus for inputting stream data which is kept transmitted at nearly regular intervals at all times; and the hard disk may be a different recording medium.

In each of the above-mentioned embodiments, the above-mentioned function is described so as to be attained in the form of a hardware (apparatus); however, this can be carried out easily by using other independent systems by implementing the function by using programs for a computer, a microcomputer or the like, and by recording and transferring the programs to a recording medium such as a floppy disk. FIG. 42 is a view for explaining a case wherein this is carried out by using a floppy disk.

Figure 42C:
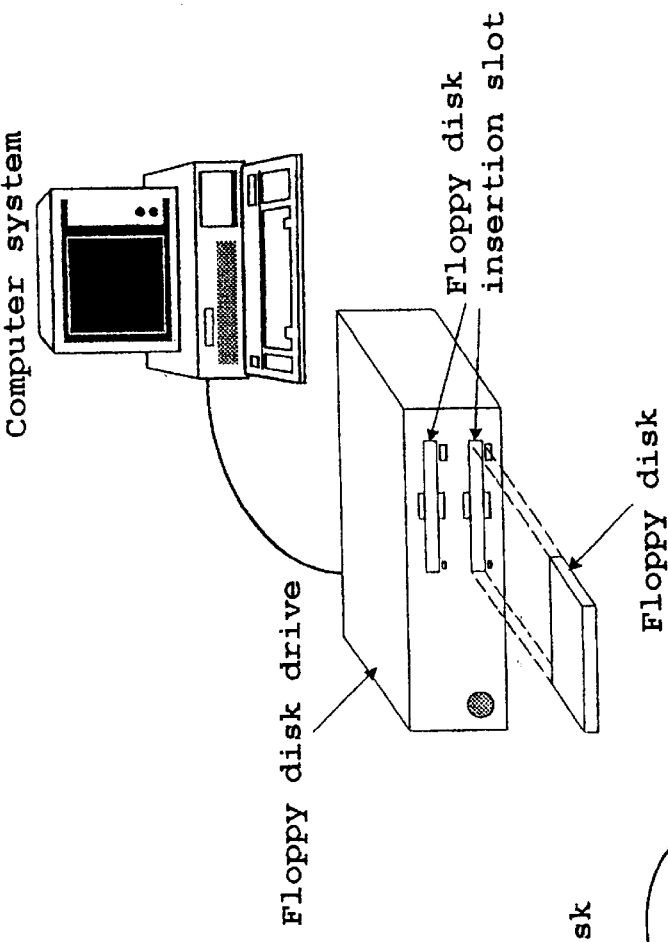
FIGS. 42(a) to (c) are views for explaining implementation by programs.
Figure 42A:
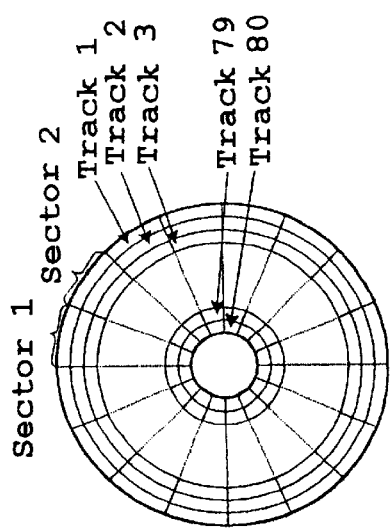

FIG. 42(a) is a view showing an example of the physical format of the floppy disk used as the main unit of the recording medium. Tracks are formed concentrically from the outer circumference to the inner circumference thereof, and divided into 16 sectors in the radial direction. Programs are recorded in areas allocated in this way.

Figure 42B:
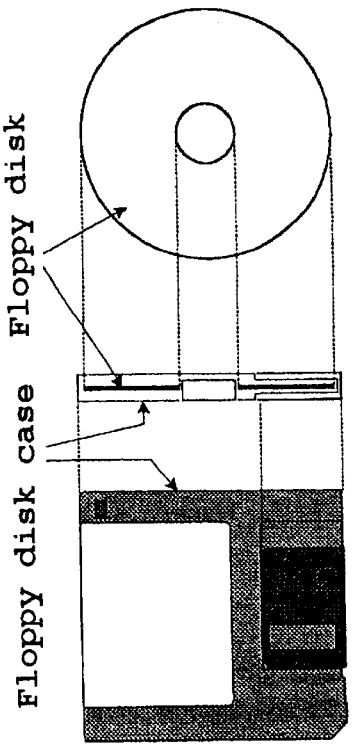
Figure 43:
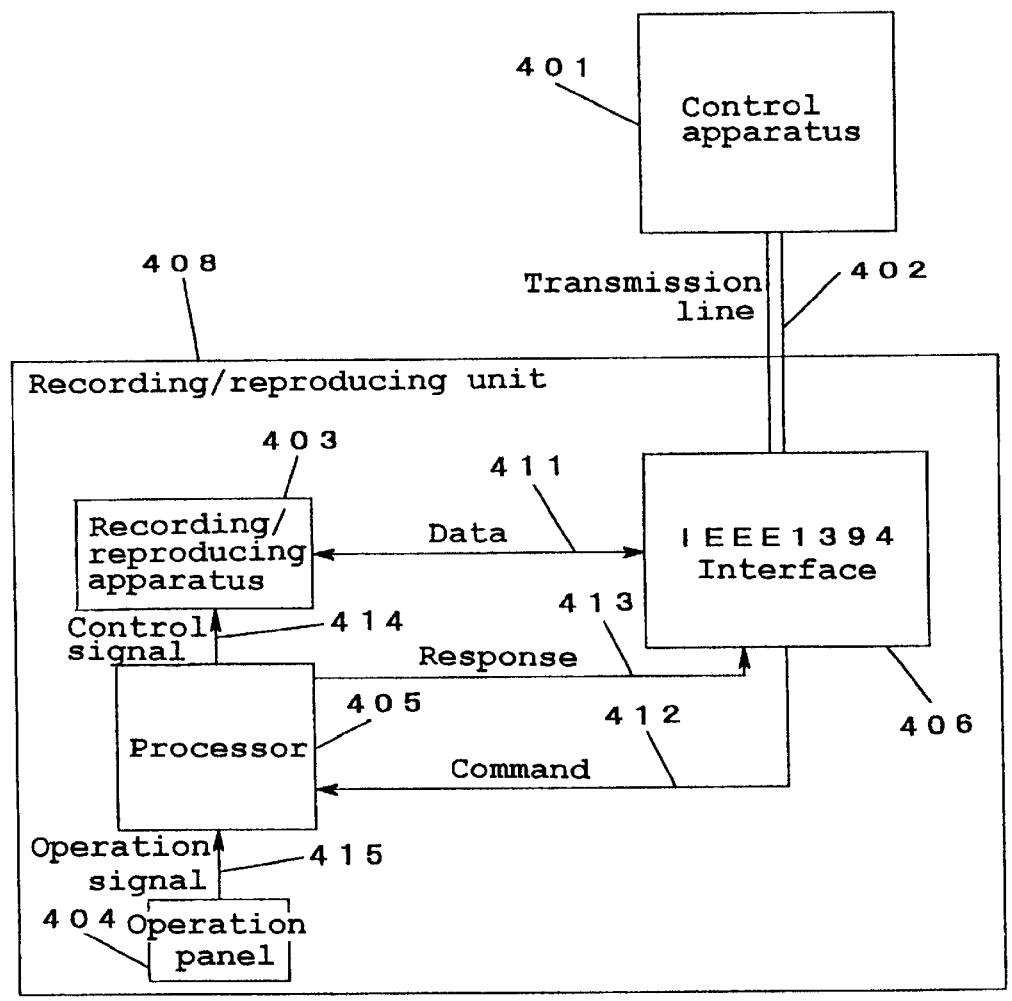
FIG. 43 is a block diagram showing the configuration of a conventional recording/reproducing apparatus.

FIG. 42(b) is a view explaining a case for accommodating this floppy disk. A front view of the floppy disk case, a sectional view thereof and a view of the floppy disk are given respectively from left. By accommodating the floppy disk in the case in this way, the disk can be protected against dust and external shocks, and can be transferred safely.

FIG. 42(c) is a view explaining how programs are recorded/reproduced on the floppy disk. By connecting a floppy disk drive to a computer system as shown in the figure, the programs can be recorded/reproduced on the disk. The disk is incorporated into and removed from the floppy disk drive through an insertion slot. In the case of recording, the programs are recorded from the computer system to the disk by the floppy disk drive. In the case of reproduction, the programs are read from the floppy disk drive and transferred to the computer system.

In this embodiment, the explanation is done by using the floppy disk as a recording medium, however, an optical disk can also be used in a similar way. Furthermore, the recording medium is not limited to this, any medium capable of recording programs, such as an IC card and a ROM cassette, can be used in a similar way. In other words,by forming a recording medium such as a magnetic recording medium or an optical recording medium on which programs for making a computer carry out the functions of all or part of means described in one of the above-mentioned embodiments, and by using it as described above, the same effect as that described above can be delivered.

Furthermore, a medium incorporating programs for implementing all or part of the functions of the means, portions or methods in accordance with each of the above-mentioned inventions by using a computer also belongs to the present invention.

Industrial Usability

In the case when a control apparatus controls a recording/reproducing apparatus during transmission/reception between the control apparatus and the recording/reproducing apparatus, the present invention provides a data recording/reproducing apparatus capable of preventing the above-mentioned transmission/reception from malfunctioning by control operation carried out from an operation panel.

The present invention provides a data recording/reproducing apparatus, a file generation method and a file management method capable of generating file system information and controlling generated files so that contents recorded on a recording medium can be confirmed more easily than ever before.

The present invention provides a data recording/reproducing apparatus and a file management method capable of carrying out file management capable of treating data having a real-time characteristic.

The present invention provides a file system information generation apparatus and a file system information analysis apparatus for generating/analyzing file system information constituting a file system for a DV required to record and control computer data in a file format in the DV.

The present invention provides a recording/reproducing apparatus capable of restoring packet output timing during reproduction by using minimal additional circuits in the case of recording MPEG2data. Furthermore, data in the MPEG2transport stream format can be recorded while compatibility with the existing digital VCR "DV" (Digital Video) format is maintained in particular.

The present invention provides a method of writing stream data being kept output at nearly regular intervals at all times on a recording medium without data loss in a PC, and a method of reading data from the recording medium as stream data being kept transmitted at nearly regular intervals at all times in the PC.

What is claimed is:

1. A recording/reproducing apparatus comprising:

transmission/reception means of transmitting/receiving data and command signals from a transmission line, the command signals including an operation valid/invalid command received from a control apparatus by way of the transmission line;

recording/reproducing means of recording data received from said transmission/reception means on a recording medium during reception and of transmitting data reproduced from said recording medium to said transmission/reception means during transmission;

operation means of generating an operation signal for determining the operation of said recording/reproducing means;

control means of controlling said recording/reproducing means in accordance with said command signals or said operation signal; and switching signal generation means of outputting a switching signal for determining whether said operation signal is valid or invalid to said control means;

wherein the transmission/reception means is configured to provide the operation valid/invalid command to the switching signal generation means;

the switching signal generation means is configured to output the switching signal in response to the operation valid/invalid command received from the control apparatus;

said switching signal generation means outputs said switching signal as an operation means valid signal for validating said operation signal to said control means in the case when a command received from said transmission/reception means is an operation valid command, and said switching signal generation means outputs said switching signal as an operation means invalid signal for invalidating said operation signal to said control means in the case when a command received from said transmission/reception means is an operation invalid command, and said control means validates said operation signal output from said operation means and disregards said command signal in the case of receiving said operation means valid signal, and said control means invalidates said operation signal output from said operation means and uses said command signal in the case of receiving said operation means invalid signal.

2. A recording/reproducing apparatus comprising:

transmission/reception means coupled to a transmission line of transmitting/receiving data and command signals from a control apparatus by way of the transmission line, and generating a transmission line reset signal when the connection of said transmission line is disconnected;

recording/reproducing means of recording data received from said transmission/reception means on a recording medium during reception and of transmitting data reproduced from said recording medium to said transmission/reception means during transmission;

operation means of generating an operation signal for determining the operation of said recording/reproducing means;

control means of controlling said recording/reproducing means in accordance with said command signals or said operation signal; and switching signal generation means of outputting a switching signal for determining whether said operation signal is valid or invalid to said control means;

wherein the transmission/reception means is configured to provide the transmission line reset signal to the switching signal generation means when the connection of the transmission line is disconnected at either the control apparatus or the transmission/reception means or both;

said switching signal generation means outputs said switching signal as an operation means valid signal for validating said operation signal to said control means in the case of receiving said transmission line reset signal from said transmission/reception means, and said control means validates said operation signal output from said operation means in the case of receiving said operation means valid signal.

3. A recording/reproducing apparatus comprising:

transmission/reception means of transmitting/receiving data and command signals from a control apparatus by way of a transmission line, a portion of the command signals being manufacturer dependent, and for receiving manufacturer information from the control apparatus via the transmission line;

recording/reproducing means of recording data received from said transmission/reception means on a recording medium during reception and of transmitting data reproduced from said recording medium to said transmission/reception means during transmission;

operation means of generating an operation signal for determining the operation of said recording/reproducing means;

control means of controlling said recording/reproducing means in accordance with said command signals or said operation signal;

switching signal generation means of outputting a switching signal for determining whether said operation signal is valid or invalid to said control means; and a comparator of comparing said received manufacturer information with specific manufacturer information stored in itself, and outputting a specific manufacturer information reception signal in the case of coincidence to the switching signal generation means;

wherein the switching signal generation means is configured to output the switching signal in response only to the received specific manufacturer information reception signal, indicating that the control apparatus includes the portion of the command signals being manufacturer dependent;

said switching signal generation means outputs said switching signal as an operation means invalid signal for invalidating said operation signal to said control means in the case of receiving said specific manufacturer information reception signal from said comparator, and said control means invalidates said operation signal output from said operation means in the case of receiving said operation means invalid signal and uses the command signals received from the transmission/reception means.

4. A recording/reproducing apparatus comprising:

transmission/reception means of transmitting/receiving data and command signals from a control apparatus by way of a transmission line;

recording/reproducing means of recording data received from said transmission/reception means on a recording medium during reception and of transmitting data reproduced from said recording medium to said transmission/reception means during transmission;

operation means of generating an operation signal for determining the operation of said recording/reproducing means;

control means of controlling said recording/reproducing means in accordance with said command signals or said operation signal;

switching signal generation means of outputting a switching signal for determining whether said operation signal is valid or invalid to said control means; and a binary switch of outputting a binary signal to said switching signal generation means, wherein said switching signal generation means generates said switching signal when said binary signal is a predetermined value indicating that the operation signal is invalid, and said control means invalidates said operation signal output from said operation means in response to said switching signal indicating that the operation signal is invalid, said control means controls said recording/reproducing means using said command signals, when said switching signal generation means determines that said operation signal is invalid, and said control means controls said recording/reproducing means using said operation signal, when said switching signal generation means determines that said operation signal is valid.

5. A recording/reproducing apparatus in accordance with one of claims 1 to 4, wherein said transmission/reception means is an IEEE1394 Interface.

* * * * *